(12) United States Patent
Kuras et al.

(10) Patent No.: US 10,470,433 B2
(45) Date of Patent: *Nov. 12, 2019

(54) CAT LITTER PRODUCT

(71) Applicant: OIL-DRI CORPORATION OF AMERICA, Chicago, IL (US)

(72) Inventors: Monika Kuras, Chicago, IL (US); George Robert Goss, Chicago, IL (US); Dan Jaffee, Chicago, IL (US); Bob Soral, Chicago, IL (US)

(73) Assignee: Oil-Dri Corporation of America, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/222,267

(22) Filed: Dec. 17, 2018

(65) Prior Publication Data

US 2019/0116754 A1 Apr. 25, 2019

Related U.S. Application Data

(60) Continuation of application No. 15/845,373, filed on Dec. 18, 2017, now Pat. No. 10,188,076, which is a continuation of application No. 15/606,805, filed on May 26, 2017, now Pat. No. 9,894,877, which is a continuation of application No. 15/492,566, filed on Apr. 20, 2017, now abandoned, which is a continuation of application No. 15/260,660, filed on Sep. 9, 2016, now abandoned, which is a continuation of application No. 15/162,296, filed on May 23, 2016, now Pat. No. 9,439,393, which is a division of application No. 13/524,021, filed on Jun. 15, 2012, now Pat. No. 9,345,227.

(60) Provisional application No. 61/497,178, filed on Jun. 15, 2011.

(51) Int. Cl.
*A01K 1/01* (2006.01)
*A01K 1/015* (2006.01)

(52) U.S. Cl.
CPC .......... *A01K 1/0154* (2013.01); *A01K 1/0155* (2013.01)

(58) Field of Classification Search
CPC .. A01K 1/0154; A01K 1/0152; A01K 1/0155; A01K 1/0107; A01K 1/015; A01K 1/0114; B01J 20/12; B01J 20/2803
USPC .................................. 119/161, 171, 172, 173
See application file for complete search history.

(56) References Cited

U.S. PATENT DOCUMENTS

| | | | | |
|---|---|---|---|---|
| 3,993,584 A * | 11/1976 | Owen | ........................ | B01J 2/28 252/383 |
| 5,317,990 A * | 6/1994 | Hughes | ................ | A01K 1/0154 119/171 |
| 5,647,300 A * | 7/1997 | Tucker | ................. | A01K 1/0154 119/171 |
| 5,836,263 A * | 11/1998 | Goss | ..................... | A01K 1/0154 119/173 |
| 5,975,019 A * | 11/1999 | Goss | .................... | A01K 1/0154 119/173 |
| 6,887,570 B2 * | 5/2005 | Greene | ................ | A01K 1/0154 119/171 |
| 7,603,964 B2 * | 10/2009 | Jenkins | ................ | A01K 1/0154 119/171 |

(Continued)

*Primary Examiner* — Yvonne R Abbott-Lewis
(74) *Attorney, Agent, or Firm* — Vedder Price, P.C.

(57) ABSTRACT

Litter compositions are provided comprising sodium bentonite and various fillers. These litter compositions have substantially the same clumpability properties as a composition consisting of only the sodium bentonite.

19 Claims, 33 Drawing Sheets

(56) References Cited

U.S. PATENT DOCUMENTS

| | | | |
|---|---|---|---|
| 9,283,540 B2 * | 3/2016 | Fritter | A01K 1/0152 |
| 9,345,227 B2 * | 5/2016 | Kuras | A01K 1/0155 |
| 2003/0209203 A1 * | 11/2003 | Opfel | A01K 1/0047 |
| | | | 119/173 |
| 2005/0005870 A1 * | 1/2005 | Fritter | A01K 1/0152 |
| | | | 119/173 |
| 2005/0056229 A1 * | 3/2005 | Greene | A01K 1/0152 |
| | | | 119/173 |
| 2005/0175577 A1 * | 8/2005 | Jenkins | A01K 1/0152 |
| | | | 424/76.1 |
| 2008/0223302 A1 * | 9/2008 | Wang | A01K 1/0155 |
| | | | 119/173 |
| 2012/0260860 A1 * | 10/2012 | Drief | A01K 1/0154 |
| | | | 119/173 |
| 2014/0000526 A1 * | 1/2014 | Kuras | A01K 1/0154 |
| | | | 119/173 |

* cited by examiner

Wyo-Ben Sodium Bentonite (-25/+60) R-09-636   Bulk Density (lbs/ft³): 60.15

1202

| Screen size (U.S. mesh) | Amt. retained (g) | % wt. retained | Average mesh | Multiplier (ASTM) | Ave. particle size (micron) | Ave. particle size (ft) | particle count/lb | Ext. Surface Area/Pound (ft²/lb) |
|---|---|---|---|---|---|---|---|---|
| 6 | | 0.00 | (4/6) 5 | 162 | 4,000 | 0.0131 | 0 | 0.0000 |
| 8 | | 0.00 | (6/8) 7 | 455 | 2,830 | 0.0093 | 0 | 0.0000 |
| 10 | | 0.00 | (8/10) 9 | 985 | 2,109 | 0.0069 | 0 | 0.0000 |
| 12 | | 0.00 | (10/12) 11 | 1,825 | 1,695 | 0.0056 | 0 | 0.0000 |
| 14 | | 0.00 | (12/14) 13 | 4,300 | 1,414 | 0.0046 | 0 | 0.0000 |
| 16 | | 0.00 | (14/16) 15 | 5,700 | 1,210 | 0.0040 | 0 | 0.0000 |
| 18 | | 0.00 | (16/18) 17 | 7,300 | 1,056 | 0.0035 | 0 | 0.0000 |
| 20 | 0.1 | 0.04 | (18/20) 19 | 9,500 | 936 | 0.0031 | 186 | 0.0055 |
| 25 | 5 | 1.87 | (20/25) 22.5 | 14,500 | 779 | 0.0026 | 14,172 | 0.2908 |
| 30 | 96 | 35.83 | (25/30) 27.5 | 26,500 | 626 | 0.0021 | 497,301 | 6.5900 |
| 35 | | 0.00 | (30/35) 32.5 | 46,000 | 522 | 0.0017 | 0 | 0.0000 |
| 40 | 103 | 38.45 | (35/40) 37.5 | 76,000 | 447 | 0.0015 | 1,530,217 | 10.3392 |
| 45 | | 0.00 | (40/45) 42.5 | 120,000 | 390 | 0.0013 | 0 | 0.0000 |
| 50 | 41 | 15.30 | (45/50) 47.5 | 175,000 | 345 | 0.0011 | 1,402,569 | 5.6452 |
| 60 | 14.4 | 5.38 | (50/60) 55 | 285,000 | 294 | 0.0010 | 802,250 | 2.3449 |
| 100 | 6 | 2.24 | (60/100) 80 | 809,674 | 177 | 0.0006 | 949,650 | 1.0061 |
| Pan | 2.4 | 0.90 | (-100) 209 | 15,470,594 | 69 | 0.0002 | 7,258,058 | 1.1685 |
| Total: % | 267.9 | 100.00 | | | | SUM: | 12,454,403 | 27.39 |

FIG. 12

BL-RWM (−14/+30) R-10-079     Bulk Density (lbs/ft³): 41.5

1302

| Screen size (U.S. mesh) | Amt. retained (g) | % wt. retained | Average mesh | | Multiplier (ASTM) | Ave. particle size (micron) | Ave. particle size (ft) | particle count/lb | Ext. Surface Area/Pound (ft²/lb) |
|---|---|---|---|---|---|---|---|---|---|
| 6 | | 0.00 | (4/6) | 5 | 162 | 4,000 | 0.0131 | 0 | 0.0000 |
| 8 | | 0.00 | (6/8) | 7 | 455 | 2,830 | 0.0093 | 0 | 0.0000 |
| 10 | | 0.00 | (8/10) | 9 | 985 | 2,109 | 0.0069 | 0 | 0.0000 |
| 12 | 0.1 | 0.04 | (10/12) | 11 | 1,825 | 1,695 | 0.0056 | 61 | 0.0059 |
| 14 | 3.5 | 1.54 | (12/14) | 13 | 4,300 | 1,414 | 0.0046 | 5,010 | 0.3388 |
| 16 | 41.0 | 17.98 | (14/16) | 15 | 5,700 | 1,210 | 0.0040 | 77,801 | 3.8519 |
| 18 | | 0.00 | (16/18) | 17 | 7,300 | 1,056 | 0.0035 | 0 | 0.0000 |
| 20 | 107.7 | 47.24 | (18/20) | 19 | 9,500 | 936 | 0.0031 | 340,617 | 10.0911 |
| 25 | 34.4 | 15.09 | (20/25) | 22.5 | 14,500 | 779 | 0.0026 | 166,056 | 3.4076 |
| 30 | 32.4 | 14.21 | (25/30) | 27.5 | 26,500 | 626 | 0.0021 | 285,837 | 3.7878 |
| 35 | | 0.00 | (30/35) | 32.5 | 46,000 | 522 | 0.0017 | 0 | 0.0000 |
| 40 | 7.4 | 3.25 | (35/40) | 37.5 | 76,000 | 447 | 0.0015 | 187,229 | 1.2651 |
| 45 | | 0.00 | (40/45) | 42.5 | 120,000 | 390 | 0.0013 | 0 | 0.0000 |
| 50 | 0.6 | 0.26 | (45/50) | 47.5 | 175,000 | 345 | 0.0011 | 34,956 | 0.1407 |
| 60 | 0.1 | 0.04 | (50/60) | 55 | 285,000 | 294 | 0.0010 | 9,488 | 0.0277 |
| 100 | 0.2 | 0.09 | (60/100) | 80 | 809,674 | 177 | 0.0006 | 53,910 | 0.0571 |
| Pan | 0.6 | 0.26 | (−100) | 209 | 15,470,594 | 69 | 0.0002 | 3,090,195 | 0.4975 |
| Total: % | 228.0 | 100.00 | | | | | SUM: | 4,251,160 | 23.47 |

FIG. 13

Wyo-Ben Sodium Bentonite (-12/+40) R-10-342     Bulk Density (lbs/ft³): 64.4

1402

| Screen size (U.S. mesh) | Amt. retained (g) | % wt. retained | Average mesh | Multiplier (ASTM) | Ave. particle size (micron) | Ave. particle size (ft) | particle count/lb | Ext. Surface Area/Pound (ft²/lb) |
|---|---|---|---|---|---|---|---|---|
| 6 | | 0.00 | (4/6) 5 | 162 | 4,000 | 0.0131 | 0 | 0.0000 |
| 8 | | 0.00 | (6/8) 7 | 455 | 2,830 | 0.0093 | 0 | 0.0000 |
| 10 | | 0.00 | (8/10) 9 | 985 | 2,109 | 0.0069 | 0 | 0.0000 |
| 12 | 0.1 | 0.05 | (10/12) 11 | 1,825 | 1,695 | 0.0056 | 47 | 0.0045 |
| 14 | 5.5 | 2.88 | (12/14) 13 | 4,300 | 1,414 | 0.0046 | 6,063 | 0.4099 |
| 16 | 19.3 | 10.12 | (14/16) 15 | 5,700 | 1,210 | 0.0040 | 28,202 | 1.3963 |
| 18 | 23 | 12.05 | (16/18) 17 | 7,300 | 1,056 | 0.0035 | 43,042 | 1.6231 |
| 20 | 37.3 | 19.55 | (18/20) 19 | 9,500 | 936 | 0.0031 | 90,840 | 2.6912 |
| 25 | 24.2 | 12.68 | (20/25) 22.5 | 14,500 | 779 | 0.0026 | 89,956 | 1.8460 |
| 30 | 33.6 | 17.61 | (25/30) 27.5 | 26,500 | 626 | 0.0021 | 228,261 | 3.0248 |
| 35 | | 0.00 | (30/35) 32.5 | 46,000 | 522 | 0.0017 | 0 | 0.0000 |
| 40 | 45 | 23.58 | (35/40) 37.5 | 76,000 | 447 | 0.0015 | 876,743 | 5.9239 |
| 45 | | 0.00 | (40/45) 42.5 | 120,000 | 390 | 0.0013 | 0 | 0.0000 |
| 50 | 2.4 | 1.26 | (45/50) 47.5 | 175,000 | 345 | 0.0011 | 107,670 | 0.4334 |
| 60 | 0.2 | 0.10 | (50/60) 55 | 285,000 | 294 | 0.0010 | 14,612 | 0.0427 |
| 100 | 0.1 | 0.05 | (60/100) 80 | 809,674 | 177 | 0.0006 | 20,757 | 0.0220 |
| Pan | 0.1 | 0.05 | (-100) 209 | 15,470,594 | 69 | 0.0002 | 396,601 | 0.0639 |
| Total: % | 190.8 | 100.00 | | | | SUM: | 1,902,794 | 17.48 |

FIG. 14

BL-RVM (−24/+48) R-10-341  Bulk Density (lbs/ft³):  37.1

1502

| Screen size (U.S. mesh) | Amt. retained (g) | % wt. retained | Average mesh | Multiplier (ASTM) | Ave. particle size (micron) | Ave. particle size (ft) | particle count/lb | Ext. Surface Area/Pound (ft²/lb) |
|---|---|---|---|---|---|---|---|---|
| 6 |  | 0.00 | (4/6) 5 | 162 | 4,000 | 0.0131 | 0 | 0.0000 |
| 8 |  | 0.00 | (6/8) 7 | 455 | 2,830 | 0.0093 | 0 | 0.0000 |
| 10 |  | 0.00 | (8/10) 9 | 985 | 2,109 | 0.0069 | 0 | 0.0000 |
| 12 | 0.4 | 0.20 | (10/12) 11 | 1,825 | 1,695 | 0.0056 | 309 | 0.0300 |
| 14 | 5.5 | 2.74 | (12/14) 13 | 4,300 | 1,414 | 0.0046 | 10,005 | 0.6765 |
| 16 | 12 | 5.98 | (14/16) 15 | 5,700 | 1,210 | 0.0040 | 28,936 | 1.4326 |
| 18 | 13.4 | 6.68 | (16/18) 17 | 7,300 | 1,056 | 0.0035 | 41,383 | 1.5605 |
| 20 | 20.1 | 10.01 | (18/20) 19 | 9,500 | 936 | 0.0031 | 80,781 | 2.3932 |
| 25 | 18.3 | 9.12 | (20/25) 22.5 | 14,500 | 779 | 0.0026 | 112,256 | 2.3036 |
| 30 | 33.4 | 16.64 | (25/30) 27.5 | 26,500 | 626 | 0.0021 | 374,439 | 4.9619 |
| 35 |  | 0.00 | (30/35) 32.5 | 46,000 | 522 | 0.0017 | 0 | 0.0000 |
| 40 | 59.1 | 29.45 | (35/40) 37.5 | 76,000 | 447 | 0.0015 | 1,900,161 | 12.8388 |
| 45 |  | 0.00 | (40/45) 42.5 | 120,000 | 390 | 0.0013 | 0 | 0.0000 |
| 50 | 33.5 | 16.69 | (45/50) 47.5 | 175,000 | 345 | 0.0011 | 2,480,117 | 9.9823 |
| 60 | 3.9 | 1.94 | (50/60) 55 | 285,000 | 294 | 0.0010 | 470,217 | 1.3744 |
| 100 | 0.4 | 0.20 | (60/100) 80 | 809,674 | 177 | 0.0006 | 137,012 | 0.1452 |
| Pan | 0.7 | 0.35 | (−100) 209 |  | 69 | 0.0002 | 4,581,359 | 0.7376 |
| Total: % | 200.7 | 100.00 |  | 15,470,594 |  | SUM: | 10,216,975 | 38.44 |

BL-RWM (-6/+20) R-10-079     Bulk Density (lbs/ft³): 41.1

| Screen size (U.S. mesh) | Amt. retained (g) | % wt. retained | Average mesh | Multiplier (ASTM) | Ave. particle size (micron) | Ave. particle size (ft) | particle count/lb | Ext. Surface Area/Pound (ft²/lb) |
|---|---|---|---|---|---|---|---|---|
| 6 | 2 | 1.42 | (4/6) 5 | 162 | 4,000 | 0.0131 | 177 | 0.0957 |
| 8 | 48.2 | 34.33 | (6/8) 7 | 455 | 2,830 | 0.0093 | 11,972 | 3.2423 |
| 10 | 21.6 | 15.38 | (8/10) 9 | 985 | 2,109 | 0.0069 | 11,614 | 1.7469 |
| 12 | 22.2 | 15.81 | (10/12) 11 | 1,825 | 1,695 | 0.0056 | 22,117 | 2.1498 |
| 14 | 16.9 | 12.04 | (12/14) 13 | 4,300 | 1,414 | 0.0046 | 39,670 | 2.6821 |
| 16 | 8.7 | 6.20 | (14/16) 15 | 5,700 | 1,210 | 0.0040 | 27,070 | 1.3403 |
| 18 | 7.3 | 5.20 | (16/18) 17 | 7,300 | 1,056 | 0.0035 | 29,090 | 1.0970 |
| 20 | 7.6 | 5.41 | (18/20) 19 | 9,500 | 936 | 0.0031 | 39,413 | 1.1676 |
| 25 | 2.5 | 1.78 | (20/25) 22.5 | 14,500 | 779 | 0.0026 | 19,788 | 0.4061 |
| 30 | 1.5 | 1.07 | (25/30) 27.5 | 26,500 | 626 | 0.0021 | 21,699 | 0.2875 |
| 35 |  | 0.00 | (30/35) 32.5 | 46,000 | 522 | 0.0017 | 0 | 0.0000 |
| 40 |  | 0.00 | (35/40) 37.5 | 76,000 | 447 | 0.0015 | 0 | 0.0000 |
| 45 |  | 0.00 | (40/45) 42.5 | 120,000 | 390 | 0.0013 | 0 | 0.0000 |
| 50 |  | 0.00 | (45/50) 47.5 | 175,000 | 345 | 0.0011 | 0 | 0.0000 |
| 60 | 0.9 | 0.64 | (50/60) 55 | 285,000 | 294 | 0.0010 | 140,020 | 0.4093 |
| 100 | 0.4 | 0.28 | (60/100) 80 | 809,674 | 177 | 0.0006 | 176,796 | 0.1873 |
| Pan | 0.6 | 0.43 | (-100) 209 | 15,470,594 | 69 | 0.0002 | 5,067,105 | 0.8158 |
| Total: % | 140.4 | 100.00 |  |  |  | SUM: | 5,606,530 | 15.63 |

FIG. 17

BPO Sodium Bentonite LD-16W (-16/+35) R-10-379    Bulk Density (lbs/ft³): 64.33

1702

| Screen size (U.S. mesh) | Amt. retained (g) | % wt. retained | Average mesh | Multiplier (ASTM) | Ave. particle size (micron) | Ave. particle size (ft) | particle count/lb | Ext. Surface Area/Pound (ft²/lb) |
|---|---|---|---|---|---|---|---|---|
| 6 | | 0.00 | (4/6) 5 | 162 | 4,000 | 0.0131 | 0 | 0.0000 |
| 8 | | 0.00 | (6/8) 7 | 455 | 2,830 | 0.0093 | 0 | 0.0000 |
| 10 | | 0.00 | (8/10) 9 | 985 | 2,109 | 0.0069 | 0 | 0.0000 |
| 12 | | 0.00 | (10/12) 11 | 1,825 | 1,695 | 0.0056 | 0 | 0.0000 |
| 14 | 0.1 | 0.05 | (12/14) 13 | 4,300 | 1,414 | 0.0046 | 106 | 0.0072 |
| 16 | 0.4 | 0.20 | (14/16) 15 | 5,700 | 1,210 | 0.0040 | 562 | 0.0278 |
| 18 | 8 | 4.03 | (16/18) 17 | 7,300 | 1,056 | 0.0035 | 14,399 | 0.5430 |
| 20 | 80.8 | 40.68 | (18/20) 19 | 9,500 | 936 | 0.0031 | 189,257 | 5.6069 |
| 25 | 52.1 | 26.23 | (20/25) 22.5 | 14,500 | 779 | 0.0026 | 186,262 | 3.8222 |
| 30 | 50.1 | 25.23 | (25/30) 27.5 | 26,500 | 626 | 0.0021 | 327,342 | 4.3378 |
| 35 | 6 | 3.02 | (30/35) 32.5 | 46,000 | 522 | 0.0017 | 68,050 | 0.6270 |
| 40 | 0.2 | 0.10 | (35/40) 37.5 | 76,000 | 447 | 0.0015 | 3,748 | 0.0253 |
| 45 | 0.1 | 0.05 | (40/45) 42.5 | 120,000 | 390 | 0.0013 | 2,959 | 0.0152 |
| 50 | 0 | 0.00 | (45/50) 47.5 | 175,000 | 345 | 0.0011 | 0 | 0.0000 |
| 60 | 0 | 0.00 | (50/60) 55 | 285,000 | 294 | 0.0010 | 0 | 0.0000 |
| 100 | 0.1 | 0.05 | (60/100) 80 | 809,674 | 177 | 0.0006 | 19,963 | 0.0211 |
| Pan | 0.7 | 0.35 | (-100) 209 | 15,470,594 | 69 | 0.0002 | 2,670,071 | 0.4299 |
| Total: % | 198.6 | 100.00 | | | | SUM: | 3,482,718 | 15.46 |

BL-RVM (-24/+48) R-10-341　　　　Bulk Density (lbs/ft³): 37.7

_1802_

| Screen size (U.S. mesh) | Amt. retained (g) | % wt. retained | Average mesh | Multiplier (ASTM) | Ave. particle size (micron) | Ave. particle size (ft) | particle count/lb | Ext. Surface Area/Pound (ft²/lb) |
|---|---|---|---|---|---|---|---|---|
| 6 | 0.00 | 0.00 | (4/6) 5 | 162 | 4,000 | 0.0131 | 0 | 0.0000 |
| 8 |  | 0.00 | (6/8) 7 | 455 | 2,830 | 0.0093 | 0 | 0.0000 |
| 10 |  | 0.00 | (8/10) 9 | 985 | 2,109 | 0.0069 | 0 | 0.0000 |
| 12 | 0.9 | 0.43 | (10/12) 11 | 1,825 | 1,695 | 0.0056 | 649 | 0.0630 |
| 14 | 6.9 | 3.26 | (12/14) 13 | 4,300 | 1,414 | 0.0046 | 11,716 | 0.7921 |
| 16 | 14.5 | 6.85 | (14/16) 15 | 5,700 | 1,210 | 0.0040 | 32,636 | 1.6158 |
| 18 | 14.9 | 7.04 | (16/18) 17 | 7,300 | 1,056 | 0.0035 | 42,950 | 1.6196 |
| 20 | 22.1 | 10.44 | (18/20) 19 | 9,500 | 936 | 0.0031 | 82,903 | 2.4561 |
| 25 | 19.9 | 9.40 | (20/25) 22.5 | 14,500 | 779 | 0.0026 | 113,940 | 2.3381 |
| 30 | 35.5 | 16.78 | (25/30) 27.5 | 26,500 | 626 | 0.0021 | 371,473 | 4.9226 |
| 35 | 35.2 | 16.64 | (30/35) 32.5 | 46,000 | 522 | 0.0017 | 639,373 | 5.8914 |
| 40 | 25.7 | 12.15 | (35/40) 37.5 | 76,000 | 447 | 0.0015 | 771,259 | 5.2112 |
| 45 | 19 | 8.98 | (40/45) 42.5 | 120,000 | 390 | 0.0013 | 900,302 | 4.6306 |
| 50 | 12.9 | 6.10 | (45/50) 47.5 | 175,000 | 345 | 0.0011 | 891,418 | 3.5879 |
| 60 | 2.9 | 1.37 | (50/60) 55 | 285,000 | 294 | 0.0010 | 326,360 | 0.9539 |
| 100 | 0.3 | 0.14 | (60/100) 80 | 809,674 | 177 | 0.0006 | 95,915 | 0.1016 |
| Pan | 0.9 | 0.43 | (-100) 209 | 15,470,594 | 69 | 0.0002 | 5,497,979 | 0.8852 |
| Total: % | 211.6 | 100.00 |  |  |  | SUM: | 9,778,871 | 35.07 |

FIG. 18

Wyo-Ben Exp.Sodium Bentonite (-20/+40) R-10-361 _1902_  Bulk Density (lbs/ft³): 62.49

| Screen size (U.S. mesh) | Amt. retained (g) | % wt. retained | Average mesh | Multiplier (ASTM) | Ave. particle size (micron) | Ave. particle size (ft) | particle count/lb | Ext. Surface Area/Pound (ft²/lb) |
|---|---|---|---|---|---|---|---|---|
| 6 |  | 0.00 | (4/6) 5 | 162 | 4,000 | 0.0131 | 0 | 0.0000 |
| 8 |  | 0.00 | (6/8) 7 | 455 | 2,830 | 0.0093 | 0 | 0.0000 |
| 10 |  | 0.00 | (8/10) 9 | 985 | 2,109 | 0.0069 | 0 | 0.0000 |
| 12 |  | 0.00 | (10/12) 11 | 1,825 | 1,695 | 0.0056 | 0 | 0.0000 |
| 14 |  | 0.00 | (12/14) 13 | 4,300 | 1,414 | 0.0046 | 0 | 0.0000 |
| 16 |  | 0.00 | (14/16) 15 | 5,700 | 1,210 | 0.0040 | 0 | 0.0000 |
| 18 | 0.1 | 0.05 | (16/18) 17 | 7,300 | 1,056 | 0.0035 | 186 | 0.0070 |
| 20 | 20.2 | 10.22 | (18/20) 19 | 9,500 | 936 | 0.0031 | 48,929 | 1.4496 |
| 25 | 47.5 | 24.03 | (20/25) 22.5 | 14,500 | 779 | 0.0026 | 175,612 | 3.6037 |
| 30 | 61.8 | 31.26 | (25/30) 27.5 | 26,500 | 626 | 0.0021 | 417,568 | 5.5335 |
| 35 | 47.9 | 24.23 | (30/35) 32.5 | 46,000 | 522 | 0.0017 | 561,806 | 5.1766 |
| 40 | 18.7 | 9.46 | (35/40) 37.5 | 76,000 | 447 | 0.0015 | 362,367 | 2.4484 |
| 45 | 0.6 | 0.30 | (40/45) 42.5 | 120,000 | 390 | 0.0013 | 18,358 | 0.0944 |
| 50 | 0.2 | 0.10 | (45/50) 47.5 | 175,000 | 345 | 0.0011 | 8,924 | 0.0359 |
| 60 | 0.1 | 0.05 | (50/60) 55 | 285,000 | 294 | 0.0010 | 7,267 | 0.0212 |
| 100 |  | 0.00 | (60/100) 80 | 809,674 | 177 | 0.0006 | 0 | 0.0000 |
| Pan | 0.6 | 0.30 | (-100) 209 | 15,470,594 | 69 | 0.0002 | 2,366,746 | 0.3810 |
| Total: % | 197.7 | 100.00 |  |  |  | SUM: | 3,967,764 | 18.75 |

Wyo-Ben Sodium Bentonite (-12/+40) R-10-342    2002    Bulk Density (lbs/ft³): 64.2

| Screen size (U.S. mesh) | Amt. retained (g) | % wt. retained | Average mesh | Multiplier (ASTM) | Ave. particle size (micron) | Ave. particle size (ft) | particle count/lb | Ext. Surface Area/Pound (ft²/lb) |
|---|---|---|---|---|---|---|---|---|
| 6 | | 0.00 | (4/6) 5 | 162 | 4,000 | 0.0131 | 0 | 0.0000 |
| 8 | | 0.00 | (6/8) 7 | 455 | 2,830 | 0.0093 | 0 | 0.0000 |
| 10 | | 0.00 | (8/10) 9 | 985 | 2,109 | 0.0069 | 0 | 0.0000 |
| 12 | | 0.00 | (10/12) 11 | 1,825 | 1,695 | 0.0056 | 0 | 0.0000 |
| 14 | 6.3 | 2.95 | (12/14) 13 | 4,300 | 1,414 | 0.0046 | 6,226 | 0.4209 |
| 16 | 20.3 | 9.51 | (14/16) 15 | 5,700 | 1,210 | 0.0040 | 26,592 | 1.3166 |
| 18 | 24.7 | 11.57 | (16/18) 17 | 7,300 | 1,056 | 0.0035 | 41,438 | 1.5626 |
| 20 | 41.7 | 19.53 | (18/20) 19 | 9,500 | 936 | 0.0031 | 91,041 | 2.6972 |
| 25 | 27 | 12.65 | (20/25) 22.5 | 14,500 | 779 | 0.0026 | 89,972 | 1.8463 |
| 30 | 38.1 | 17.85 | (25/30) 27.5 | 26,500 | 626 | 0.0021 | 232,032 | 3.0748 |
| 35 | 38.8 | 18.17 | (30/35) 32.5 | 46,000 | 522 | 0.0017 | 410,173 | 3.7794 |
| 40 | 13.2 | 6.18 | (35/40) 37.5 | 76,000 | 447 | 0.0015 | 230,550 | 1.5578 |
| 45 | 1.4 | 0.66 | (40/45) 42.5 | 120,000 | 390 | 0.0013 | 38,609 | 0.1986 |
| 50 | 0.5 | 0.23 | (45/50) 47.5 | 175,000 | 345 | 0.0011 | 20,109 | 0.0809 |
| 60 | 0.2 | 0.09 | (50/60) 55 | 285,000 | 294 | 0.0010 | 13,099 | 0.0383 |
| 100 | 0.5 | 0.23 | (60/100) 80 | 809,674 | 177 | 0.0006 | 93,037 | 0.0986 |
| Pan | 0.8 | 0.37 | (-100) 209 | 15,470,594 | 69 | 0.0002 | 2,844,295 | 0.4579 |
| Total: % | 213.5 | 100.00 | | | | SUM: | 4,137,174 | 17.13 |

BL-RWM (-12/+50) R-10-371   Bulk Density (lbs/ft³): 41.9

2102

| Screen size (U.S. mesh) | Amt. retained (g) | % wt. retained | Average mesh | Multiplier (ASTM) | Ave. particle size (micron) | Ave. particle size (ft) | particle count/lb | Ext. Surface Area/Pound (ft²/lb) |
|---|---|---|---|---|---|---|---|---|
| 6 |  | 0.00 | (4/6) 5 | 162 | 4,000 | 0.0131 | 0 | 0.0000 |
| 8 |  | 0.00 | (6/8) 7 | 455 | 2,830 | 0.0093 | 0 | 0.0000 |
| 10 |  | 0.00 | (8/10) 9 | 985 | 2,109 | 0.0069 | 0 | 0.0000 |
| 12 | 0.1 | 0.05 | (10/12) 11 | 1,825 | 1,695 | 0.0056 | 67 | 0.0065 |
| 14 | 5.3 | 2.60 | (12/14) 13 | 4,300 | 1,414 | 0.0046 | 8,395 | 0.5676 |
| 16 | 14.7 | 7.20 | (14/16) 15 | 5,700 | 1,210 | 0.0040 | 30,864 | 1.5280 |
| 18 | 16.6 | 8.13 | (16/18) 17 | 7,300 | 1,056 | 0.0035 | 44,636 | 1.6832 |
| 20 | 22.7 | 11.12 | (18/20) 19 | 9,500 | 936 | 0.0031 | 79,433 | 2.3533 |
| 25 | 19 | 9.31 | (20/25) 22.5 | 14,500 | 779 | 0.0026 | 101,479 | 2.0824 |
| 30 | 34.4 | 16.85 | (25/30) 27.5 | 26,500 | 626 | 0.0021 | 335,782 | 4.4497 |
| 35 | 33.7 | 16.51 | (30/35) 32.5 | 46,000 | 522 | 0.0017 | 571,007 | 5.2614 |
| 40 | 23.7 | 11.61 | (35/40) 37.5 | 76,000 | 447 | 0.0015 | 663,461 | 4.4828 |
| 45 | 17.4 | 8.53 | (40/45) 42.5 | 120,000 | 390 | 0.0013 | 769,102 | 3.9558 |
| 50 | 12 | 5.88 | (45/50) 47.5 | 175,000 | 345 | 0.0011 | 773,522 | 3.1134 |
| 60 | 2.8 | 1.37 | (50/60) 55 | 285,000 | 294 | 0.0010 | 293,938 | 0.8592 |
| 100 | 0.5 | 0.24 | (60/100) 80 | 809,674 | 177 | 0.0006 | 149,119 | 0.1580 |
| Pan | 1.2 | 0.59 | (-100) 209 | 15,470,594 | 69 | 0.0002 | 6,838,199 | 1.1009 |
| Total: % | 204.1 | 100.00 |  |  |  | SUM: | 10,659,005 | 31.60 |

BL-RVM (-5/+30) R-10-079  Bulk Density (lbs/ft³): 46.22

2202

| Screen size (U.S. mesh) | Amt. retained (g) | % wt. retained | Average mesh | Multiplier (ASTM) | Ave. particle size (micron) | Ave. particle size (ft) | particle count/lb | Ext. Surface Area/Pound (ft²/lb) |
|---|---|---|---|---|---|---|---|---|
| 6 | 4.2 | 2.10 | (4/6) 5 | 162 | 4,000 | 0.0131 | 232 | 0.1254 |
| 8 | 62.7 | 31.35 | (6/8) 7 | 455 | 2,830 | 0.0093 | 9,721 | 2.6328 |
| 10 | 29.9 | 14.95 | (8/10) 9 | 985 | 2,109 | 0.0069 | 10,036 | 1.5095 |
| 12 | 31.8 | 15.90 | (10/12) 11 | 1,825 | 1,695 | 0.0056 | 19,776 | 1.9223 |
| 14 | 25.4 | 12.70 | (12/14) 13 | 4,300 | 1,414 | 0.0046 | 37,218 | 2.5164 |
| 16 | 13.7 | 6.85 | (14/16) 15 | 5,700 | 1,210 | 0.0040 | 26,610 | 1.3175 |
| 18 | 11.1 | 5.55 | (16/18) 17 | 7,300 | 1,056 | 0.0035 | 27,612 | 1.0412 |
| 20 | 12 | 6.00 | (18/20) 19 | 9,500 | 936 | 0.0031 | 38,847 | 1.1509 |
| 25 | 4.4 | 2.20 | (20/25) 22.5 | 14,500 | 779 | 0.0026 | 21,741 | 0.4461 |
| 30 | 2.5 | 1.25 | (25/30) 27.5 | 26,500 | 626 | 0.0021 | 22,575 | 0.2992 |
| 35 |  | 0.00 | (30/35) 32.5 | 46,000 | 522 | 0.0017 | 0 | 0.0000 |
| 40 |  | 0.00 | (35/40) 37.5 | 76,000 | 447 | 0.0015 | 0 | 0.0000 |
| 45 |  | 0.00 | (40/45) 42.5 | 120,000 | 390 | 0.0013 | 0 | 0.0000 |
| 50 |  | 0.00 | (45/50) 47.5 | 175,000 | 345 | 0.0011 | 0 | 0.0000 |
| 60 |  | 0.00 | (50/60) 55 | 285,000 | 294 | 0.0010 | 0 | 0.0000 |
| 100 | 1.6 | 0.80 | (60/100) 80 | 809,674 | 177 | 0.0006 | 441,449 | 0.4677 |
| Pan | 0.7 | 0.35 | (-100) 209 | 15,470,594 | 69 | 0.0002 | 3,690,249 | 0.5941 |
| Total: % | 200 | 100.00 |  |  |  | SUM: | 4,346,066 | 14.02 |

Stock Wyo-Ben Bentonite (-12/+40) R-10-342       Bulk Density (lbs/ft3): 64.86

| Screen size (U.S. mesh) | Amt. retained (g) | % wt. retained | Average mesh | Multiplier (ASTM) | Ave. particle size (micron) | Ave. particle size (ft) | particle count/lb | Ext. Surface Area/Pound (ft2/lb) |
|---|---|---|---|---|---|---|---|---|
| 6 | | 0.00 | (4/6) 5 | 162 | 4,000 | 0.0131 | 0 | 0.0000 |
| 8 | | 0.00 | (6/8) 7 | 455 | 2,830 | 0.0093 | 0 | 0.0000 |
| 10 | | 0.00 | (8/10) 9 | 985 | 2,109 | 0.0069 | 0 | 0.0000 |
| 12 | 0.3 | 0.15 | (10/12) 11 | 1,825 | 1,695 | 0.0056 | 132 | 0.0129 |
| 14 | 7.2 | 3.59 | (12/14) 13 | 4,300 | 1,414 | 0.0046 | 7,492 | 0.5065 |
| 16 | 22.1 | 11.01 | (14/16) 15 | 5,700 | 1,210 | 0.0040 | 30,483 | 1.5092 |
| 18 | 27.1 | 13.50 | (16/18) 17 | 7,300 | 1,056 | 0.0035 | 47,872 | 1.8052 |
| 20 | 41.6 | 20.73 | (18/20) 19 | 9,500 | 936 | 0.0031 | 95,632 | 2.8332 |
| 25 | 25.2 | 12.56 | (20/25) 22.5 | 14,500 | 779 | 0.0026 | 88,421 | 1.8145 |
| 30 | 32.3 | 16.09 | (25/30) 27.5 | 26,500 | 626 | 0.0021 | 207,126 | 2.7448 |
| 35 | 32.4 | 16.14 | (30/35) 32.5 | 46,000 | 522 | 0.0017 | 360,653 | 3.3232 |
| 40 | 10.5 | 5.23 | (35/40) 37.5 | 76,000 | 447 | 0.0015 | 193,103 | 1.3047 |
| 45 | | 0.00 | (40/45) 42.5 | 120,000 | 390 | 0.0013 | 0 | 0.0000 |
| 50 | 1.5 | 0.75 | (45/50) 47.5 | 175,000 | 345 | 0.0011 | 63,521 | 0.2557 |
| 60 | 0.2 | 0.10 | (50/60) 55 | 285,000 | 294 | 0.0010 | 13,793 | 0.0403 |
| 100 | 0 | 0.00 | (60/100) 80 | 809,674 | 177 | 0.0006 | 0 | 0.0000 |
| Pan | 0.3 | 0.15 | (-100) 209 | 15,470,594 | 69 | 0.0002 | 1,123,090 | 0.1808 |
| Total: % | 200.7 | 100.00 | | | | SUM: | 2,231,317 | 16.33 |

BL-RM (−12/+20) R-10-079     Bulk Density (lbs/ft³): 39.75

2402

| Screen size (U.S. mesh) | Amt. retained (g) | % wt. retained | Average mesh | Multiplier (ASTM) | Ave. particle size (micron) | Ave. particle size (ft) | particle count/lb | Ext. Surface Area/Pound (ft²/lb) |
|---|---|---|---|---|---|---|---|---|
| 6 | | 0.00 | (4/6) 5 | 162 | 4,000 | 0.0131 | 0 | 0.0000 |
| 8 | | 0.00 | (6/8) 7 | 455 | 2,830 | 0.0093 | 0 | 0.0000 |
| 10 | | 0.00 | (8/10) 9 | 985 | 2,109 | 0.0069 | 0 | 0.0000 |
| 12 | 0.4 | 0.20 | (10/12) 11 | 1,825 | 1,695 | 0.0056 | 289 | 0.0281 |
| 14 | 21 | 10.49 | (12/14) 13 | 4,300 | 1,414 | 0.0046 | 35,761 | 2.4179 |
| 16 | 57.3 | 28.64 | (14/16) 15 | 5,700 | 1,210 | 0.0040 | 129,347 | 6.4039 |
| 18 | 61.8 | 30.88 | (16/18) 17 | 7,300 | 1,056 | 0.0035 | 178,664 | 6.7373 |
| 20 | 53.9 | 26.94 | (18/20) 19 | 9,500 | 936 | 0.0031 | 202,786 | 6.0077 |
| 25 | 3.2 | 1.60 | (20/25) 22.5 | 14,500 | 779 | 0.0026 | 18,376 | 0.3771 |
| 30 | 0.8 | 0.40 | (25/30) 27.5 | 26,500 | 626 | 0.0021 | 8,396 | 0.1113 |
| 35 | 0.4 | 0.20 | (30/35) 32.5 | 46,000 | 522 | 0.0017 | 7,287 | 0.0671 |
| 40 | 0.2 | 0.10 | (35/40) 37.5 | 76,000 | 447 | 0.0015 | 6,020 | 0.0407 |
| 45 | | 0.00 | (40/45) 42.5 | 120,000 | 390 | 0.0013 | 0 | 0.0000 |
| 50 | 0.3 | 0.15 | (45/50) 47.5 | 175,000 | 345 | 0.0011 | 20,791 | 0.0837 |
| 60 | 0.1 | 0.05 | (50/60) 55 | 285,000 | 294 | 0.0010 | 11,287 | 0.0330 |
| 100 | 0.3 | 0.15 | (60/100) 80 | 809,674 | 177 | 0.0006 | 96,196 | 0.1019 |
| Pan | 0.4 | 0.20 | (−100) | 15,470,594 | 69 | 0.0002 | 2,450,718 | 0.3946 |
| Total: % | 200.1 | 100.00 | | | | SUM: | 3,165,918 | 22.80 |

Wyo-Ben FS-30 Sodium Bentonite (−12/+40) R-10-668  Bulk Density (lbs/ft³): 63.3

2502

| Screen size (U.S. mesh) | Amt. retained (g) | % wt. retained | Average mesh | Multiplier (ASTM) | Ave. particle size (micron) | Ave. particle size (ft) | particle count/lb | Ext. Surface Area/Pound (ft²/lb) |
|---|---|---|---|---|---|---|---|---|
| 6 | 0 | 0.00 | (4/6) 5 | 162 | 4,000 | 0.0131 | 0 | 0.0000 |
| 8 | 0 | 0.00 | (6/8) 7 | 455 | 2,830 | 0.0093 | 0 | 0.0000 |
| 10 | 0 | 0.00 | (8/10) 9 | 985 | 2,109 | 0.0069 | 0 | 0.0000 |
| 12 | 0.6 | 0.30 | (10/12) 11 | 1,825 | 1,695 | 0.0056 | 273 | 0.0265 |
| 14 | 21.4 | 10.73 | (12/14) 13 | 4,300 | 1,414 | 0.0046 | 22,953 | 1.5519 |
| 16 | 30.3 | 15.19 | (14/16) 15 | 5,700 | 1,210 | 0.0040 | 43,081 | 2.1329 |
| 18 | 30.4 | 15.24 | (16/18) 17 | 7,300 | 1,056 | 0.0035 | 55,355 | 2.0874 |
| 20 | 42.5 | 21.30 | (18/20) 19 | 9,500 | 936 | 0.0031 | 100,711 | 2.9837 |
| 25 | 23.3 | 11.68 | (20/25) 22.5 | 14,500 | 779 | 0.0026 | 84,273 | 1.7293 |
| 30 | 29 | 14.54 | (25/30) 27.5 | 26,500 | 626 | 0.0021 | 191,694 | 2.5402 |
| 35 | 0 | 0.00 | (30/35) 32.5 | 46,000 | 522 | 0.0017 | 0 | 0.0000 |
| 40 | 17.5 | 8.77 | (35/40) 37.5 | 76,000 | 447 | 0.0015 | 331,754 | 2.2416 |
| 45 | 0 | 0.00 | (40/45) 42.5 | 120,000 | 390 | 0.0013 | 0 | 0.0000 |
| 50 | 1.5 | 0.75 | (45/50) 47.5 | 175,000 | 345 | 0.0011 | 65,478 | 0.2635 |
| 60 | 0.5 | 0.25 | (50/60) 55 | 285,000 | 294 | 0.0010 | 35,545 | 0.1039 |
| 100 | 0.5 | 0.25 | (60/100) 80 | 809,674 | 177 | 0.0006 | 100,982 | 0.1070 |
| Pan | 2 | 1.00 | (−100) 209 | 15,470,594 | 69 | 0.0002 | 7,717,932 | 1.2426 |
| Total: % | 199.5 | 100.00 | | | | SUM: | 8,750,030 | 17.01 |

FIG. 26

Paper granule Biodac 10/30 R-09-147    2602    Bulk Density (lbs/ft³): 46.5

| Screen size (U.S. mesh) | Amt. retained (g) | % wt. retained | Average mesh | | Multiplier (ASTM) | Ave. particle size (micron) | Ave. particle size (ft) | particle count/lb | Ext. Surface Area/Pound (ft²/lb) |
|---|---|---|---|---|---|---|---|---|---|
| 6 | 0 | 0.00 | (4/6) | 5 | 162 | 4,000 | 0.0131 | 0 | 0.0000 |
| 8 | 0.1 | 0.05 | (6/8) | 7 | 455 | 2,830 | 0.0093 | 15 | 0.0040 |
| 10 | 7.9 | 3.80 | (8/10) | 9 | 985 | 2,109 | 0.0069 | 2,536 | 0.3814 |
| 12 | 34.3 | 16.50 | (10/12) | 11 | 1,825 | 1,695 | 0.0056 | 20,397 | 1.9826 |
| 14 | 40 | 19.24 | (12/14) | 13 | 4,300 | 1,414 | 0.0046 | 56,044 | 3.7892 |
| 16 | 30.3 | 14.57 | (14/16) | 15 | 5,700 | 1,210 | 0.0040 | 56,276 | 2.7862 |
| 18 | 30.8 | 14.81 | (16/18) | 17 | 7,300 | 1,056 | 0.0035 | 73,262 | 2.7626 |
| 20 | 43.6 | 20.97 | (18/20) | 19 | 9,500 | 936 | 0.0031 | 134,963 | 3.9984 |
| 25 | 0 | 0.00 | (20/25) | 22.5 | 14,500 | 779 | 0.0026 | 0 | 0.0000 |
| 30 | 19.6 | 9.43 | (25/30) | 27.5 | 26,500 | 626 | 0.0021 | 169,241 | 2.2427 |
| 35 | 0 | 0.00 | (30/35) | 32.5 | 46,000 | 522 | 0.0017 | 0 | 0.0000 |
| 40 | 1.2 | 0.58 | (35/40) | 37.5 | 76,000 | 447 | 0.0015 | 29,717 | 0.2008 |
| 45 | 0 | 0.00 | (40/45) | 42.5 | 120,000 | 390 | 0.0013 | 0 | 0.0000 |
| 50 | 0.1 | 0.05 | (45/50) | 47.5 | 175,000 | 345 | 0.0011 | 5,702 | 0.0230 |
| 60 | 0 | 0.00 | (50/60) | 55 | 285,000 | 294 | 0.0010 | 0 | 0.0000 |
| 100 | 0 | 0.00 | (60/100) | 80 | 809,674 | 177 | 0.0006 | 0 | 0.0000 |
| Pan | 0 | 0.00 | (−100) | 209 | 15,470,594 | 69 | 0.0002 | 0 | 0.0000 |
| Total: % | 207.9 | 100.00 | | | | | SUM: | 548,151 | 18.17 |

FIG. 27

Wood fiber     Bulk Density (lbs/ft³): 7.5

2702

| Screen size (U.S. mesh) | Amt. retained (g) | % wt. retained | Average mesh | Multiplier (ASTM) | Ave. particle size (micron) | Ave. particle size (ft) | particle count/lb | Ext. Surface Area/Pound (ft²/lb) |
|---|---|---|---|---|---|---|---|---|
| 6 | | 0.00 | (4/6) 5 | 162 | 4,000 | 0.0131 | 0 | 0.0000 |
| 8 | | 0.00 | (6/8) 7 | 455 | 2,830 | 0.0093 | 0 | 0.0000 |
| 10 | 9.2 | 9.58 | (8/10) 9 | 985 | 2,109 | 0.0069 | 39,673 | 5.9671 |
| 12 | 32.9 | 34.27 | (10/12) 11 | 1,825 | 1,695 | 0.0056 | 262,861 | 25.5509 |
| 14 | 23.1 | 24.06 | (12/14) 13 | 4,300 | 1,414 | 0.0046 | 434,859 | 29.4013 |
| 16 | 14.8 | 15.42 | (14/16) 15 | 5,700 | 1,210 | 0.0040 | 369,321 | 18.2850 |
| 18 | 5.7 | 5.94 | (16/18) 17 | 7,300 | 1,056 | 0.0035 | 182,165 | 6.8693 |
| 20 | 6.5 | 6.77 | (18/20) 19 | 9,500 | 936 | 0.0031 | 270,336 | 8.0090 |
| 25 | 2.1 | 2.19 | (20/25) 22.5 | 14,500 | 779 | 0.0026 | 133,308 | 2.7356 |
| 30 | 0.5 | 0.52 | (25/30) 27.5 | 26,500 | 626 | 0.0021 | 58,007 | 0.7687 |
| 35 | | 0.00 | (30/35) 32.5 | 46,000 | 522 | 0.0017 | 0 | 0.0000 |
| 40 | 0.5 | 0.52 | (35/40) 37.5 | 76,000 | 447 | 0.0015 | 166,361 | 1.1241 |
| 45 | | 0.00 | (40/45) 42.5 | 120,000 | 390 | 0.0013 | 0 | 0.0000 |
| 50 | 0.3 | 0.31 | (45/50) 47.5 | 175,000 | 345 | 0.0011 | 229,841 | 0.9251 |
| 60 | 0.1 | 0.10 | (50/60) 55 | 285,000 | 294 | 0.0010 | 124,771 | 0.3647 |
| 100 | 0.1 | 0.10 | (60/100) 80 | 809,674 | 177 | 0.0006 | 354,469 | 0.3755 |
| Pan | 0.2 | 0.21 | (-100) 209 | 15,470,594 | 69 | 0.0002 | 13,545,800 | 2.1808 |
| Total: % | 96 | 100.00 | | | | SUM: | 16,171,772 | 102.56 |

Bulk Density (lbs/ft³): 49.7

| Barley | | | | | | | |
|---|---|---|---|---|---|---|---|
| Screen size (U.S. mesh) | Amt. retained (g) | % wt. retained | Average mesh | Multiplier (ASTM) | Ave. particle size (micron) | Ave. particle size (ft) | particle count/lb | Ext. Surface Area/Pound (ft²/lb) |
| 6 | | 0.00 | (4/6) 5 | 162 | 4,000 | 0.0131 | 0 | 0.0000 |
| 8 | | 0.00 | (6/8) 7 | 455 | 2,830 | 0.0093 | 0 | 0.0000 |
| 10 | 0.9 | 0.45 | (8/10) 9 | 985 | 2,109 | 0.0069 | 281 | 0.0422 |
| 12 | 11.7 | 5.85 | (10/12) 11 | 1,825 | 1,695 | 0.0056 | 6,762 | 0.6573 |
| 14 | 93.5 | 46.73 | (12/14) 13 | 4,300 | 1,414 | 0.0046 | 127,324 | 8.6085 |
| 16 | 75 | 37.48 | (14/16) 15 | 5,700 | 1,210 | 0.0040 | 135,384 | 6.7028 |
| 18 | 17.8 | 8.90 | (16/18) 17 | 7,300 | 1,056 | 0.0035 | 41,150 | 1.5517 |
| 20 | 0.8 | 0.40 | (18/20) 19 | 9,500 | 936 | 0.0031 | 2,407 | 0.0713 |
| 25 | | 0.00 | (20/25) 22.5 | 14,500 | 779 | 0.0026 | 0 | 0.0000 |
| 30 | | 0.00 | (25/30) 27.5 | 26,500 | 626 | 0.0021 | 0 | 0.0000 |
| 35 | | 0.00 | (30/35) 32.5 | 46,000 | 522 | 0.0017 | 0 | 0.0000 |
| 40 | | 0.00 | (35/40) 37.5 | 76,000 | 447 | 0.0015 | 0 | 0.0000 |
| 45 | | 0.00 | (40/45) 42.5 | 120,000 | 390 | 0.0013 | 0 | 0.0000 |
| 50 | | 0.00 | (45/50) 47.5 | 175,000 | 345 | 0.0011 | 0 | 0.0000 |
| 60 | | 0.00 | (50/60) 55 | 285,000 | 294 | 0.0010 | 0 | 0.0000 |
| 100 | | 0.00 | (60/100) 80 | 809,674 | 177 | 0.0006 | 0 | 0.0000 |
| Pan | 0.4 | 0.20 | (−100) 209 | 15,470,594 | 69 | 0.0002 | 1,959,738 | 0.3155 |
| Total: % | 200.1 | 100.00 | | | | SUM: | 2,273,046 | 17.95 |

Engineered light weight sodium bentonite (−12/+40)    2902    Bulk Density (lbs/ft³): 49.66

| Screen size (U.S. mesh) | Amt. retained (g) | % wt. retained | Average mesh | | Multiplier (ASTM) | Ave. particle size (micron) | Ave. particle size (ft) | particle count/lb | Ext. Surface Area/Pound (ft²/lb) |
|---|---|---|---|---|---|---|---|---|---|
| 6 | 0 | 0.00 | (4/6) | 5 | 162 | 4,000 | 0.0131 | 0 | 0.0000 |
| 8 | 0 | 0.00 | (6/8) | 7 | 455 | 2,830 | 0.0093 | 0 | 0.0000 |
| 10 | 0 | 0.00 | (8/10) | 9 | 985 | 2,109 | 0.0069 | 0 | 0.0000 |
| 12 | 0.1 | 0.05 | (10/12) | 11 | 1,825 | 1,695 | 0.0056 | 63 | 0.0061 |
| 14 | 10.7 | 5.79 | (12/14) | 13 | 4,300 | 1,414 | 0.0046 | 15,784 | 1.0672 |
| 16 | 41 | 22.17 | (14/16) | 15 | 5,700 | 1,210 | 0.0040 | 80,173 | 3.9693 |
| 18 | 36.9 | 19.96 | (16/18) | 17 | 7,300 | 1,056 | 0.0035 | 92,409 | 3.4847 |
| 20 | 38.1 | 20.61 | (18/20) | 19 | 9,500 | 936 | 0.0031 | 124,170 | 3.6786 |
| 25 | 20.4 | 11.03 | (20/25) | 22.5 | 14,500 | 779 | 0.0026 | 101,476 | 2.0824 |
| 30 | 14.9 | 8.06 | (25/30) | 27.5 | 26,500 | 626 | 0.0021 | 135,456 | 1.7950 |
| 35 | 0 | 0.00 | (30/35) | 32.5 | 46,000 | 522 | 0.0017 | 0 | 0.0000 |
| 40 | 18.7 | 10.11 | (35/40) | 37.5 | 76,000 | 447 | 0.0015 | 487,553 | 3.2943 |
| 45 | 0 | 0.00 | (40/45) | 42.5 | 120,000 | 390 | 0.0013 | 0 | 0.0000 |
| 50 | 2.7 | 1.46 | (45/50) | 47.5 | 175,000 | 345 | 0.0011 | 162,095 | 0.6524 |
| 60 | 0.2 | 0.11 | (50/60) | 55 | 285,000 | 294 | 0.0010 | 19,554 | 0.0572 |
| 100 | 0.2 | 0.11 | (60/100) | 80 | 809,674 | 177 | 0.0006 | 55,553 | 0.0589 |
| Pan | 1 | 0.54 | (−100) | 209 | 15,470,594 | 69 | 0.0002 | 5,307,303 | 0.8545 |
| Total: % | 184.9 | 100.00 | | | | | SUM: | 6,581,590 | 21.00 |

Wyo-Ben FS-30 Sodium Bentonite (−12/+40) R−11−912 Bulk Density (lbs/ft³): 65.74

3002

| Screen size (U.S. mesh) | Amt. retained (g) | % wt. retained | Average mesh | | Multiplier (ASTM) | Ave. particle size (micron) | Ave. particle size (ft) | particle count/lb | Ext. Surface Area/Pound (ft²/lb) |
|---|---|---|---|---|---|---|---|---|---|
| 6 | | 0.00 | (4/6) | 5 | 162 | 4,000 | 0.0131 | 0 | 0.0000 |
| 8 | | 0.00 | (6/8) | 7 | 455 | 2,830 | 0.0093 | 0 | 0.0000 |
| 10 | 0 | 0.00 | (8/10) | 9 | 985 | 2,109 | 0.0069 | 0 | 0.0000 |
| 12 | 0.3 | 0.10 | (10/12) | 11 | 1,825 | 1,695 | 0.0056 | 91 | 0.0089 |
| 14 | 13.4 | 4.67 | (12/14) | 13 | 4,300 | 1,414 | 0.0046 | 9,623 | 0.6506 |
| 16 | 26.2 | 9.13 | (14/16) | 15 | 5,700 | 1,210 | 0.0040 | 24,942 | 1.2349 |
| 18 | 31.6 | 11.01 | (16/18) | 17 | 7,300 | 1,056 | 0.0035 | 38,527 | 1.4528 |
| 20 | 35.3 | 12.30 | (18/20) | 19 | 9,500 | 936 | 0.0031 | 56,008 | 1.6593 |
| 25 | 46.3 | 16.14 | (20/25) | 22.5 | 14,500 | 779 | 0.0026 | 112,124 | 2.3009 |
| 30 | 54.7 | 19.07 | (25/30) | 27.5 | 26,500 | 626 | 0.0021 | 242,094 | 3.2081 |
| 35 | | 0.00 | (30/35) | 32.5 | 46,000 | 522 | 0.0017 | 0 | 0.0000 |
| 40 | 70.1 | 24.43 | (35/40) | 37.5 | 76,000 | 447 | 0.0015 | 889,779 | 6.0120 |
| 45 | | 0.00 | (40/45) | 42.5 | 120,000 | 390 | 0.0013 | 0 | 0.0000 |
| 50 | 8.3 | 2.89 | (45/50) | 47.5 | 175,000 | 345 | 0.0011 | 242,586 | 0.9764 |
| 60 | 0.5 | 0.17 | (50/60) | 55 | 285,000 | 294 | 0.0010 | 23,799 | 0.0696 |
| 100 | 0.1 | 0.03 | (60/100) | 80 | 809,674 | 177 | 0.0006 | 13,523 | 0.0143 |
| Pan | 0.1 | 0.03 | (−100) | 209 | 15,470,594 | 69 | 0.0002 | 258,379 | 0.0416 |
| Total: % | 286.9 | 100.00 | | | | | SUM: | 1,911,475 | 17.63 |

FIG.31

BL-RWM (-10/+24) R-11-260          Bulk Density (lbs/ft3): 42.1

3102

| Screen size (U.S. mesh) | Amt. retained (g) | % wt. retained | Average mesh | Multiplier (ASTM) | Ave. particle size (micron) | Ave. particle size (ft) | particle count/lb | Ext. Surface Area/Pound (ft²/lb) |
|---|---|---|---|---|---|---|---|---|
| 6 | | 0.00 | (4/6) 5 | 162 | 4,000 | 0.0131 | 0 | 0.0000 |
| 8 | | 0.00 | (6/8) 7 | 455 | 2,830 | 0.0093 | 0 | 0.0000 |
| 10 | 0.4 | 0.19 | (8/10) 9 | 985 | 2,109 | 0.0069 | 137 | 0.0206 |
| 12 | 8.8 | 4.08 | (10/12) 11 | 1,825 | 1,695 | 0.0056 | 5,572 | 0.5416 |
| 14 | 37.9 | 17.58 | (12/14) 13 | 4,300 | 1,414 | 0.0046 | 56,544 | 3.8230 |
| 16 | 43.7 | 20.27 | (14/16) 15 | 5,700 | 1,210 | 0.0040 | 86,424 | 4.2788 |
| 18 | 44.6 | 20.69 | (16/18) 17 | 7,300 | 1,056 | 0.0035 | 112,962 | 4.2597 |
| 20 | 39.4 | 18.27 | (18/20) 19 | 9,500 | 936 | 0.0031 | 129,866 | 3.8474 |
| 25 | 32.4 | 15.03 | (20/25) 22.5 | 14,500 | 779 | 0.0026 | 163,001 | 3.3449 |
| 30 | 6.6 | 3.06 | (25/30) 27.5 | 26,500 | 626 | 0.0021 | 60,683 | 0.8041 |
| 35 | | 0.00 | (30/35) 32.5 | 46,000 | 522 | 0.0017 | 0 | 0.0000 |
| 40 | 1.3 | 0.60 | (35/40) 37.5 | 76,000 | 447 | 0.0015 | 34,279 | 0.2316 |
| 45 | | 0.00 | (40/45) 42.5 | 120,000 | 390 | 0.0013 | 0 | 0.0000 |
| 50 | 0.2 | 0.09 | (45/50) 47.5 | 175,000 | 345 | 0.0011 | 12,144 | 0.0489 |
| 60 | 0 | 0.00 | (50/60) 55 | 285,000 | 294 | 0.0010 | 0 | 0.0000 |
| 100 | 0.1 | 0.05 | (60/100) 80 | 809,674 | 177 | 0.0006 | 28,092 | 0.0298 |
| Pan | 0.2 | 0.09 | (-100) 209 | 15,470,594 | 69 | 0.0002 | 1,073,528 | 0.1728 |
| Total: % | 215.6 | 100.00 | | | | SUM: | 1,763,232 | 21.40 |

FIG. 32

GA-RVM (−12/+24) out of GA (R−10−663)     3202     Bulk Density (lbs/ft³): 32.5

| Screen size (U.S. mesh) | Amt. retained (g) | % wt. retained | Average mesh | | Multiplier (ASTM) | Ave. particle size (micron) | Ave. particle size (ft) | particle count/lb | Ext. Surface Area/Pound (ft²/lb) | Average particle size, micron |
|---|---|---|---|---|---|---|---|---|---|---|
| 6 | | 0.00 | (4/6) | 5 | 162 | 4,000 | 0.0131 | 0 | 0.0000 | 0 |
| 8 | | 0.00 | (6/8) | 7 | 455 | 2,830 | 0.0093 | 0 | 0.0000 | 0 |
| 10 | 0 | 0.00 | (8/10) | 9 | 985 | 2,109 | 0.0069 | 0 | 0.0000 | 0 |
| 12 | 0.5 | 0.17 | (10/12) | 11 | 1,825 | 1,695 | 0.0056 | 294 | 0.0286 | 2.823834 |
| 14 | 56.1 | 18.69 | (12/14) | 13 | 4,300 | 1,414 | 0.0046 | 77,779 | 5.2587 | 264.2418 |
| 16 | 78.1 | 26.02 | (14/16) | 15 | 5,700 | 1,210 | 0.0040 | 143,534 | 7.1063 | 314.7935 |
| 18 | 63.2 | 21.05 | (16/18) | 17 | 7,300 | 1,056 | 0.0035 | 148,754 | 5.6094 | 222.3158 |
| 20 | 70 | 23.32 | (18/20) | 19 | 9,500 | 936 | 0.0031 | 214,413 | 6.3522 | 218.2545 |
| 25 | 22.8 | 7.59 | (20/25) | 22.5 | 14,500 | 779 | 0.0026 | 106,594 | 2.1874 | 59.16456 |
| 30 | 6.4 | 2.13 | (25/30) | 27.5 | 26,500 | 626 | 0.0021 | 54,683 | 0.7246 | 13.34577 |
| 35 | | 0.00 | (30/35) | 32.5 | 46,000 | 522 | 0.0017 | 0 | 0.0000 | 0 |
| 40 | 2.3 | 0.77 | (35/40) | 37.5 | 76,000 | 447 | 0.0015 | 56,360 | 0.3808 | 3.424717 |
| 45 | | 0.00 | (40/45) | 42.5 | 120,000 | 390 | 0.0013 | 0 | 0.0000 | 0 |
| 50 | 0.5 | 0.17 | (45/50) | 47.5 | 175,000 | 345 | 0.0011 | 28,212 | 0.1136 | 0.574617 |
| 60 | 0.1 | 0.03 | (50/60) | 55 | 285,000 | 294 | 0.0010 | 9,189 | 0.0269 | 0.097935 |
| 100 | 0 | 0.00 | (60/100) | 80 | 809,674 | 177 | 0.0006 | 0 | 0.0000 | 0 |
| Pan | 0.2 | 0.07 | (−100) | 209 | 15,470,594 | 69 | 0.0002 | 997,622 | 0.1606 | 0.045969 |
| Total: % | 300.2 | 100.00 | | | | | SUM: | 1,837,434 | 27.95 | 1099.083 |

FIG. 33

TF-RM (−10/+24)  Bulk Density (lbs/ft3): 40.0

3302

| Screen size (U.S. mesh) | Amt. retained (g) | % wt. retained | Average mesh | Multiplier (ASTM) | Ave. particle size (micron) | Ave. particle size (ft) | particle count/lb | Ext. Surface Area/Pound (ft2/lb) | Average particle size, micron |
|---|---|---|---|---|---|---|---|---|---|
| 6 | | 0.00 | (4/6) 5 | 162 | 4,000 | 0.0131 | 0 | 0.0000 | 0 |
| 8 | | 0.00 | (6/8) 7 | 455 | 2,830 | 0.0093 | 0 | 0.0000 | 0 |
| 10 | 1.6 | 1.60 | (8/10) 9 | 985 | 2,109 | 0.0069 | 1,241 | 0.1867 | 33.744 |
| 12 | 5 | 5.00 | (10/12) 11 | 1,825 | 1,695 | 0.0056 | 7,186 | 0.6985 | 84.7715 |
| 14 | 13.2 | 13.20 | (12/14) 13 | 4,300 | 1,414 | 0.0046 | 44,699 | 3.0221 | 186.648 |
| 16 | 17.9 | 17.90 | (14/16) 15 | 5,700 | 1,210 | 0.0040 | 80,349 | 3.9780 | 216.59 |
| 18 | 16.7 | 16.70 | (16/18) 17 | 7,300 | 1,056 | 0.0035 | 96,004 | 3.6202 | 176.352 |
| 20 | 20.8 | 20.80 | (18/20) 19 | 9,500 | 936 | 0.0031 | 155,610 | 4.6101 | 194.688 |
| 25 | 10.7 | 10.70 | (20/25) 22.5 | 14,500 | 779 | 0.0026 | 122,181 | 2.5072 | 83.353 |
| 30 | 7.3 | 7.30 | (25/30) 27.5 | 26,500 | 626 | 0.0021 | 152,342 | 2.0188 | 45.698 |
| 35 | | 0.00 | (30/35) 32.5 | 46,000 | 522 | 0.0017 | 0 | 0.0000 | 0 |
| 40 | 6 | 6.00 | (35/40) 37.5 | 76,000 | 447 | 0.0015 | 359,100 | 2.4263 | 26.82 |
| 45 | | 0.00 | (40/45) 42.5 | 120,000 | 390 | 0.0013 | 0 | 0.0000 | 0 |
| 50 | 0.3 | 0.30 | (45/50) 47.5 | 175,000 | 345 | 0.0011 | 41,344 | 0.1664 | 1.035 |
| 60 | 0 | 0.00 | (50/60) 55 | 285,000 | 294 | 0.0010 | 0 | 0.0000 | 0 |
| 100 | 0 | 0.00 | (60/100) 80 | 809,674 | 177 | 0.0006 | 0 | 0.0000 | 0 |
| Pan | 0.5 | 0.50 | (−100) 209 | 15,470,594 | 69 | 0.0002 | 6,091,546 | 0.9807 | 0.345 |
| Total: % | 100 | 100.00 | | | | SUM: | 7,151,601 | 24.22 | 1050.045 |

CAT LITTER PRODUCT

CROSS-REFERENCE TO RELATED APPLICATIONS

This application is a continuation of U.S. application Ser. No. 15/845,373, filed Dec. 18, 2017, now pending, which is a continuation of U.S. application Ser. No. 15/606,805 filed May 26, 2017, now U.S. Pat. No. 9,894,877, which is a continuation of U.S. application Ser. No. 15/492,566 filed Apr. 20, 2017, now abandoned, which is a continuation of U.S. application Ser. No. 15/260,660 filed Sep. 9, 2016, now abandoned, which is a continuation of U.S. application Ser. No. 15/162,296 filed May 23, 2016, now U.S. Pat. No. 9,439,393, which is a divisional of U.S. application Ser. No. 13/524,021 filed Jun. 15, 2012, now U.S. Pat. No. 9,345,227, which claims the benefit of priority to U.S. Provisional Patent Application No. 61/497,178, entitled "Cat Litter Product" filed Jun. 15, 2011. Reference is made to U.S. application Ser. No. 15/053,114 filed Feb. 25, 2016, now U.S. Pat. No. 9,408,368 and PCT/US12/42631 filed Jun. 15, 2012, which claim benefit of priority to U.S. application Ser. No. 13/524,021 filed Jun. 15, 2012, now U.S. Pat. No. 9,345,227. Reference is also made to co-pending application U.S. application Ser. No. 14/012,153 filed Aug. 28, 2013, now U.S. Pat. No. 9,185,878, which in turn claims benefit of priority to U.S. Provisional Patent Application No. 61/497,178 filed Jun. 15, 2011 and U.S. Provisional Patent Application No. 61/694,000, filed Aug. 28, 2012. The content of each of the aforementioned patent applications is incorporated herein by reference in their entirety.

BACKGROUND

Field of the Invention

The present invention relates to cat litter products.

Related Art

Swelling clay made of sodium bentonite has been used to promote clumping in cat litter products but has the disadvantage of being relatively expensive.

SUMMARY

According to a first broad aspect, the present invention provides composition comprising: a blend comprising sodium bentonite and calcium bentonite, wherein sodium bentonite comprises at least 47% of the total external surface area of the blend, wherein the calcium bentonite comprises 5% to 53% of the total external surface area of the blend, wherein 90% of the particles of the sodium bentonite have a particle size of 345 to 1695 µm, and wherein 90% of the particles of the calcium bentonite have a particle size of 626 to 2000 µm.

According to a second broad aspect, the present invention provides a composition comprising: a blend of sodium bentonite and calcium bentonite, wherein the calcium bentonite is coated with a coating comprising polytetrafluoroethylene (PTFE).

According to a third broad aspect, the present invention provides a composition comprising a uniform blend of sodium bentonite and calcium bentonite.

According to fourth broad aspect, the present invention provides a composition comprising: a mixture comprising sodium bentonite and one or more granular filler materials, wherein the one or more granular filler materials comprise one or more cellulose-containing materials, wherein sodium bentonite comprises at least 47% of the total external surface area of the mixture, wherein the one or more granular filler materials comprise 5% to 53% of the total external surface area of the mixture, and wherein the mixture is removably clumpable.

According to fifth broad aspect, the present invention provides a composition comprising: a mixture comprising sodium bentonite and one or more granular filler materials, wherein the one or more granular filler materials comprise one or more non-calcium bentonite clays, wherein sodium bentonite comprises at least 47% of the total external surface area of the mixture, wherein the one or more granular filler materials comprise 5% to 53% of the total external surface area of the mixture, and wherein the mixture is removably clumpable.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

FIG. 12 shows a table providing information about the sodium bentonite used in Blend #1 of Example 3 and Blend #4 of Example 6.

FIG. 13 shows a table providing information about the calcium bentonite used in Blend #1 of Example 3 and Blend #4 of Example 6.

FIG. 14 shows a table providing information about the sodium bentonite used in Blend #2 of Example 4, Blend #3 of Example 5, Blend #15 of Example 17, Blend #16 of Example 18, Blend #17 of Example 19, Blend #18 of Example 20, Blend #19 of Example 21, Blend #20 of Example 22, Blend #21 of Example 23 and Blend #22 of Example 24.

FIG. 15 shows a table providing information about the calcium bentonite used in Blend #2 of Example 4, Blend #17 of Example 19, Blend #18 of Example 20 and Blend #19 of Example 21.

FIG. 16 shows a table providing information about the calcium bentonite used in Blend #3 of Example 5 and Blend #32 of Example 34.

FIG. 17 shows a table providing information about the sodium bentonite used in Blend #5 of Example 7 and Blend #6 of Example 8.

FIG. 18 shows a table providing information about the calcium bentonite used in Blend #5 of Example 7, Blend #6 of Example 8, Blend #7 of Example 9, Blend #8 of Example 10, Blend #9 of Example 11, Blend #10 of Example 12, Blend #11 of Example 13, Blend #12 of Example 14, Blend #13 of Example 15 and Blend #14 of Example 16.

FIG. 19 shows a table providing information about the sodium bentonite used in Blend #7 of Example 9, Blend #8 of Example 10, Blend #9 of Example 11, Blend #10 of Example 12 and Blend #11 of Example 13.

FIG. 20 shows a table providing information about the sodium bentonite used in Blend #12 of Example 14, Blend #13 of Example 15 and Blend #14 of Example 16.

FIG. 21 shows a table providing information about the calcium bentonite used in Blend #15 of Example 17 and Blend #16 of Example 18.

FIG. 22 shows a table providing information about the calcium bentonite used in Blend #20 of Example 22, Blend #21 of Example 23 and Blend #22 of Example 24.

FIG. 23 shows a table providing information about the sodium bentonite used in Blend #23 of Example 25.

FIG. 24 shows a table providing information about the calcium bentonite used in Blend #23 of Example 25.

FIG. 25 shows a table providing information about the sodium bentonite used in Blend #24 of Example 26, Blend #25 of Example 27, Blend #26 of Example 28, Blend #27 of Example 29, Blend #28 of Example 30. Blend #29 of Example 31, Blend #30 of Example 32, Blend #31 of Example 33, the litter of Example 35, Blend #41 of Example 44, Blend #42 of Example 45, Blend #43 of Example 46, Blend #44 of Example 47, Blend #45 of Example 48 and Blend #46 of Example 49.

FIG. 26 shows a table providing information about the paper granules used in Blend #24 of Example 26, Blend #25 of Example 27, Blend #26 of Example 28 and Blend #27 of Example 29.

FIG. 27 shows a table providing information about the wood fiber particles used in Blend #28 of Example 30.

FIG. 28 shows a table providing information about the barley grains used in Blend #29 of Example 31, Blend #30 of Example 32 and Blend #31 of Example 33.

FIG. 29 shows a table providing information about the sodium bentonite used in Blend #32 of Example 34.

FIG. 30 shows a table providing information about the sodium bentonite used in Blend #33 of Example 36, Blend #34 of Example 37, Blend #35 of Example 38, Blend #36 of Example 39, Blend #37 of Example 40 and Blend #37 of Example 40.

FIG. 31 shows a table providing information about the calcium bentonite used in Blend #33 of Example 36, Blend #34 of Example 37, Blend #35 of Example 38, Blend #36 of Example 39, Blend #37 of Example 40 and Blend #37 of Example 40.

FIG. 32 shows a table providing information about the attapulgite used in Blend #41 of Example 44, Blend #42 of Example 45 and Blend #43 of Example 46.

FIG. 33 shows a table providing information about the Taft clay used in Blend #44 of Example 47, Blend #45 of Example 48 and Blend #46 of Example 49.

DETAILED DESCRIPTION OF THE PREFERRED EMBODIMENTS

Definitions

Figure 1:
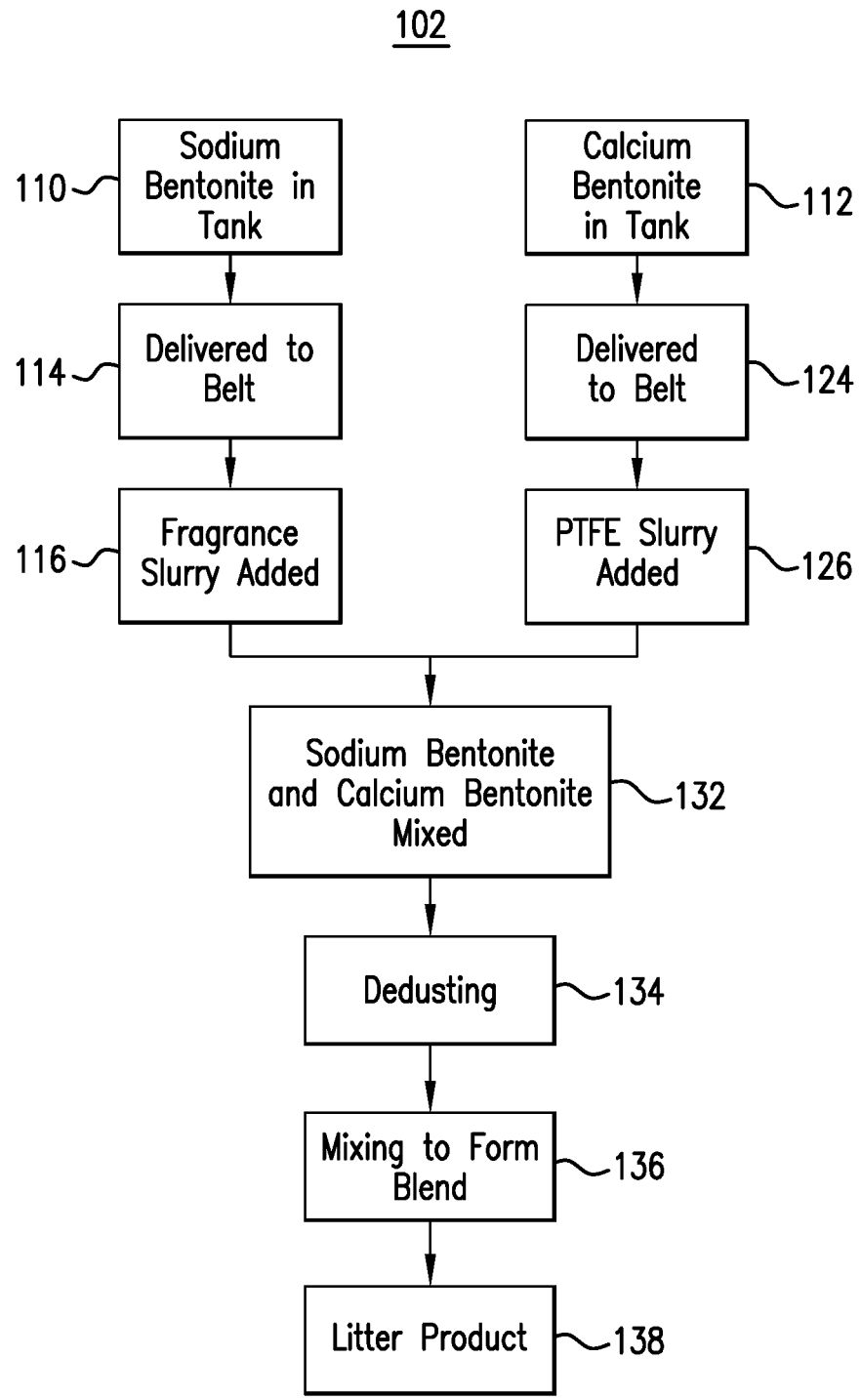
FIG. 1 is a flow chart showing a method of making a litter product according to one embodiment of the present invention.

Where the definition of terms departs from the commonly used meaning of the term, applicant intends to utilize the definitions provided below, unless specifically indicated.

For purposes of the present invention, it should be noted that the singular forms, "a," "an" and "the" include reference to the plural unless the context as herein presented clearly indicates otherwise.

For purposes of the present invention, directional terms such as "top," "bottom," "upper," "lower," "above," "below," "left," "right," "horizontal," "vertical," "up," "down," etc., are merely used for convenience in describing the various embodiments of the present invention. The embodiments of the present invention may be oriented in various ways. For example, the diagrams, apparatuses, etc., shown in the drawing figures may be flipped over, rotated by 90° in any direction, reversed, etc.

For purposes of the present invention, a value or property is "based" on a particular value, property, the satisfaction of a condition or other factor, if that value is derived by performing a mathematical calculation or logical decision using that value, property or other factor.

For purposes of the present invention, the term "blend" refers to a uniform or substantially uniform mixture of two or more solid materials. One or more materials in a blend may be coated.

For purposes of the present invention, the term "cellulose-containing material" refers to a material in which 10% or more of the material is comprised of cellulose. Examples of cellulose-containing materials include paper, wood, seeds, fibers, etc. Examples of suitable seeds and grains for use as filler material include grass seeds and grains such as barley, rice, wheat, corn, maize, etc., pieces and parts thereof, reconstituted parts thereof and mixtures thereof.

For purposes of the present invention, the term "clumping additive" refers to a clumping agent other than sodium bentonite.

For purposes of the present invention, the term "clumping agent" refers to a material that increases the clump strength of a litter material. Examples of clumping agents include sodium bentonite, xanthan gum, guar gum, etc.

For purposes of the present invention, the term "clump strength" refers to the numerical value of average clump strength for a clump of litter material formed by exposing the litter material to a wetting agent approximating urine. The clump strength of a litter material may be determined using one of the clump strength test procedures described below. These procedures include the Standard Drop Method Test and Extreme Drop Method Test described below, as well as other procedures for determining clump strength.

For purposes of the present invention, the term "filler" and the term "filler material" refer to a material in a litter product other than a clumping agent, i.e., other than sodium bentonite or a clumping additive. In one embodiment of the present invention, a filler material may be calcium bentonite.

In one embodiment of the present invention, the filler material may be a cellulose-containing material. In one embodiment of the present invention filler may constitute from 5% to 53% of the total external surface of a litter product. In one embodiment of the present invention filler may constitute from 10% to 53% of the total external surface of a litter product. In one embodiment of the present invention filler may constitute from 15% to 53% of the total external surface of a litter product. In one embodiment of the present invention filler may constitute from 50% to 53% of the total external surface of a litter product.

For purposes of the present invention, the term "fragrance coating" refers to a coating comprising a fragrance. A fragrance coating may include other components.

For purposes of the present invention, the term "granular" refers to a solid material having a particle size below 2 mesh. A solid material used in a mixture of the present invention may be ground to form a granular material.

For purposes of the present invention, the term "granular filler" and the term "granular filler material" refer to a filler that is granular.

For purposes of the present invention, the term "heterogeneous mixture" refers to a composition in which the components of the mixture may be readily separated from each other.

For purposes of the present invention, the term "homogeneous mixture" refers to a composition that is uniform.

For purposes of the present invention, the term "mixture" refers to a composition comprising two or more different components that are mixed but not combined chemically. An individual component of a heterogenous mixture may comprise two substances that are combined chemically, such as calcium bentonite particles coated with polytetrafluoroethylene (PTFE).

For purposes of the present invention, the term "non-calcium bentonite clay" refers to a clay other than calcium bentonite. Because a filler material cannot be sodium bentonite, a "non-calcium bentonite clay" cannot be sodium bentonite.

For purposes of the present invention, the term "removably clumpable" refers to a litter that, when exposed to a wetting agent forms one or more clumps having a firmness of sufficient structural integrity and hardness to withstand mechanical separation from unwetted litter for disposal. A litter material having a clump strength of ≤1.33 using the Standard Drop Method Test (described below) 30 seconds, 1 hour, 12 hours, 24 hours, 36 hours or 72 hours after the clump is formed by exposure to a liquid is removably clumpable. A litter that is removably clumpable, i.e., has a clump strength of ≤1.33 using the Standard Drop Method Test, has a clump strength that is substantially the same as a litter comprised of only the sodium bentonite of the litter.

For purposes of the present invention, the term "substantially uniform" refers to a mixture that has substantially the same density throughout the mixture.

For purposes of the present invention, the term "Taft clay" refers to Antelope shale. Taft clay is porcelanite that is composed of opalaceous material.

For purposes of the present invention, the term "uniform" refers to a mixture of two or more solid materials wherein a measured density of the composition for ten or more samples of the mixture has a standard deviation of no greater than 2.0 lbs/ft$^3$ throughout the mixture. One or more of the solid materials may be coated.

For purposes of the present invention, the term "uniform blend" refers to a blend that is uniform.

For purposes of the present invention, the term "uniform mixture" refers to a mixture that is uniform.

For purposes of the present invention, the term "wetting agent" refers to a liquid that wets a litter. Examples of wetting agents include liquids such as water, aqueous solutions, urine, synthetic urine, etc.

Description

In one embodiment, the present invention provides a litter comprising sodium bentonite and calcium bentonite in which only the calcium bentonite particles are coated in polytetrafluoroethylene (PTFE) as a dedusting agent. Because clumpability for litters comprising mixtures of sodium bentonite with a filler, such as calcium bentonite, is dependent on the total external surface area of the sodium bentonite particles in the litter, by applying a PTFE coating to only the calcium bentonite particles, in one embodiment the present invention provides a litter that is low in dust while not substantially reducing the clumpabilility of the litter.

In one embodiment, the present invention provides a litter product blend of sodium bentonite and calcium bentonite in which 90% of the sodium bentonite particles have a particle size of between 345 and 1695 μm and 90% of the calcium bentonite particles have a particle size of between 626 and 1695 μm. In one embodiment of the present invention, the sodium bentonite particles have an average size of between 450 and 1000 μm and the calcium bentonite particles have an average range between 650 and 2000 μm.

In one embodiment, the present invention provides a litter product comprising a mixture of sodium bentonite and one or more fillers that has emissions of ammonia when exposed to urine that are less than for sodium bentonite alone.

In one embodiment, the present invention provides a litter product comprising sodium bentonite and one or more filler materials, in which the litter product has similar clumpability properties to sodium bentonite of the litter while being less dense than the sodium bentonite alone. In one embodiment, the present invention provides a clumpable litter product employing a cellulose-containing filler material to minimize the amount of sodium bentonite used while still providing clumpability similar to sodium bentonite of the litter.

FIG. 1 shows a method 102 for making a litter product according to one embodiment of the present invention that includes a fragrance. Method 102 starts with a tank 110 containing sodium bentonite granular particles and a tank 112 containing calcium bentonite particles. At step 114 the sodium bentonite particles are delivered from tank 112 to one of a series of conveyor belts that transport the sodium bentonite to a mixing station. At step 116 while the sodium bentonite particles are travelling on one of the conveyors, a fragrance slurry is added to the sodium bentonite particles as a coating. The fragrance slurry is a solution or suspension containing one or more fragrances and possibly other additives. Steps 124 and 126 are conducted at the same time as steps 114 and 116. At step 124 the calcium bentonite particles are delivered from tank 112 to one of a series of conveyor belts that transport the calcium bentonite to a mixing station. At step 126 while the calcium bentonite particles are travelling on one of the conveyors, a PTFE slurry is added to the calcium bentonite particles as a coating. The PTFE slurry is a solution or suspension containing PTFE. At step 132, the coated sodium bentonite particles and coated calcium bentonite particles are brought together to form a litter mixture. At step 134 the litter mixture is dedusted. At step 136 the sodium bentonite and the calcium bentonite are mixed together to form a litter product 138 that is a uniform blend. The fragrance slurry is sprayed onto the sodium bentonite particles in step 116 using a first hydraulic sprayer pump that sprays the fragrance slurry through a first set of flat fan sprayer nozzles to form a fragrance coating. The PTFE slurry is sprayed onto the calcium bentonite particles in step 126 using a second hydraulic sprayer pump that sprays the PTFE slurry through a second set of flat fan sprayer nozzles to form a PTFE coating.

Figure 2:
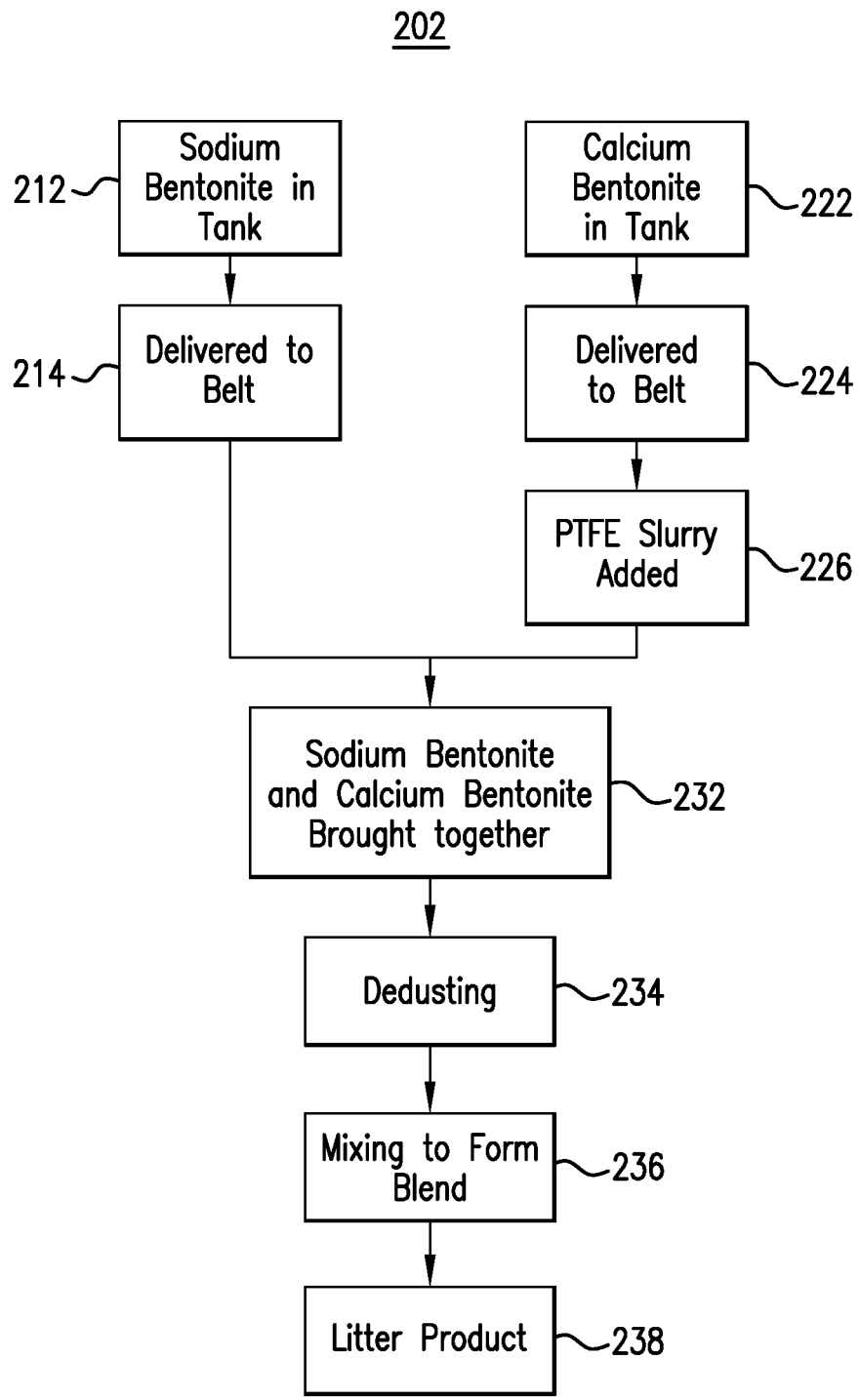
FIG. 2 is a flow chart showing a method of making a fragrance-free litter product according to one embodiment of the present invention.

FIG. 2 shows a method 202 for making a litter product according to one embodiment of the present invention that is fragrance-free. Method 202 starts with a tank 210 containing sodium bentonite granular particles and a tank 212 containing calcium bentonite particles. At step 214 the sodium bentonite particles are delivered from tank 212 to one of a series of conveyor belts that transport the sodium bentonite to a mixing station. Steps 224 and 226 are conducted at the same time as step 214. At step 224 the calcium bentonite particles are delivered from tank 212 to one of a series of conveyor belts that transport the calcium bentonite to a mixing station. At step 226 while the calcium bentonite particles are travelling on one of the conveyors, a PTFE slurry is added to the calcium bentonite particles as a PTFE coating. The PTFE slurry is a solution or suspension containing PTFE. At step 232, the coated sodium bentonite particles and coated calcium bentonite particles are brought together to form a litter mixture. At step 234 the litter mixture is dedusted. At step 236 the sodium bentonite and the calcium bentonite are mixed together to form a litter product 238 that is a uniform blend. The PTFE slurry is sprayed onto the calcium bentonite particles in step 226 using a hydraulic sprayer pump that sprays the PTFE slurry through a second set of flat fan sprayer nozzles.

Figure 3:
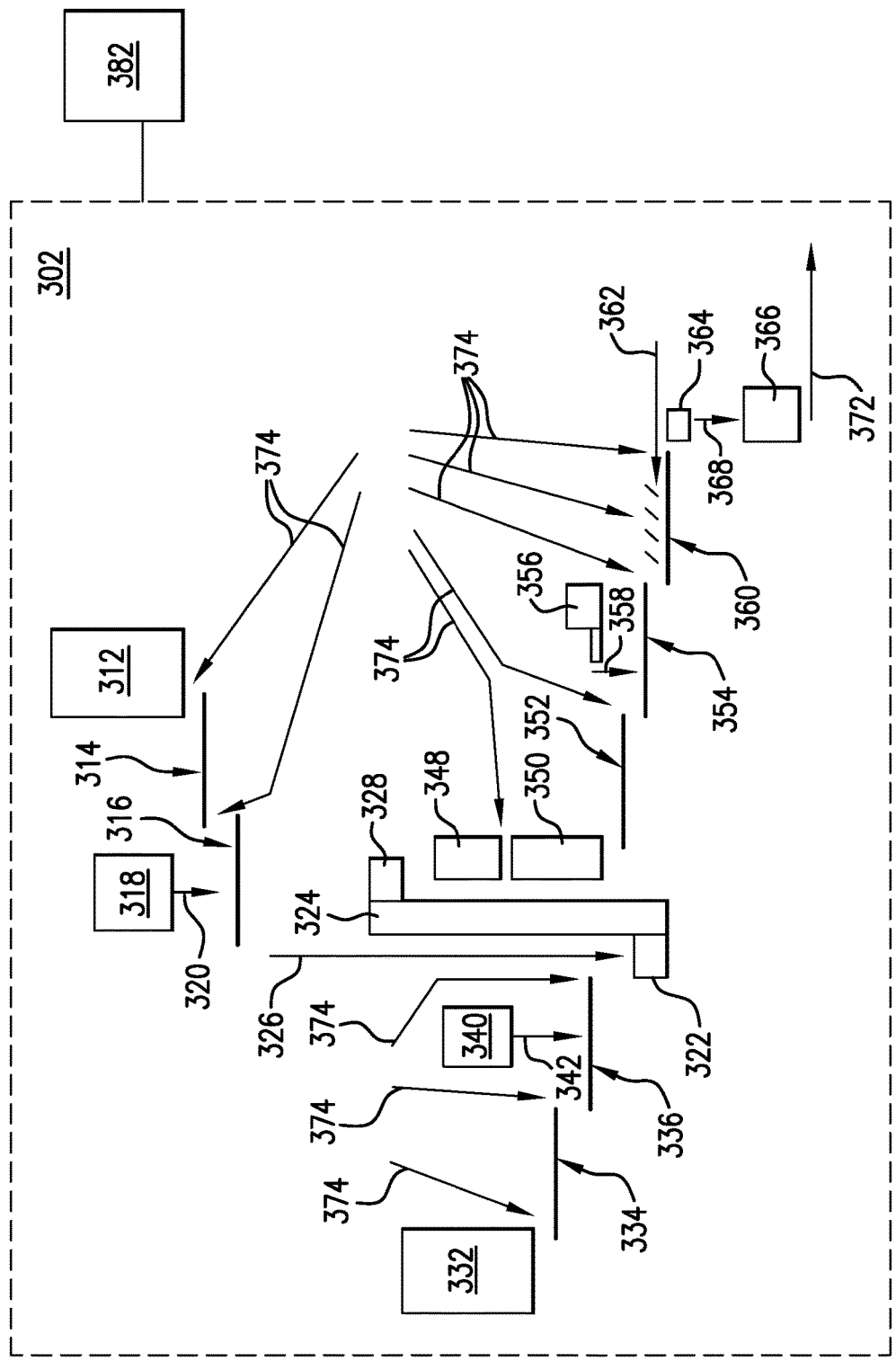
FIG. 3 is a schematic diagram of an apparatus for making a litter product according to one embodiment of the present invention.

FIG. 3 shows an apparatus 302 that may be employed in the methods of FIGS. 1 and 2, as well as other methods of making a litter product according to various embodiments of the present invention. Apparatus 302 includes a sodium bentonite tank 312 which is used to deliver sodium bentonite particles to a weigh conveyor belt 314 where the sodium bentonite particles are weighed. Weigh conveyor belt 314 conveys the sodium bentonite particles to a conveyor belt 316 where a fragrance slurry from a tank 318 may be sprayed onto the sodium bentonite particles, as indicated by arrow 320, to form coated sodium bentonite by using a hydraulic spray pump to pump the fragrance slurry through a set of flat fan sprayer nozzles. If a fragrance-free product is being produced, this step of spraying the fragrance slurry on the sodium bentonite particles may be omitted. For simplicity in the remainder of the description of the functioning of apparatus 302 it will be assumed that the sodium bentonite particles are coated with a fragrance slurry to form a fragrance coating. Conveyor belt 316 conveys the coated sodium bentonite particles to a base portion 322 of an elevator 324 as indicated by arrow 326.

Apparatus 302 also includes a calcium bentonite tank 332 which is used to deliver calcium bentonite particles to a weigh conveyor belt 334 where the calcium bentonite particles are weighed. Weigh conveyor belt 334 conveys the calcium bentonite particles to a conveyor belt 336 where a PTFE slurry from a tank 340 is sprayed onto the calcium bentonite particles, as indicated by arrow 342, to form coated calcium bentonite particles by using a hydraulic spray pump to pump the PTFE slurry through a set of flat fan sprayer nozzles. Conveyor belt 336 conveys the calcium bentonite particles to a base portion 322 of elevator 324.

The coated sodium bentonite particles and the coated calcium bentonite particles are mixed together at base portion 322 of elevator 324 and conveyed up to a top portion 328 of elevator 324 before falling through a dedust box 348 and a mass flow surge bin 350 and onto a weigh conveyor belt 352. The total amount of mixture is weighed on weigh conveyor belt 352. Weigh conveyer belt 352 conveys the mixture to a conveyor belt 354 where one or more additives may be added to the mixture from an additive feeder 356 as indicated by arrow 358. Conveyor belt 354 conveys the mixture to a conveyor belt 360 where the mixture is blended using stationary mixing plows 362. Conveyor belt 360 eventually conveys the mixture to a static mixer 364 to further blend the mixture. After the mixture is well blended to form a litter product, the litter product is dispensed from static mixer 364 into a mass flow packaging bin 366, as indicated by arrow 368, and is sent to a packaging apparatus as indicated by arrow 372. Dust collection is performed by various dust collection devices at various portions of apparatus 302 as shown by arrows 374.

The dedust box function dedusts the clay. Clay falls down a "flight of stairs" with air passing through the falling clay as it falls from each step. The air with entrained dust goes to a dust collector.

One purpose of the mass flow surge bin is to function as a typical surge bin. The mass flow surge bin also functions is to avoid segregation. A normal surge bin is a kind of "first in first out" and has funnel flow. This action may cause segregation. A mass flow bin does a much better job of avoiding segregation. When one mixes materials of either different particles sizes or densities, agitation and movement may cause segregation. A mass flow surge bin is a special design where material moves as a column down the silo so one gets a "first in, first out behavior. This greatly lessens agitation and decreases segregation.

In apparatus 302 of FIG. 3, the stationary plows are mounted over a moving belt to plow the material after a material addition. The stationary plows "fold" the material in. The stationary plows are set up to provide both a rolling action and a back and forth motion for blending. The stationary plows mix the final dry additives into the main flow of material on the belt by moving the flowing material back and forth from side to side turning it over onto itself. There are four plows alternately angled left and right. The action is similar to that inside a static mixer. The movement of the powered conveyor belt flowing the material past the plows imparts the necessary energy for mixing. The plows are immediately downstream of where minor quantities of solid powdered and granular additives are applied. The plows assure that these additives are well-mixed into the blend.

The static mixer of apparatus 302 of FIG. 3 is a section of vertical pipe with an arrangement of internal mixing baffles (flanges or louvers) that repeatedly split and recombine the flow to ensure a final uniform blend immediately before packaging.

Apparatus 302 of FIG. 3 is controlled by a control system 382 that is used to control the percentage of each component in the composition of the litter's blend. Flows of materials may be dynamically ratioed so that the blends formed by the apparatus have a specific composition of ingredients. The weight conveyor belt for sodium bentonite sets the pace for the operation of the apparatus and sends a signal to the control system that is used to properly ratio the flow of calcium bentonite and all other ingredients. During startup, shutdown and speed changes, the control system maintains quality of blend by accounting for different belt lengths, belt speeds and flow rates so that flows start and stop together at the point of mixing. Further protections on quality include upper and lower range specifications on key settings. Associated with these are warning limits and process shutdown limits to prevent off-specification production. Important areas for blending and avoidance of segregation are the material transfer points, where the stationary plows blend the mixture, the static mixer and the mass flow surge bin.

In making a cat litter blend, any time a blend is agitated at a material transfer point where there is a free flow or free fall of material, segregation may occur. Therefore, in one embodiment of the present invention, segregation of the materials in a blend may be minimized by minimizing the number of material transfer points and by minimizing the length that a blend falls at a material transfer point.

The additive feeder of the apparatus of FIG. 3 may be used to add materials such as a clumping agent, a fragrance, odor control additives, etc. Although for simplicity of illustration, only one additive feeder is shown in FIG. 3, there may be two or more additive feeders.

In one embodiment of the present invention, the sodium bentonite used in a litter mixture may have a bulk density of 60 to 75 lbs/ft$^3$.

In one embodiment of the present invention, the calcium bentonite used in a litter mixture may have a bulk density of 35 to 45 lbs/ft$^3$.

In one embodiment of the present invention, a sodium bentonite/calcium bentonite blend used in a litter may have a bulk density of 50 to 58 lbs/ft$^3$. In one embodiment of the present invention, a sodium bentonite/calcium bentonite blend may be sufficiently uniform that differences in the bulk density throughout the blend are 2.0 lbs/ft$^3$, or 0.97 lbs/ft$^3$, or 0.96 lbs/ft$^3$, or even 0.74 lbs/ft$^3$, for 10 samples of the blend.

In addition to calcium bentonite, other materials that may be used as filler materials in litter compositions of the present invention include Taft clay, smectites, attapulgite (palygorskite), fuller's earth, diatomaceous earth, kaolinite, sepiolite, zeolite, vermiculite, pumice, perlite, gypsum, beads (polyethylene, polystyrene, polypropylene, glass, silica gel), cloth, cotton, straw, cellulose, bark, poultry litter, reconstituted materials and combinations of materials such as mineral cellulose and light weight fertilizer, recycled wastes such as Milorganite, organic material such as barley grains, corn kernels, wheat grains, coffee beans, rice grains, nut shells, paper, wood fiber, wood pulp, wood shavings, wood chips, wood flour, sawdust, etc., pieces and parts thereof, reconstituted parts thereof and mixtures thereof. In one embodiment, filler materials of the present invention may have a bulk density of less than of the sodium bentonite in a litter mixture.

In one embodiment, a filler of the present invention may be a granular filler.

Litter compositions of the present invention may include clumping additives. Examples of clumping additives that may be used in mixtures of the present invention include polysaccharides, guar gum, Arabic gum, karaya gum, tara gum, ghatti gum, galactomannan gum, locust bean gum, cellulose ester or ether, carboxymethyl cellulose, hydroxypropylmethyl cellulose, hydroxybutylmethyl cellulose, methyl cellulose, polyelectrolyte, xanthan gum, alginates, carrageenan gums, pectins, starches, psyllium husk powder, corn flour, pre-gelatinized corn flour, polyvinyl alcohol, polymers, copolymers, modified starches, etc.

Litter compositions of the present invention may include dedusting agents. Examples of dedusting agents that may be included in a litter composition of the present invention include polytetrafluoroethylene (PTFE), oils, water, glycerols, glycols, polyvinyl alcohol, polyvinyl acetate, polymers, silicones, calcium chloride, foams, etc.

In one embodiment of the present invention in which calcium bentonite particles are used as a filler material, a 1.2% slurry of PTFE in water may be sprayed onto the calcium bentonite particles at the application rate of 40 lbs/ton of calcium bentonite (0.48 lbs. active PTFE per ton of calcium bentonite) using an apparatus such as shown in FIG. 1. The PTFE coated calcium bentonite is later blended with sodium bentonite.

A litter of the present invention may include various other additives such as odor control additives, odor masking agents, emulsifiers, fixatives, indicators, pesticides, insecticides, herbicides, attractants, repellants, sanitizers, emollients, humectants, dessicants, dyes, pigments, etc.

Examples of odor control additives that may be included in a litter composition of the present invention include biocides, urease inhibitors, iodine, chlorophyllin sodium copper salts, probiotics, enzymes, baking soda, carbon, zeolites, salts, aldehydes (benzaldehyde, heptaldehyde, undecalcatone, benzyl cinnamate, cinnamaldehyde, citral, vanillin, coumarin, undecanal, etc.).

Examples of odor masking agents that may be included in a litter composition of the present invention include fragrances such as citrus, floral (lavender), green, fruity, herbaceous, musk, oriental, woody, etc.

Examples of emulsifiers that may be included in a litter composition of the present invention include: polysorbate 20, polysorbate 80, block copolymers such as Lutrol® and non-ionic solubilizers such as Cremophor® RH.

Examples of fixatives that may be included in a litter composition of the present invention include polypropylene glycol, polypropylene glycol, polyethylene glycols, glycerin, sugar alcohols, etc.

Examples of indictors that may be included in a litter composition of the present invention include pH indicators, ammonia indicators, etc. that change color to indicate a change in pH, the presence of ammonia, etc.

Examples of attractants that may be included in a litter composition of the present invention include pheromones, catnip, etc.

Examples of repellants that may be included in a litter composition of the present invention include flea repellants, tick repellants, mite repellants, etc.

Examples of sanitizers that may be included in a litter composition of the present invention include alcohols, chlorhexidine gluconate, phenols, iodine, quaternary salts, ammonium compounds, hydrogen peroxide, urea hydrogen peroxide, sodium perchlorate, etc.

Examples of dessicants that may be included in a litter composition of the present invention include calcium sulfate, calcium chloride, silica gel, etc.

Having described the many embodiments of the present invention in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

EXAMPLES

Figure 4:
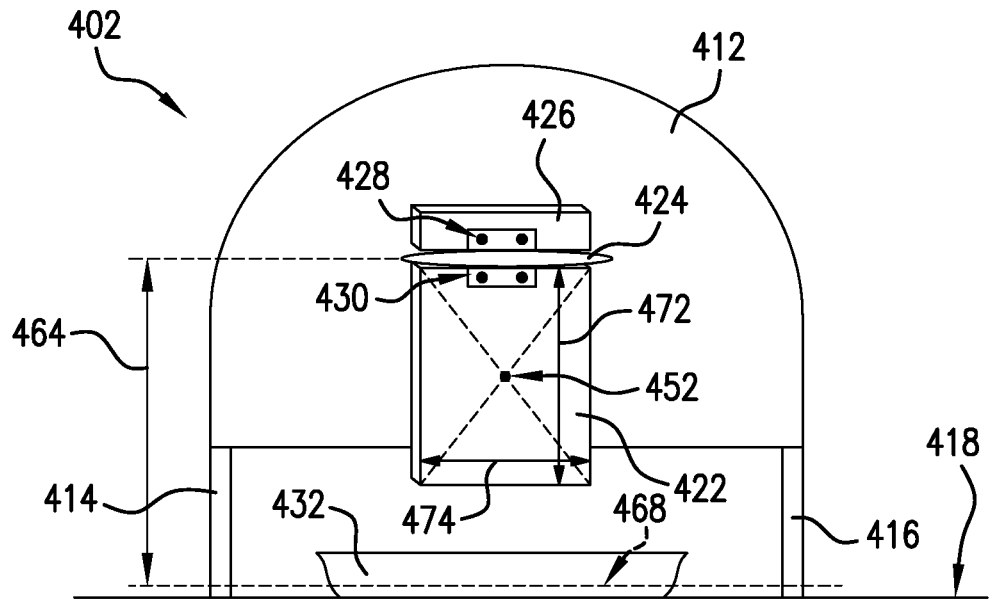
FIG. 4 is a schematic front view of a dropping device for testing clump strength of a litter using a Standard Drop Method Test.
Figure 5:
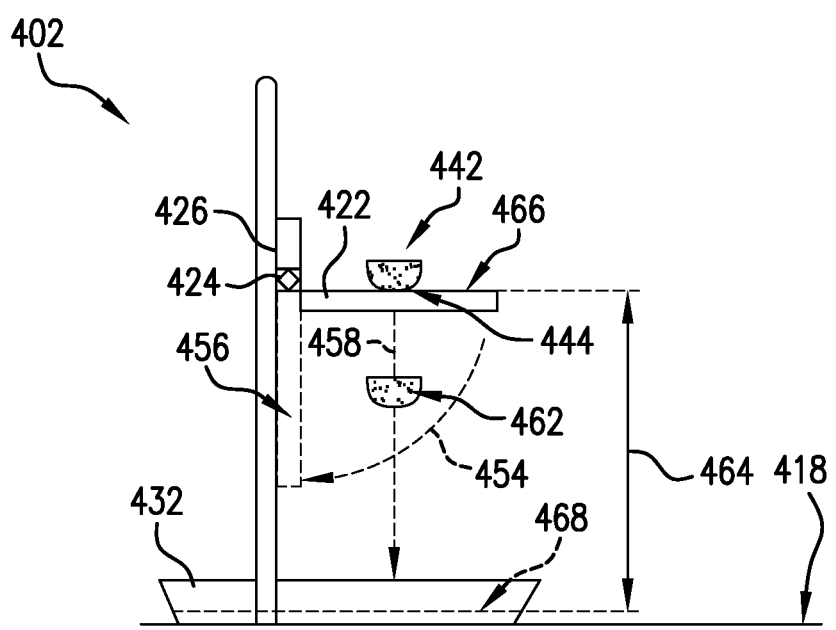
FIG. 5 is schematic side view of the dropping device of FIG. 4.
Figure 6:
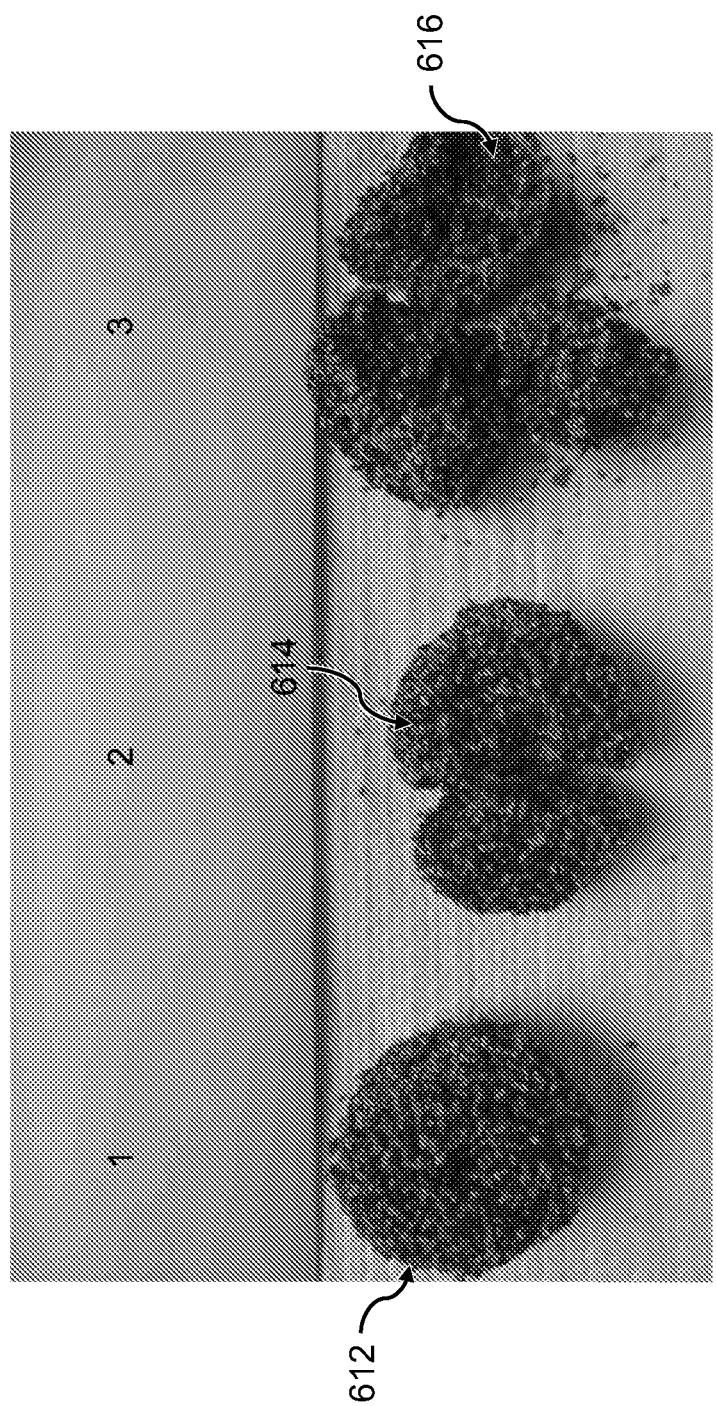
FIG. 6 is an image showing examples of clumps showing different levels of clump strength.

Materials and Methods
Clump Strength Test—Standard Drop Method Test
FIGS. 4 and 5 show a dropping device 402 used to test clump strength using the Stand Drop Method Test. To measure clump strength of litter formulations an aluminum pan is placed under a dropping device. The aluminum pan may include one or more sheets of paper product, such as a paper towel, as a liner. A small depression, approximately 1 cm, is made in a flat pile of a litter to be tested. 20 ml of a wetting agent is poured over the test litter. After 30 seconds a clump is removed from the test litter and placed on a swinging platform of a dropping device with the bottom side of the clump down. Prior to the clump being placed on the swinging platform, the swinging platform is raised by a user to be horizontal relative to the inner horizontal surface of the pan. The user releases the swinging platform allowing the clump to free fall into an aluminum pan placed exactly 12 inches (30.5 cm) below. Next, the clump is visually examined for breakage and assigned a rating on a scale from 1 to 3: 1: clump intact, no breakage; 2: slight breakage (clumps breaks into 2 pieces); and 3: moderate breakage (clump breaks into more than 2 pieces), as shown in FIG. 6. The test is repeated on 2 more clumps and the average rating of all 3 clumps is reported. In the Examples 3-49 below, synthetic urine was used as a wetting agent. The particular synthetic urine composition used in Drop Method Tests of Examples 3-49 is shown below in Table A:

TABLE A

| Component | % by weight |
|---|---|
| Water | 89.84 |
| Urea | 5.44 |
| Sodium chloride | 3.00 |
| Sodium phosphate | 0.78 |
| Ammonium nitrate | 0.50 |
| Sodium bisulfate | 0.44 |
| Total | 100.00 |

Dropping device 402 includes a vertical back 412 mounted on two legs 414 and 416 that stand on a table surface 418. A swinging platform 422 is mounted on a vertical back 412 by means of a spring-loaded hinge 424 that is attached to swinging platform 422 and a base 426 by mounting plates 428 and 430. Base 426 is mounted on vertical back 412. An aluminum pan 432 is located on table surface 418 below swinging platform 422. FIG. 4 shows swinging platform 422 in a down position. FIG. 2 shows swinging platform 422 in an up position. Swinging platform 422 is maintained in the up position by a user holding swinging platform 422 in the up position.

FIG. 5 shows a clump 442 having a bottom side 444 resting on swinging platform 422 at a middle point 452 (shown in FIG. 4) of swinging platform 422 prior to dropping. When swinging platform 422 is released by a user, swinging platform 422 swings down as shown by dashed arrow 454 until swinging platform 422 rests against vertical back 412 as shown by shadow lines 456. When swinging platform 422 is released, clump 442 drops vertically as shown by dashed arrow 458 into aluminum pan 432. A dropped clump 462 drops a distance, shown by double-headed arrow 464, from a top surface 466 of swinging platform 422 to an inner horizontal surface 468 of pan 432, which is 12 inches (30.5 cm). Swinging platform 422 has a length, shown by double-headed arrow 472, of 7.5 (19.1 cm) inches and a width, shown by double-headed arrow 474, of 4.5 inches (11.4 cm).

Clumps are evaluated using the scale shown in FIG. 6. An intact clump, shown by arrow 612, is given a rating of 1. A clump that breaks into only 2 pieces, shown by arrow 614, is given a rating of 2. A clump that breaks into 3 or more pieces, shown by arrow 616, is given a rating of 3.

Clump Strength Test—Extreme Drop Method Test

Figure 7:
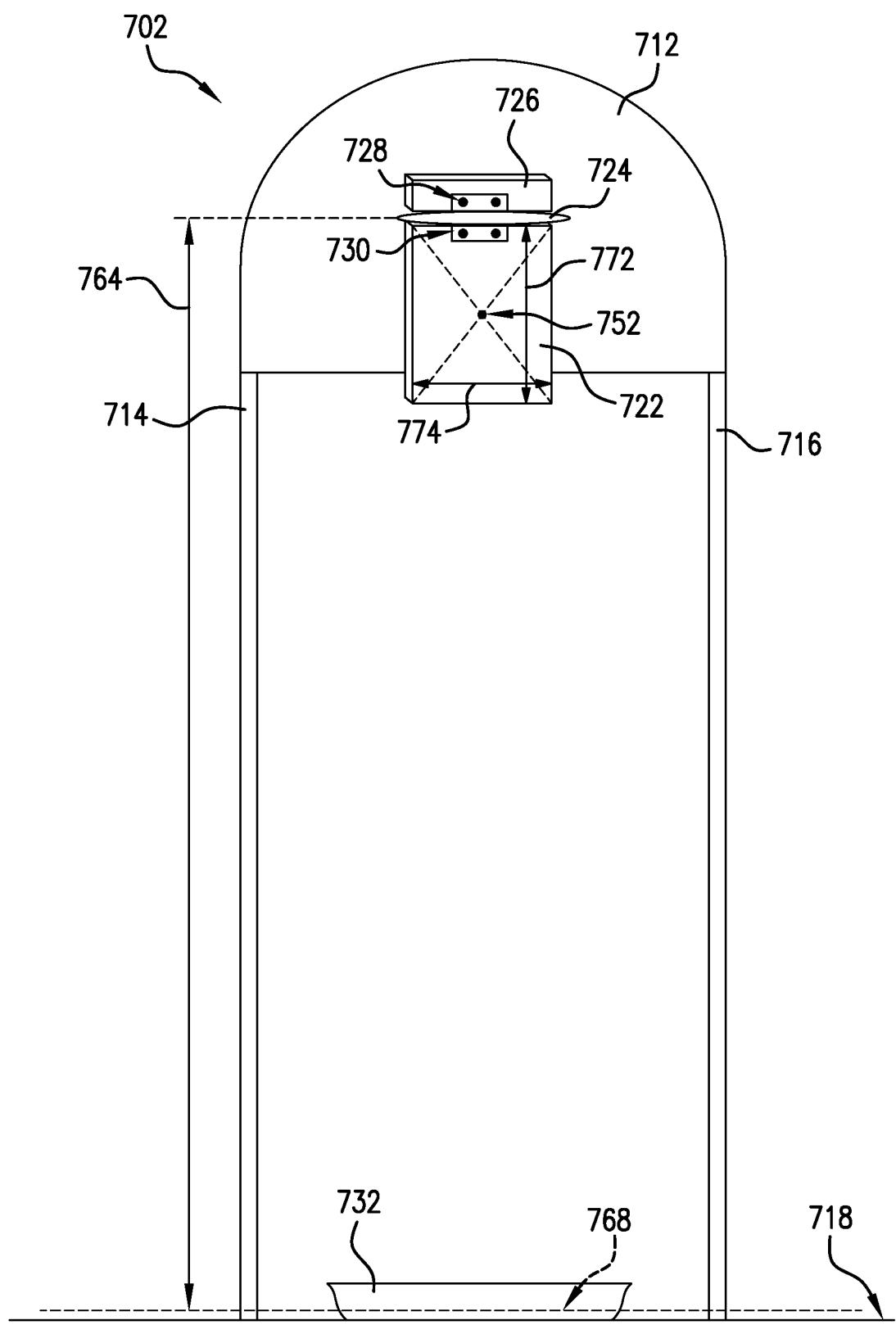
FIG. 7 is a schematic front view of an extreme dropping device for testing clump strength of a litter using an Extreme Drop Method Test.
Figure 8:
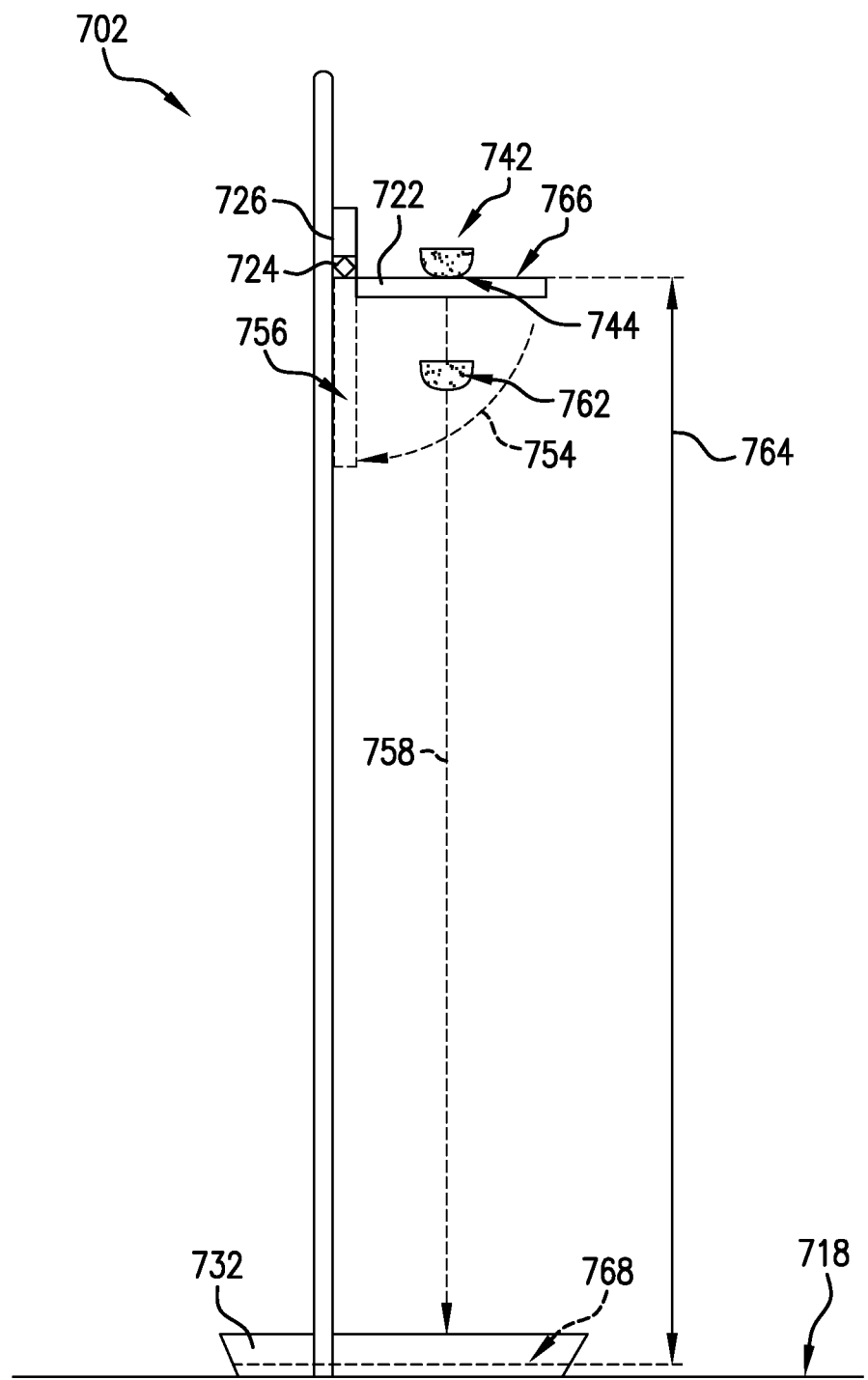
FIG. 8 is schematic side view of the extreme dropping device of FIG. 7.

FIGS. 7 and 8 show a dropping device 702 used to test clump strength using the Extreme Drop Method Test. To measure clump strength of litter formulations an aluminum pan is placed under a dropping device. A small depression, approximately 1 cm is made in a flat pile of a litter to be tested. 20 ml of synthetic urine is poured over the test litter. After 30 seconds a clump is carefully removed from the test litter and placed on a swinging platform of a dropping device with the bottom side of the clump down. Prior to the clump being placed on the swinging platform, the swinging platform is raised by a user to be horizontal relative to the inner horizontal surface of the pan. The user releases swinging platform allowing the clump to free-fall into an aluminum pan placed exactly 47 inches (119.4 cm) below. Next, the clump is visually examined for breakage and assigned a rating on a scale from 1 to 3: 1: clump intact, no breakage; 2: slight breakage (clumps breaks into 2 pieces); and 3: moderate breakage (clump breaks into more than 2 pieces). The test is repeated on 2 more clumps and the average rating of all 3 clumps is reported.

Dropping device 702 including a vertical back 712 mounted on two legs 714 and 716 that stand on a table surface 718. A swinging platform 722 is mounted on vertical back 712 by means of a spring-loaded hinge 724 that is attached swinging platform 722 and a base 726 by mounting plates 728 and 730. Base 726 is mounted on vertical back 712. An aluminum pan 732 is located on table surface 718 below swinging platform 722. FIG. 7 shows swinging platform 722 in a down position. FIG. 8 shows swinging platform 722 in an up position. Swinging platform 722 is maintained in the up position by a user holding swinging platform 722 in the up position.

FIG. 8 shows a clump 742 having a bottom side 744 resting on swinging platform 722 at a middle point 752 (shown in FIG. 7) of swinging platform 722 prior to dropping. When swinging platform 722 is released by a user, swinging platform 722 swings down as shown by dashed arrow 754 until swinging platform 722 rests against vertical back 712 as shown by shadow lines 756. When swinging platform 722 is released, clump 742 drops vertically as shown by dashed arrow 758 into aluminum pan 732. A dropped clump 762 drops a distance, shown by double-headed arrow 764, from a top surface 766 of swinging platform 722 to an inner horizontal surface 768 of pan 732 is 47 inches (119.4 cm). Swinging platform has a length, shown by double-headed arrow 772, of 7.5 (19.1 cm) inches and a width, shown by double-headed arrow 774, of 4.5 inches (11.4 cm).

Clumps are evaluated using the scale shown in FIG. 6. An intact clump, shown by arrow 612, is given a rating of 1. A clump breaks into only 2 pieces, shown by arrow 614, is given a rating of 2. A clump that breaks into 3 or more pieces, shown by arrow 616, is given a rating of 3.

Bulk Density—Loose-fill (O'Haus) Method

The Bulk Density—Loose-Fill (O'Haus) Method is a standard test used to determine the density (in lbs/ft$^3$, or kg/m$^3$) of a granulated or powdered substance in its loose state. In this method a tared dry pint cup is filled to overflowing with a sample of a granulated or powdered substance or mixture. The sample is leveled. The weight of the sample is measured and the bulk density calculated in pounds per cubic foot or kilograms per cubic meter. Additional information about this testing method is provided in ASTM Standard Method E 727, the entire contents and disclosures of which are incorporated herein by reference.

Apparatus and Reagents

1. Filling Hopper, O'Haus Model 150 or similar equipment
2. Cup, standard dry pint
3. Balance, accurate to ±0.1 gram 4. Straightedge ruler or knife spatula
5. Sample splitter Procedure (Operator time is approximately 10 minutes):
1. Weigh the standard pint cup to the nearest 0.1 gram and record ($W_1$).
2. Select 400 grams of material, in accordance with a riffle method.
3. Close the slide gate on the bottom of the O'Haus filling hopper and pour the 400 grams of material into the hopper.
4. Position the dry pint cup below the gate so the cup is centered and two inches below the gate.
5. Open the gate quickly and let the sample fill the cup and overflow. Do not vibrate the cup or close the gate before all of the sample flows out of the hopper. (These test methods yield comparative data.)
6. Using a gentle sawing motion, level the material in the cup with a straightedge ruler or knife spatula.
7. Weigh the cup plus material to the nearest 0.1 gram ($W_2$).

Calculations:
1. Weight of standard pint cup, in grams ($W_1$).
2. Weight of cup plus sample, in grams ($W_2$).
3. Bulk density, in pounds/cubic foot (lb/ft$^3$) $D=(W_2-W_1)\times 0.113$ (The value 0.113 is a conversion factor for converting from gm/pint=lb/ft$^3$)
4. Bulk density, in kg/cubic meter (kg/m$^3$) $D=(W_2-W_1)\times 1.81$ (The value 1.81 is a conversion factor for converting from gm/pint=kg/m$^3$)

Odor Control—Magic Cat Box Method

Magic Cat Box testing provides an evaluation of a cat litter's ammonia control efficacy over time under stressful conditions. The test can be used to compare competitive products and to evaluate new fragrance/biocide systems. This test involves mixing feces-inoculated synthetic cat urine with test material, placing in capped, ventilated jars and testing periodically for ammonia formation using ammonia detection tubes.

Apparatus and Reagents:
1. High shear blender
2. 16 oz wide-mouth plastic jars
3. Lids (fitting 16-oz jars) with pre-drilled holes, ¼" in diameter in the center and ⅟₁₆" in diameter off to side
4. Inoculated urine (see formula and procedure below)
5. Flow meter
6. Vacuum rated tubing
7. Rubber washers
8. RAE ammonia detection tubes (25-500 ppm)
9. Laboratory balance Procedure:
1. Prepare feces/synthetic urine slurry by combining the following ingredients in Table B below in a blender at high speed for one minute (or until, visually, it seems the feces is well dispersed):

TABLE B

| Component | % by weight |
|---|---|
| Water | 91.43 |
| Cat feces | 1.00 |
| Urea | 5.22 |
| Ammonium phosphate dibasic | 0.70 |
| Sodium bisulfate | 0.45 |
| Ammonia | 0.33 |
| Potassium chloride | 0.32 |
| Sodium chloride | 0.27 |

TABLE B-continued

| Component | % by weight |
|---|---|
| Creatinine | 0.18 |
| Magnesium chloride | 0.06 |
| Creatine | 0.03 |
| Calcium chloride | 0.02 |
| Total | 100.00 |

2. Transfer 100 g of the feces/synthetic urine slurry into each of the sample jars (three jars per set of samples).
3. Slowly pour in enough test material so the slurry gets entirely absorbed and the excess unsoiled litter particles are settled on the surface of inoculated litter.
4. Allow the samples to sit undisturbed for five minutes and then remove the excess litter by inverting the jars over the trash can and gently tapping off the excess litter particles.
5. Cover each jar with its lid.
6. Evaluate the samples for ammonia every other day (or as needed), starting on day 2.
7. Perform evaluation by first adjusting the vacuum flow to 310 cc/min. using flow meter.
8. Place rubber washer ring on RAE detection tube 0.75" from the tip.
9. Snip glass ends off tube and place vacuum hose on tube (flow arrows on tube pointing toward vacuum hose).
10. Insert RAE tube into the hole in the center of the lid up to the rubber washer. Draw sample air into tube for one minute and record ammonia level.
11. Discontinue testing samples when ammonia is detected at the 100 ppm level (failure).
12. Record day of failure.
13. After all three samples per each set have failed, record average day to failure for sample set.

Example 1

A litter is produced using the manufacturing process shown in FIG. 1. This litter has the composition shown in Table 1 below:

TABLE 1

| Ingredient | % (w/w) | Application Rate (lbs/ton) |
|---|---|---|
| Sodium bentonite | 64.4 | 1300 |
| Calcium bentonite | 34.7 | 700 |
| Fragrance slurry | 0.3 | 6 |
| PTFE slurry | 0.7 | 14 |
| Totals | 100.0 | 2020 |

The fragrance slurry (coating) is applied only to the sodium bentonite. The fragrance slurry has a composition shown in Table 2 below:

TABLE 2

| Ingredient | % (w/w) | Amount (lbs/ton) |
|---|---|---|
| Water | 68.8 | 1376 |
| Emulsifier | 10.0 | 200 |
| Fragrance | 16.9 | 338 |
| Odor control additive | 3.4 | 68 |
| Colorant | 0.9 | 18 |
| Totals | 100.0 | 2000 |

The polytetrafluoroethylene (PTFE) slurry (coating) is applied only to the calcium bentonite. The PTFE slurry has a composition shown in Table 3 below:

TABLE 3

| Ingredient | % (w/w) | Application Rate (lbs/ton) |
|---|---|---|
| Water | 98.0 | 1960 |
| 60% PTFE suspension in water | 2.0 | 40 |
| Totals | 100.0 | 2000 |

Based on information in Table 3, the slurry is 1.2% PTFE (w/w). Based on the information in Tables 1 and 3, PTFE makes up 0.0084% (w/w) of the litter composition.

Example 2

A fragrance-free litter is produced using the manufacturing process shown in FIG. 2. This litter has the composition shown in Table 4 below:

TABLE 4

| Ingredient | % (w/w) | Application Rate (lbs/ton) |
|---|---|---|
| Sodium bentonite | 64.5 | 1300 |
| Calcium bentonite | 34.8 | 700 |
| PTFE slurry | 0.7 | 14 |
| Totals: | 100.0 | 2014 |

Examples 3-49

In Examples 3-49 below, the following terms have the following meanings:
% w/w=percentage by weight of the total mixture
PC/lb=particle count per lb of product
PC Dist.=particle count distribution in product as a percentage of the total product
Ext. SA=external surface area (ft$^2$/lb of product)
Ext. SA Dist.=external surface area distribution in product as a percentage of the total product In Examples 3-49 below, tests are conducted on blends of a swelling clay and a non-swelling clay, a swelling clay alone, blends of a swelling clay with paper particles, a blend of a swelling clay with wood fiber particles and blends of a swelling clay with barley grains. The swelling clay used is sodium bentonite from Wyoming from the company Wyo-Ben. The non-swelling clay used is Oil-Dri's Blue Mountain RVM clay (calcium bentonite). Each experimental blend of sodium bentonite and calcium bentonite clay is prepared by weighing out each component into a clean, plastic cat litter bin and blending by hand until uniform. Immediately after blending, about 1,000 grams of each blend is transferred to an appropriately sized plastic container. Next, 20 ml of room temperature tap water is drawn using a transfer pipette and poured over the blend to form a clump. A total of three clumps are formed in each container. The clumps are allowed to sit for 30 seconds and one hour prior to testing. In some cases the clumps are prepared 12, 24 and 36 hours prior to testing. The clump strength is tested using the Standard Drop Method Test. The aluminum pan is lined with a paper towel. The clumps are each tested by placing a clump on the spring loaded hinged platform of the dropping device and releasing the platform to allow the clump to fall into the aluminum pan lined with the paper towel. Each clump was dropped from the height of 12 inches. The clumps are later evaluated visually and rated from 1 to 3 based on the scale shown in FIG. 6. Each blend tested consists of various particle sizes of sodium bentonite and calcium bentonite clay combined at different ratios based on weight. Multiple particle sizes of raw materials are either provided by a supplier or screened using a Sweeco vibrating particle separator with appropriate screens. The particle size distribution of each raw material is confirmed by using a Tyler RoTap mechanical sieve shaker with sieves ranging in size from 6 to 100 U.S. mesh. A solid material used in a mixture of the present invention may be ground to form smaller particles.

Figure 9:
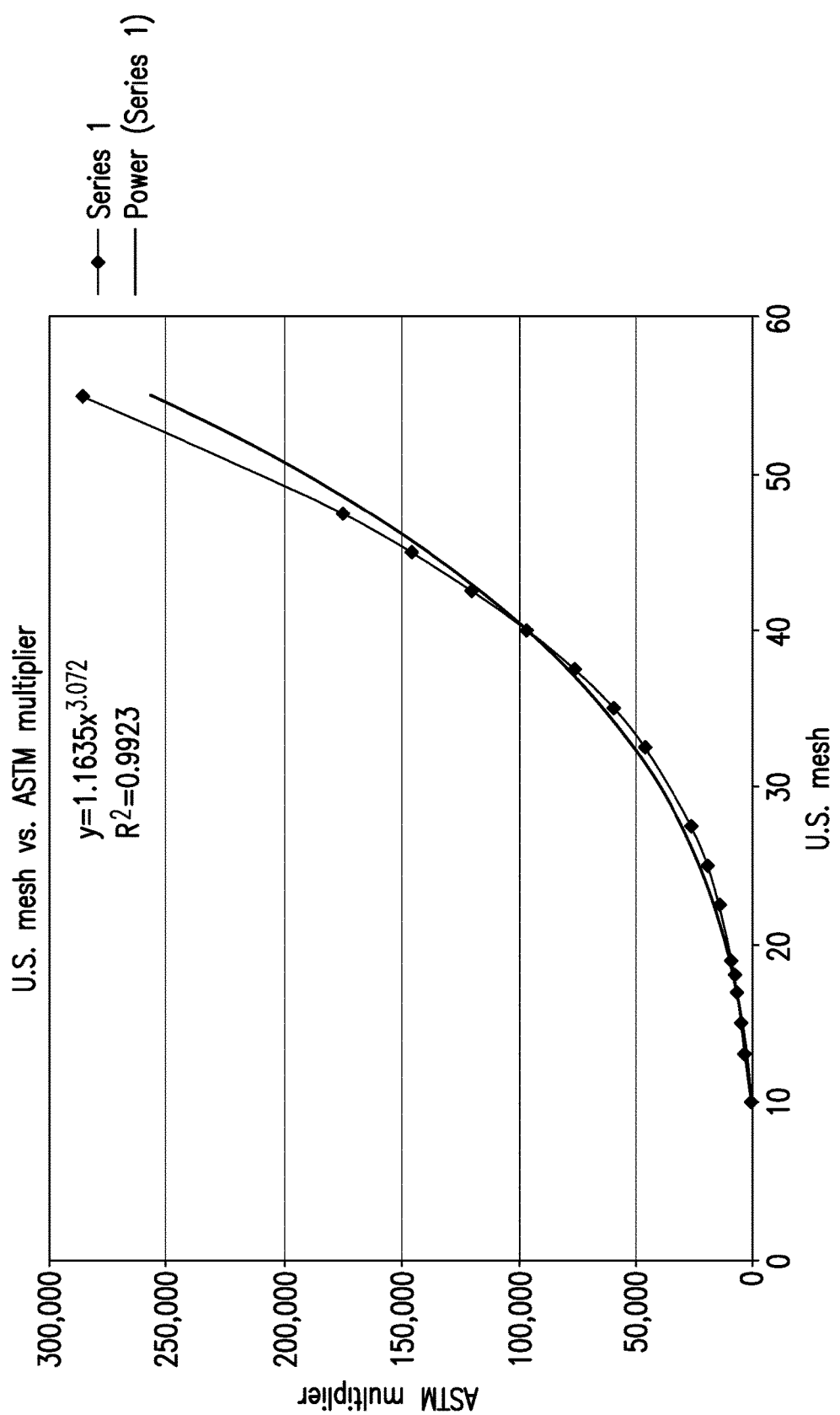
FIG. 9 is a graph of U.S. mesh versus ASTM multiplier for the sodium bentonite and calcium bentonite particles used in the litter compositions of Examples 3-35.

After completion of the particle size analysis, an external surface area of each particle cut is calculated based on an average mesh size of each particle cut, according to an equation: $4\pi r^2$. The external surface area calculation is based on a simplifying assumption that each particle is a perfect sphere. The particle count per unit weight of material is calculated according to the ASTM Standard Test Method E 1520-99. The multipliers for 4/6, 6/8, 8/10, 6/10 and <100 mesh particles are extrapolated from a power trendline with the $R^2$=0.9923 for the plot of the U.S. mesh size versus ASTM multiplier. The particle count is also based on a simplified assumption that all particles are spherical; see FIG. 9.

Figure 10:
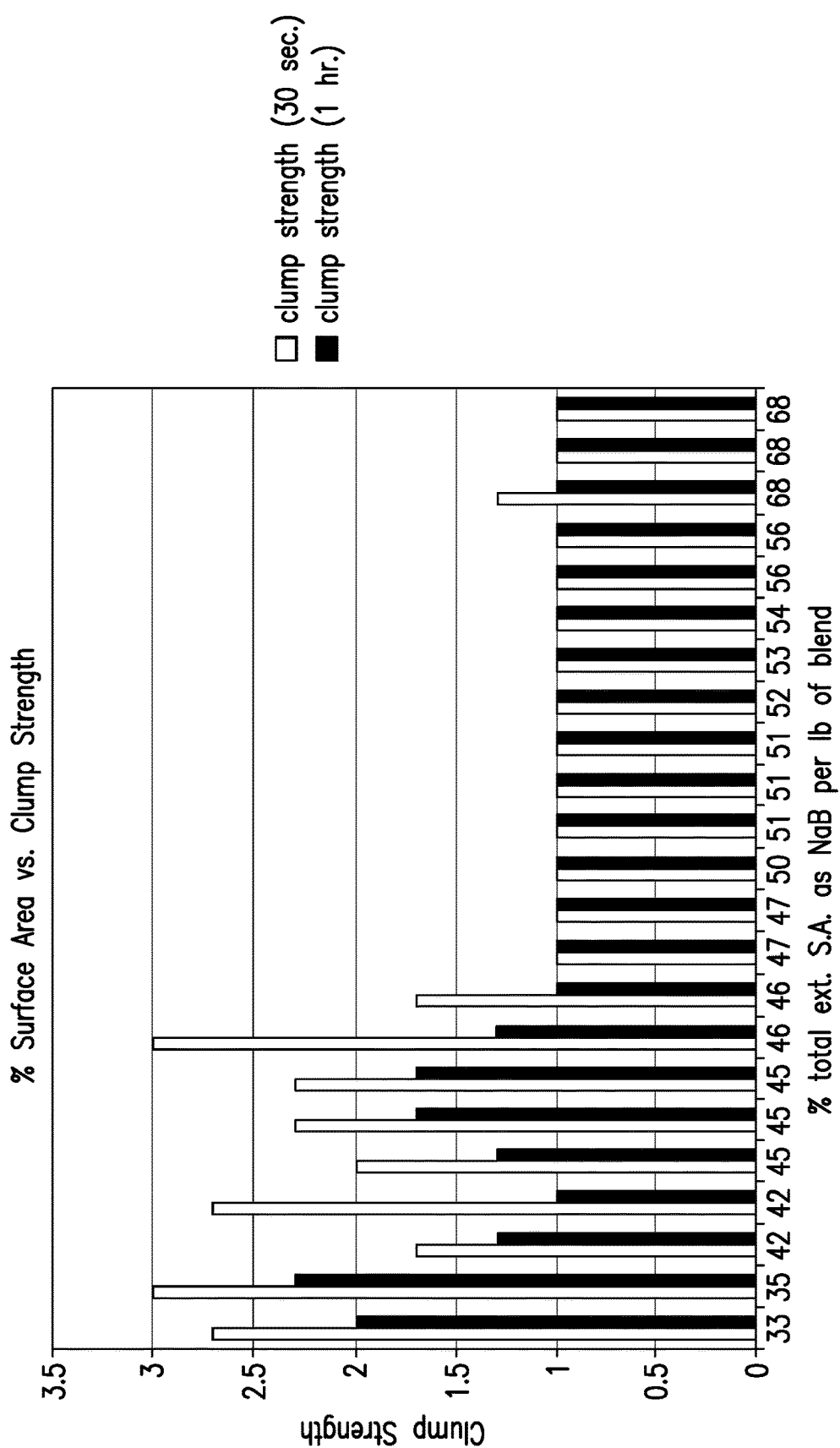
FIG. 10 is a plot of the percentage external surface area as sodium bentonite per pound of product plotted against the clump strength results for 30 second and 1 hour clumps for the litter compositions of Examples 3-35.

Next, a total external surface area of each particle cut was calculated by multiplication of the external surface area value by the number of particles in each cut. Following the surface area calculation, a cumulative external surface of each raw material is calculated per pound of material by summation of the external surface area values of each particle size cut. Finally, a ratio of a total external surface area of sodium bentonite and Blue Mountain RVM (calcium bentonite) clay per pound of blended material is calculated. After completion of all experiments, the percentage of external surface area as sodium bentonite per pound of product is plotted against the clump strength results for 30 second and 1 hour clumps, as shown in FIG. 10.

Figure 11:
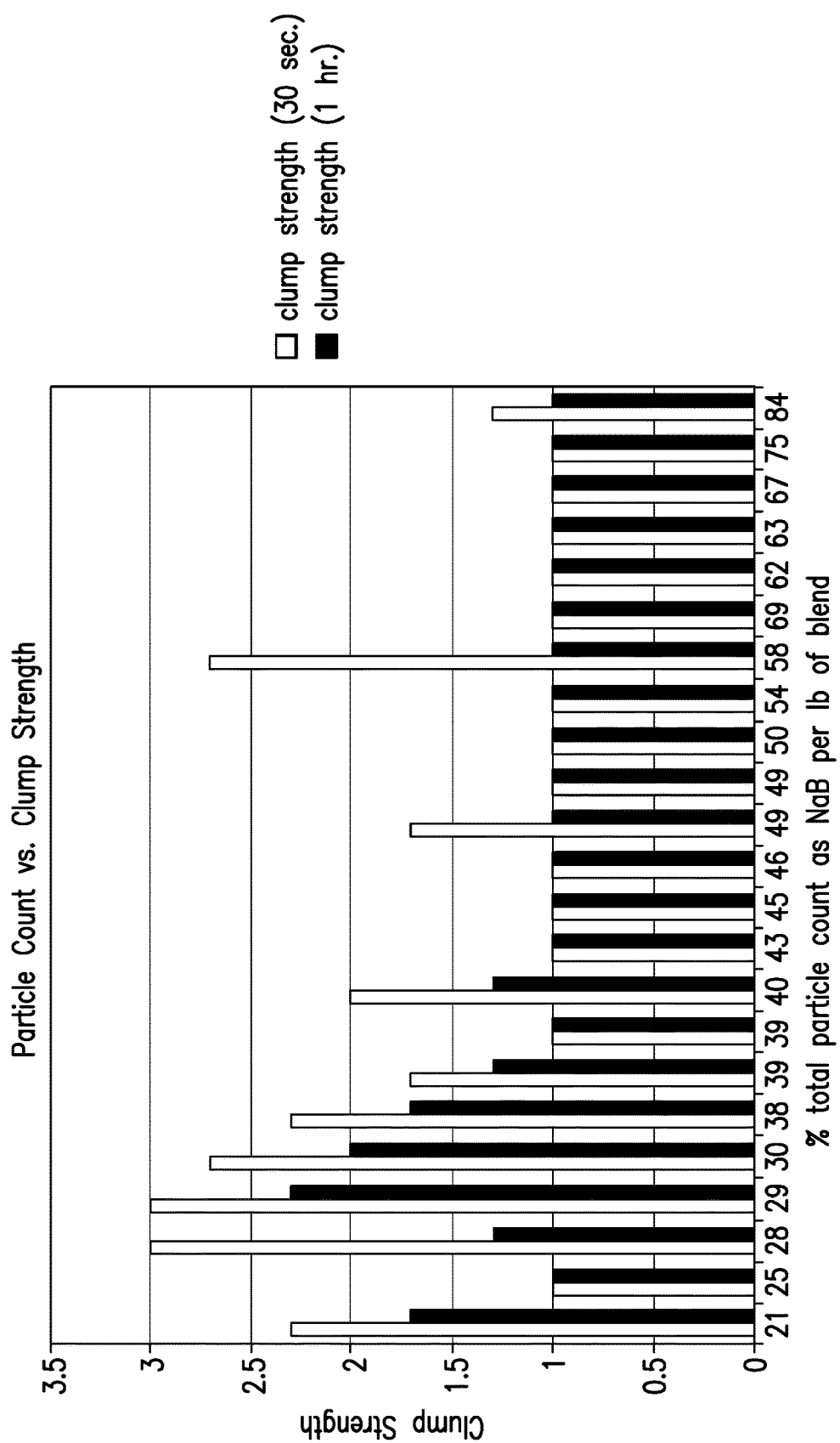
FIG. 11 is a plot of the percentage total particle count as sodium bentonite per pound of product versus the clump strength results for 30 second and 1 hour clumps for the litter compositions of Examples 3-35.

A similar plot was compiled for the percentage of total particle count as sodium bentonite per pound of product versus the clump strength results for 30 second and 1 hour clumps, as shown in FIG. 11.

Example 3

Blend #1:65% sodium bentonite (Wyo-Ben sodium bentonite, bulk density 60.15 lb/ft$^3$, external surface area 27.39 ft$^2$/lb), 35% calcium bentonite (BL-RVM, bulk density 41.5 lb/ft$^3$, external surface area 23.47 ft$^2$/lb). Information about the sodium bentonite of Blend #1 is provided in Table 1202 of FIG. 12. Information about the calcium bentonite of Blend #1 is provided in Table 1302 of FIG. 13. The average particle size of the sodium bentonite is 484 μm. The average particle size of the calcium bentonite is 905 μm.

Information about Blend #1 is provided in Table 5 below:

TABLE 5

| Component | % w/w | PC/lb | PC Dist. | Ext. SA | Ext. SA Dist. |
|---|---|---|---|---|---|
| Sodium bentonite | 65.00 | 8,095,362 | 84 | 17.80 | 68 |
| Calcium bentonite | 35.00 | 1,487,906 | 16 | 8.21 | 32 |
| Totals | 100.00 | 9,583,268 | 100 | 26.02 | 100 |

Clump strength is tested for samples after using the Standard Drop Method Test described above. Tests are conducted 30 seconds, 1 hour, 12 hours, 24 hours and 36 hours after exposure of the test litter to water. The results of these tests are shown in Table 6 below.

TABLE 6

| | Clump Strength | | | | |
|---|---|---|---|---|---|
| | 30 sec. | 1 hr. | 12 hrs. | 24 hrs. | 36 hrs. |
| Test 1 | 1 | 1 | 1 | 1 | 1 |
| Test 2 | 1 | 1 | 2 | 1 | 1 |
| Test 3 | 2 | 1 | 1 | 2 | 2 |
| Average | 1.3 | 1.0 | 1.3 | 1.3 | 1.3 |

Example 4

Blend #2:65% sodium bentonite (Wyo-Ben sodium bentonite, bulk density 64.4 lb/ft$^3$, external surface area 17.48 ft$^2$/lb), 35% calcium bentonite (BL-RVM, bulk density 37.1 lb/ft$^3$, external surface area 38.44 ft$^2$/lb). Information about the sodium bentonite of Blend #2 is provided in Table 1402 of FIG. 14. Information about the calcium bentonite of Blend #2 is provided in Table 1502 of FIG. 15. The average particle size of the sodium bentonite is 794 μm. The average particle size of the calcium bentonite is 949 μm.

Information about Blend #2 is provided in Table 7 below:

TABLE 7

| Component | % w/w | PC/lb | PC Dist. | Ext. SA | Ext. SA Dist. |
|---|---|---|---|---|---|
| Sodium bentonite | 65.00 | 1,236,816 | 26 | 11.36 | 46 |
| Calcium bentonite | 35.00 | 3,575,941 | 74 | 13.45 | 54 |
| Totals | 100.00 | 4,812,757 | 100 | 24.82 | 100 |

Clump strength is tested for samples after using the Standard Drop Method Test described above. Tests are conducted 30 seconds, 1 hour, 12 hours, 24 hours and 36 hours after exposure of the test litter to water. The results of these tests are shown in Table 8 below.

TABLE 8

| | Clump Strength | | | | |
|---|---|---|---|---|---|
| | 30 sec. | 1 hr. | 12 hrs. | 24 hrs. | 36 hrs. |
| Test 1 | 3 | 2 | 1 | 1 | 1 |
| Test 2 | 3 | 1 | 2 | 1 | 1 |
| Test 3 | 3 | 1 | 1 | 1 | 1 |
| Average | 1.3 | 1.3 | 1.3 | 1.0 | 1.0 |

Example 5

Blend #3:65% sodium bentonite (Wyo-Ben sodium bentonite, bulk density 64.4 lb/ft$^3$, external surface area 17.48 ft$^2$/lb), 35% calcium bentonite (BL-RVM, bulk density 41.1 lb/ft$^3$, external surface area 15.63 ft$^2$/lb). Information about the sodium bentonite of Blend #3 is provided in Table 1402 of FIG. 14. Information about the calcium bentonite of Blend #3 is provided in Table 1602 of FIG. 16. The average particle size of the sodium bentonite is 794 μm. The average particle size of the calcium bentonite is 1995 μm.

Information about Blend #3 is provided in Table 9 below:

TABLE 9

| Component | % w/w | PC/lb | PC Dist. | Ext. SA | Ext. SA Dist. |
|---|---|---|---|---|---|
| Sodium bentonite | 65.00 | 1,236,816 | 39 | 11.36 | 68 |
| Calcium bentonite | 35.00 | 1,962,285 | 61 | 5.47 | 32 |
| Totals | 100.00 | 3,199,102 | 100 | 16.83 | 100 |

Clump strength is tested for samples after using the Standard Drop Method Test described above. Tests are conducted 30 seconds, 1 hour, 12 hours, 24 hours and 36 hours after exposure of the test litter to water. The results of these tests are shown in Table 10 below.

TABLE 10

| | Clump Strength | | | | |
|---|---|---|---|---|---|
| | 30 sec. | 1 hr. | 12 hrs. | 24 hrs. | 36 hrs. |
| Test 1 | 1 | 1 | 1 | 1 | 1 |
| Test 2 | 1 | 1 | 1 | 1 | 1 |
| Test 3 | 1 | 1 | 1 | 1 | 1 |
| Average | 1.0 | 1.0 | 1.0 | 1.0 | 1.0 |

Example 6

Blend #4:50% sodium bentonite (Wyo-Ben sodium bentonite, bulk density 60.15 lb/ft$^3$, external surface area 27.39 ft$^2$/lb), 50% calcium bentonite (BL-RVM, bulk density 41.5 lb/ft$^3$, external surface area 23.47 ft$^2$/lb). Information about the sodium bentonite of Blend #4 is provided in Table 1202 of FIG. 12. Information about the calcium bentonite of Blend #4 is provided in Table 1302 of FIG. 13. The average particle size of the sodium bentonite is 484 μm. The average particle size of the calcium bentonite is 905 μm.

Information about Blend #4 is provided in Table 11 below:

TABLE 11

| Component | % w/w | PC/lb | PC Dist. | Ext. SA | Ext. SA Dist. |
|---|---|---|---|---|---|
| Sodium bentonite | 50.00 | 6,227,201 | 75 | 13.70 | 54 |
| Calcium bentonite | 50.00 | 2,125,580 | 25 | 11.74 | 46 |
| Totals | 100.00 | 8,352,781 | 100 | 25.43 | 100 |

Clump strength is tested for samples after using the Standard Drop Method Test described above. Tests are conducted 30 seconds and 1 hour after exposure of the test litter to water. No tests are conducted 12 hours, 24 hours and 36 hours after exposure of the test litter to water. The results of these tests are shown in Table 12 below.

TABLE 12

| | Clump Strength | |
|---|---|---|
| | 30 sec. | 1 hr. |
| Test 1 | 1 | 1 |
| Test 2 | 1 | 1 |
| Test 3 | 1 | 1 |
| Average | 1.0 | 1.0 |

Example 7

Blend #5:65% sodium bentonite (BPO sodium bentonite, bulk density 64.33 lb/ft³, external surface area 15.46 ft²/lb), 35% calcium bentonite (BL-RVM, bulk density 37.7 lb/ft³, external surface area 35.07 ft²/lb). Information about the sodium bentonite of Blend #5 is provided in Table 1702 of FIG. 17. Information about the calcium bentonite of Blend #5 is provided in Table 1802 of FIG. 18. The average particle size of the sodium bentonite is 806 μm. The average particle size of the calcium bentonite is 688 μm.

Information about Blend #5 is provided in Table 13 below:

TABLE 13

| Component | % w/w | PC/lb | PC Dist. | Ext. SA | Ext. SA Dist. |
|---|---|---|---|---|---|
| Sodium bentonite | 65.00 | 2,263,767 | 40 | 10.05 | 45 |
| Calcium bentonite | 35.00 | 3,422,605 | 60 | 12.27 | 55 |
| Totals | 100.00 | 5,686,371 | 100 | 22.33 | 100 |

Clump strength is tested for samples after using the Standard Drop Method Test described above. Tests are conducted 30 seconds and 1 hour after exposure of the test litter to water. No tests are conducted 12 hours, 24 hours and 36 hours after exposure of the test litter to water. The results of these tests are shown in Table 14 below.

TABLE 14

| | Clump Strength | |
|---|---|---|
| | 30 sec. | 1 hr. |
| Test 1 | 2 | 2 |
| Test 2 | 2 | 1 |
| Test 3 | 2 | 1 |
| Average | 2.0 | 1.3 |

Example 8

Blend #6:70% sodium bentonite (BPM sodium bentonite, bulk density 64.33 lb/ft³, external surface area 15.46 ft²/lb), 30% calcium bentonite (BL-RVM, bulk density 37.7 lb/ft³, external surface area 35.07 ft²/lb). Information about the sodium bentonite of Blend #6 is provided in Table 1702 of FIG. 17. Information about the calcium bentonite of Blend #6 is provided in Table 1802 of FIG. 18. The average particle size of the sodium bentonite is 806 μm. The average particle size of the calcium bentonite is 688 μm.

Information about Blend #6 is provided in Table 15 below:

TABLE 15

| Component | % w/w | PC/lb | PC Dist. | Ext. SA | Ext. SA Dist. |
|---|---|---|---|---|---|
| Sodium bentonite | 70.00 | 2,437,903 | 45 | 10.82 | 51 |
| Calcium bentonite | 30.00 | 2,933,661 | 55 | 10.52 | 49 |
| Totals | 100.00 | 5,371,564 | 100 | 21.35 | 100 |

Clump strength is tested for samples after using the Standard Drop Method Test described above. Tests are conducted 30 seconds and 1 hour after exposure of the test litter to water. No tests are conducted 12 hours, 24 hours and 36 hours after exposure of the test litter to water. The results of these tests are shown in Table 16 below.

TABLE 16

| | Clump Strength | |
|---|---|---|
| | 30 sec. | 1 hr. |
| Test 1 | 1 | 1 |
| Test 2 | 1 | 1 |
| Test 3 | 1 | 1 |
| Average | 1.0 | 1.0 |

Example 9

Blend #7:50% sodium bentonite (Wyo-Ben Exp. sodium bentonite, bulk density 62.49 lb/ft³, external surface area 18.75 ft²/lb), 50% calcium bentonite (BL-RVM, bulk density 37.7 lb/ft³, external surface area 35.07 ft²/lb). Information about the sodium bentonite of Blend #5 is provided in Table 1902 of FIG. 19. Information about the calcium bentonite of Blend #7 is provided in Table 1802 of FIG. 18. The average particle size of the sodium bentonite is 650 μm. The average particle size of the calcium bentonite is 688 μm.

Information about Blend #7 is provided in Table 17 below:

TABLE 17

| Component | % w/w | PC/lb | PC Dist. | Ext. SA | Ext. SA Dist. |
|---|---|---|---|---|---|
| Sodium bentonite | 50.00 | 1,983,882 | 29 | 9.38 | 35 |
| Calcium bentonite | 50.00 | 4,889,435 | 71 | 17.53 | 65 |
| Totals | 100.00 | 6,873,317 | 100 | 26.91 | 100 |

Clump strength is tested for samples after using the Standard Drop Method Test described above. Tests are conducted 30 seconds and 1 hour after exposure of the test litter to water. No tests are conducted 12 hours, 24 hours and 36 hours after exposure of the test litter to water. The results of these tests are shown in Table 18 below.

TABLE 18

| | Clump Strength | |
|---|---|---|
| | 30 sec. | 1 hr. |
| Test 1 | 3 | 3 |
| Test 2 | 3 | 2 |
| Test 3 | 3 | 2 |
| Average | 3.0 | 2.3 |

Example 10

Blend #8:60% sodium bentonite (Wyo-Ben Exp. sodium bentonite, bulk density 62.49 lb/ft³, external surface area 18.75 ft²/lb), 40% calcium bentonite (BL-RVM, bulk density 37.7 lb/ft³, external surface area 35.07 ft²/lb). Information about the sodium bentonite of Blend #8 is provided in Table 1902 of FIG. 19. Information about the calcium bentonite of Blend #8 is provided in Table 1802 of FIG. 18. The average particle size of the sodium bentonite is 650 μm. The average particle size of the calcium bentonite is 688 μm.

Information about Blend #8 is provided in Table 19 below:

TABLE 19

| Component | % w/w | PC/lb | PC Dist. | Ext. SA | Ext. SA Dist. |
|---|---|---|---|---|---|
| Sodium bentonite | 60.00 | 2,380,658 | 38 | 11.25 | 45 |
| Calcium bentonite | 40.00 | 3,911,548 | 62 | 14.03 | 55 |
| Totals | 100.00 | 6,292,207 | 100 | 25.28 | 100 |

Clump strength is tested for samples after using the Standard Drop Method Test described above. Tests are conducted 30 seconds and 1 hour after exposure of the test litter to water. No tests are conducted 12 hours, 24 hours and 36 hours after exposure of the test litter to water. The results of these tests are shown in Table 20 below.

TABLE 20

| | Clump Strength | |
|---|---|---|
| | 30 sec. | 1 hr. |
| Test 1 | 1 | 1 |
| Test 2 | 3 | 2 |
| Test 3 | 3 | 2 |
| Average | 2.3 | 1.7 |

Example 11

Blend #9: 70% sodium bentonite (Wyo-Ben Exp. sodium bentonite, bulk density 62.49 lb/ft$^3$, external surface area 18.75 ft$^2$/lb), 30% calcium bentonite (BL-RVM, bulk density 37.7 lb/ft$^3$, external surface area 35.07 ft$^2$/lb). Information about the sodium bentonite of Blend #9 is provided in Table 1902 of FIG. 19. Information about the calcium bentonite of Blend #9 is provided in Table 1802 of FIG. 18. The average particle size of the sodium bentonite is 650 µm. The average particle size of the calcium bentonite is 688 µm.

Information about Blend #9 is provided in Table 21 below:

TABLE 21

| Component | % w/w | PC/lb | PC Dist. | Ext. SA | Ext. SA Dist. |
|---|---|---|---|---|---|
| Sodium bentonite | 70.00 | 2,777,435 | 49 | 13.13 | 56 |
| Calcium bentonite | 30.00 | 2,933,661 | 51 | 10.52 | 44 |
| Totals | 100.00 | 5,711,096 | 100 | 23.65 | 100 |

Clump strength is tested for samples after using the Standard Drop Method Test described above. Tests are conducted 30 seconds and 1 hour after exposure of the test litter to water. No tests are conducted 12 hours, 24 hours and 36 hours after exposure of the test litter to water. The results of these tests are shown in Table 22 below.

TABLE 22

| | Clump Strength | |
|---|---|---|
| | 30 sec. | 1 hr. |
| Test 1 | 1 | 1 |
| Test 2 | 1 | 1 |
| Test 3 | 1 | 1 |
| Average | 1.0 | 1.0 |

Example 12

Blend #10: 80% sodium bentonite (Wyo-Ben Exp. sodium bentonite, bulk density 62.49 lb/ft$^3$, external surface area 18.75 ft$^2$/lb), 20% calcium bentonite (BL-RVM, bulk density 37.7 lb/ft$^3$, external surface area 35.07 ft$^2$/lb). Information about the sodium bentonite of Blend #10 is provided in Table 1902 of FIG. 19. Information about the calcium bentonite of Blend #10 is provided in Table 1802 of FIG. 18. The average particle size of the sodium bentonite is 650 µm. The average particle size of the calcium bentonite is 688 µm.

Information about Blend #10 is provided in Table 23 below:

TABLE 23

| Component | % w/w | PC/lb | PC Dist. | Ext. SA | Ext. SA Dist. |
|---|---|---|---|---|---|
| Sodium bentonite | 80.00 | 3,174,211 | 62 | 15.00 | 68 |
| Calcium bentonite | 20.00 | 1,955,774 | 38 | 7.01 | 32 |
| Totals | 100.00 | 5,129,985 | 100 | 22.01 | 100 |

Clump strength is tested for samples after using the Standard Drop Method Test described above. Tests are conducted 30 seconds and 1 hour after exposure of the test litter to water. No tests are conducted 12 hours, 24 hours and 36 hours after exposure of the test litter to water. The results of these tests are shown in Table 24 below.

TABLE 24

| | Clump Strength | |
|---|---|---|
| | 30 sec. | 1 hr. |
| Test 1 | 1 | 1 |
| Test 2 | 1 | 1 |
| Test 3 | 1 | 1 |
| Average | 1.0 | 1.0 |

Example 13

Blend #11: 65% sodium bentonite (Wyo-Ben Exp. sodium bentonite, bulk density 62.49 lb/ft$^3$, external surface area 18.75 ft$^2$/lb), 35% calcium bentonite (BL-RVM, bulk density 37.7 lb/ft$^3$, external surface area 35.07 ft$^2$/lb). Information about the sodium bentonite of Blend #11 is provided in Table 1902 of FIG. 19. Information about the calcium bentonite of Blend #11 is provided in Table 1802 of FIG. 18. The average particle size of the sodium bentonite is 650 nm. The average particle size of the calcium bentonite is 688 nm.

Information about Blend #11 is provided in Table 25 below:

TABLE 25

| Component | % w/w | PC/lb | PC Dist. | Ext. SA | Ext. SA Dist. |
|---|---|---|---|---|---|
| Sodium bentonite | 65.00 | 2,579,047 | 43 | 12.19 | 50 |
| Calcium bentonite | 35.00 | 3,422,605 | 57 | 12.27 | 50 |
| Totals | 100.00 | 6,001,651 | 100 | 24.46 | 100 |

Clump strength is tested for samples after using the Standard Drop Method Test described above. Tests are conducted 30 seconds and 1 hour after exposure of the test litter to water. No tests are conducted 12 hours, 24 hours and 36 hours after exposure of the test litter to water. The results of these tests are shown in Table 26 below.

TABLE 26

| | Clump Strength | |
|---|---|---|
| | 30 sec. | 1 hr. |
| Test 1 | 1 | 1 |
| Test 2 | 1 | 1 |
| Test 3 | 1 | 1 |
| Average | 1.0 | 1.0 |

Example 14

Blend #12: 50% sodium bentonite (Wyo-Ben sodium bentonite, bulk density 64.2 lb/ft$^3$, external surface area 17.13 ft$^2$/lb), 50% calcium bentonite (BL-RVM, bulk density 37.7 lb/ft$^3$, external surface area 35.07 ft$^2$/lb). Information about the sodium bentonite of Blend #12 is provided in Table 2002 of FIG. 20. Information about the calcium bentonite of Blend #12 is provided in Table 1802 of FIG. 18. The average particle size of the sodium bentonite is 799 μm. The average particle size of the calcium bentonite is 688 μm.

Information about Blend #12 is provided in Table 27 below:

TABLE 27

| Component | % w/w | PC/lb | PC Dist. | Ext. SA | Ext. SA Dist. |
|---|---|---|---|---|---|
| Sodium bentonite | 50.00 | 2,068,587 | 30 | 8.56 | 33 |
| Calcium bentonite | 50.00 | 4,889,435 | 70 | 17.53 | 67 |
| Totals | 100.00 | 6,958,022 | 100 | 26.10 | 100 |

Clump strength is tested for samples after using the Standard Drop Method Test described above. Tests are conducted 30 seconds and 1 hour after exposure of the test litter to water. No tests are conducted 12 hours, 24 hours and 36 hours after exposure of the test litter to water. The results of these tests are shown in Table 28 below.

TABLE 28

| | Clump Strength | |
|---|---|---|
| | 30 sec. | 1 hr. |
| Test 1 | 3 | 2 |
| Test 2 | 2 | 2 |
| Test 3 | 3 | 2 |
| Average | 2.7 | 2.0 |

Example 15

Blend #13: 60% sodium bentonite (Wyo-Ben sodium bentonite, bulk density 64.2 lb/ft$^3$, external surface area 17.13 ft$^2$/lb), 40% calcium bentonite (BL-RVM, bulk density 37.7 lb/ft$^3$, external surface area 35.07 ft$^2$/lb). Information about the sodium bentonite of Blend #13 is provided in Table 2002 of FIG. 20. Information about the calcium bentonite of Blend #13 is provided in Table 1802 of FIG. 18. The average particle size of the sodium bentonite is 799 μm. The average particle size of the calcium bentonite is 688 μm.

Information about Blend #13 is provided in Table 29 below:

TABLE 29

| Component | % w/w | PC/lb | PC Dist. | Ext. SA | Ext. SA Dist. |
|---|---|---|---|---|---|
| Sodium bentonite | 60.00 | 2,482,304 | 39 | 10.28 | 42 |
| Calcium bentonite | 40.00 | 3,911,548 | 61 | 14.03 | 58 |
| Totals | 100.00 | 6,393,853 | 100 | 24.31 | 100 |

Clump strength is tested for samples after using the Standard Drop Method Test described above. Tests are conducted 30 seconds and 1 hour after exposure of the test litter to water. No tests are conducted 12 hours, 24 hours and 36 hours after exposure of the test litter to water. The results of these tests are shown in Table 30 below.

TABLE 30

| | Clump Strength | |
|---|---|---|
| | 30 sec. | 1 hr. |
| Test 1 | 2 | 2 |
| Test 2 | 2 | 1 |
| Test 3 | 1 | 1 |
| Average | 1.7 | 1.3 |

Example 16

Blend #14: 70% sodium bentonite (Wyo-Ben sodium bentonite, bulk density 64.2 lb/ft$^3$, external surface area 17.13 ft$^2$/lb), 30% calcium bentonite (BL-RVM, bulk density 37.7 lb/ft$^3$, external surface area 35.07 ft$^2$/lb). Information about the sodium bentonite of Blend #14 is provided in Table 2002 of FIG. 20. Information about the calcium bentonite of Blend #14 is provided in Table 1802 of FIG. 18. The average particle size of the sodium bentonite is 799 μm. The average particle size of the calcium bentonite is 688 μm.

Information about Blend #14 is provided in Table 31 below:

TABLE 31

| Component | % w/w | PC/lb | PC Dist. | Ext. SA | Ext. SA Dist. |
|---|---|---|---|---|---|
| Sodium bentonite | 70.00 | 2,896,022 | 50 | 11.99 | 53 |
| Calcium bentonite | 30.00 | 2,933,661 | 50 | 10.52 | 47 |
| Totals | 100.00 | 5,829,683 | 100 | 22.51 | 100 |

Clump strength is tested for samples after using the Standard Drop Method Test described above. Tests are conducted 30 seconds and 1 hour after exposure of the test litter to water. No tests are conducted 12 hours, 24 hours and 36 hours after exposure of the test litter to water. The results of these tests are shown in Table 32 below.

TABLE 32

| | Clump Strength | |
| --- | --- | --- |
| | 30 sec. | 1 hr. |
| Test 1 | 1 | 1 |
| Test 2 | 1 | 1 |
| Test 3 | 1 | 1 |
| Average | 1.0 | 1.0 |

Example 17

Blend #15: 60% sodium bentonite (Wyo-Ben sodium bentonite, bulk density 64.4 lb/ft³, external surface area 17.48 ft²/lb), 40% calcium bentonite (BL-RVM, bulk density 41.9 lb/ft³, external surface area 31.60 ft²/lb). Information about the sodium bentonite of Blend #15 is provided in Table 1402 of FIG. 14. Information about the calcium bentonite of Blend #15 is provided in Table 2102 of FIG. 21. The average particle size of the sodium bentonite is 794 μm. The average particle size of the calcium bentonite is 688 μm.

Information about Blend #15 is provided in Table 33 below:

TABLE 33

| Component | % w/w | PC/lb | PC Dist. | Ext. SA | Ext. SA Dist. |
| --- | --- | --- | --- | --- | --- |
| Sodium bentonite | 60.00 | 1,141,676 | 21 | 10.49 | 45 |
| Calcium bentonite | 40.00 | 4,263,602 | 79 | 12.64 | 55 |
| Totals | 100.00 | 5,405,279 | 100 | 23.13 | 100 |

Clump strength is tested for samples after using the Standard Drop Method Test described above. Tests are conducted 30 seconds and 1 hour after exposure of the test litter to water. No tests are conducted 12 hours, 24 hours and 36 hours after exposure of the test litter to water. The results of these tests are shown in Table 34 below.

TABLE 34

| | Clump Strength | |
| --- | --- | --- |
| | 30 sec. | 1 hr. |
| Test 1 | 2 | 2 |
| Test 2 | 2 | 2 |
| Test 3 | 3 | 1 |
| Average | 2.3 | 1.7 |

Example 18

Blend #16: 65% sodium bentonite (Wyo-Ben sodium bentonite, bulk density 64.4 lb/ft³, external surface area 17.48 ft²/lb), 35% calcium bentonite (BL-RVM, bulk density 41.9 lb/ft³, external surface area 31.60 ft²/lb). Information about the sodium bentonite of Blend #16 is provided in Table 1402 of FIG. 14. Information about the calcium bentonite of Blend #16 is provided in Table 2102 of FIG. 21. The average particle size of the sodium bentonite is 794 μm. The average particle size of the calcium bentonite is 688 μm.

Information about Blend #16 is provided in Table 35 below:

TABLE 35

| Component | % w/w | PC/lb | PC Dist. | Ext. SA | Ext. SA Dist. |
| --- | --- | --- | --- | --- | --- |
| Sodium bentonite | 65.00 | 1,236,816 | 25 | 11.36 | 51 |
| Calcium bentonite | 35.00 | 3,730,652 | 75 | 11.06 | 49 |
| Totals | 100.00 | 4,967,468 | 100 | 22.42 | 100 |

Clump strength is tested for samples after using the Standard Drop Method Test described above. Tests are conducted 30 seconds and 1 hour after exposure of the test litter to water. No tests are conducted 12 hours, 24 hours and 36 hours after exposure of the test litter to water. The results of these tests are shown in Table 36 below.

TABLE 36

| | Clump Strength | |
| --- | --- | --- |
| | 30 sec. | 1 hr. |
| Test 1 | 1 | 1 |
| Test 2 | 1 | 1 |
| Test 3 | 1 | 1 |
| Average | 1.0 | 1.0 |

Example 19

Blend #17: 50% sodium bentonite (Wyo-Ben sodium bentonite, bulk density 64.4 lb/ft³, external surface area 17.48 ft²/lb), 50% calcium bentonite (BL-RVM, bulk density 37.1 lb/ft³, external surface area 24.04 ft²/lb). Information about the sodium bentonite of Blend #17 is provided in Table 1402 of FIG. 14. Information about the calcium bentonite of Blend #17 is provided in Table 1502 of FIG. 15. The average particle size of the sodium bentonite is 794 μm. The average particle size of the calcium bentonite is 1117 μm.

Information about Blend #17 is provided in Table 37 below:

TABLE 37

| Component | % w/w | PC/lb | PC Dist. | Ext. SA | Ext. SA Dist. |
| --- | --- | --- | --- | --- | --- |
| Sodium bentonite | 50.00 | 951,397 | 58 | 8.74 | 42 |
| Calcium bentonite | 50.00 | 690,696 | 42 | 12.02 | 58 |
| Totals | 100.00 | 1,642,094 | 100 | 20.76 | 100 |

Clump strength is tested for samples after using the Standard Drop Method Test described above. Tests are conducted 30 seconds, 1 hour, 12 hours, 24 hours and 36 hours after exposure of the test litter to water. The results of these tests are shown in Table 38 below.

TABLE 38

| | Clump Strength | | | | |
| --- | --- | --- | --- | --- | --- |
| | 30 sec. | 1 hr. | 12 hrs. | 24 hrs. | 36 hrs. |
| Test 1 | 2 | 1 | 1 | 1 | 1 |
| Test 2 | 3 | 1 | 1 | 1 | 1 |
| Test 3 | 3 | 1 | 1 | 2 | 1 |
| Average | 2.7 | 1.0 | 1.0 | 1.3 | 1.0 |

Example 20

Blend #16:55% sodium bentonite (Wyo-Ben sodium bentonite, bulk density 64.4 lb/ft³, external surface area 17.48 ft²/lb), 45% calcium bentonite (BL-RVM, bulk density 37.1 lb/ft³, external surface area 24.04 ft²/lb). Information about the sodium bentonite of Blend #18 is provided in Table 1402 of FIG. 14. Information about the calcium bentonite of Blend #18 is provided in Table 1502 of FIG. 15. The average particle size of the sodium bentonite is 794 µm. The average particle size of the calcium bentonite is 1117 µm.

Information about Blend #18 is provided in Table 39 below:

TABLE 39

| Component | % w/w | PC/lb | PC Dist. | Ext. SA | Ext. SA Dist. |
|---|---|---|---|---|---|
| Sodium bentonite | 55.00 | 1,046,537 | 63 | 9.61 | 47 |
| Calcium bentonite | 45.00 | 621,627 | 37 | 10.82 | 53 |
| Totals | 100.00 | 1,668,164 | 100 | 20.43 | 100 |

Clump strength is tested for samples after using the Standard Drop Method Test described above. Tests are conducted 30 seconds, 1 hour, 12 hours, 24 hours and 36 hours after exposure of the test litter to water. The results of these tests are shown in Table 40 below.

TABLE 40

| | Clump Strength | | | | |
|---|---|---|---|---|---|
| | 30 sec. | 1 hr. | 12 hrs. | 24 hrs. | 36 hrs. |
| Test 1 | 1 | 1 | 1 | 1 | 1 |
| Test 2 | 1 | 1 | 1 | 1 | 1 |
| Test 3 | 1 | 1 | 1 | 1 | 1 |
| Average | 1.0 | 1.0 | 1.0 | 1.0 | 1.0 |

Example 21

Blend #19:0% sodium bentonite (Wyo-Ben sodium bentonite, bulk density 64.4 lb/ft³, external surface area 17.48 ft²/lb), 40% calcium bentonite (BL-RVM, bulk density 37.1 lb/ft³, external surface area 24.04 ft²/lb). Information about the sodium bentonite of Blend #19 is provided in Table 1402 of FIG. 14. Information about the calcium bentonite of Blend #19 is provided in Table 1502 of FIG. 15. The average particle size of the sodium bentonite is 794 µm. The average particle size of the calcium bentonite is 1117 µm.

Information about Blend #19 is provided in Table 41 below:

TABLE 41

| Component | % w/w | PC/lb | PC Dist. | Ext. SA | Ext. SA Dist. |
|---|---|---|---|---|---|
| Sodium bentonite | 60.00 | 1,141,676 | 67 | 10.49 | 52 |
| Calcium bentonite | 40.00 | 552,557 | 33 | 9.62 | 48 |
| Totals | 100.00 | 1,694,234 | 100 | 20.11 | 100 |

Clump strength is tested for samples after using the Standard Drop Method Test described above. Tests are conducted 30 seconds, 1 hour, 12 hours, 24 hours and 36 hours after exposure of the test litter to water. The results of these tests are shown in Table 42 below.

TABLE 42

| | Clump Strength | | | | |
|---|---|---|---|---|---|
| | 30 sec. | 1 hr. | 12 hrs. | 24 hrs. | 36 hrs. |
| Test 1 | 1 | 1 | 1 | 1 | 1 |
| Test 2 | 1 | 1 | 1 | 1 | 1 |
| Test 3 | 1 | 1 | 1 | 1 | 1 |
| Average | 1.0 | 1.0 | 1.0 | 1.0 | 1.0 |

Example 22

Blend 20:40% sodium bentonite (Wyo-Ben sodium bentonite, bulk density 64.4 lb/ft³, external surface area 17.66 ft²/lb), 60% calcium bentonite (BL-RVM, bulk density 46.22 lb/ft³, external surface area 14.02 ft²/lb). Information about the sodium bentonite of Blend #20 is provided in Table 1402 of FIG. 14. Information about the calcium bentonite of Blend #20 is provided in Table 2202 of FIG. 22. The average particle size of the sodium bentonite is 778 µm. The average particle size of the calcium bentonite is 1960 µm.

Information about Blend #20 is provided in Table 43 below:

TABLE 43

| Component | % w/w | PC/lb | PC Dist. | Ext. SA | Ext. SA Dist. |
|---|---|---|---|---|---|
| Sodium bentonite | 40.00 | 2,524,423 | 49 | 7.06 | 46 |
| Calcium bentonite | 60.00 | 2,607,640 | 51 | 8.41 | 54 |
| Totals | 100.00 | 5,132,062 | 100 | 15.48 | 100 |

Clump strength is tested for samples after using the Standard Drop Method Test described above. Tests are conducted 30 seconds, 1 hour, 12 hours and 24 hours after exposure of the test litter to water. No tests are conducted 36 hours after exposure of the test litter to water. The results of these tests are shown in Table 44 below.

TABLE 44

| | Clump Strength | | | |
|---|---|---|---|---|
| | 30 sec. | 1 hr. | 12 hrs. | 24 hrs. |
| Test 1 | 1 | 1 | 3 | 1 |
| Test 2 | 2 | 1 | 2 | 1 |
| Test 3 | 2 | 1 | 1 | 1 |
| Average | 1.7 | 1.0 | 2.0 | 1.0 |

Example 23

Blend #21:45% sodium bentonite (Wyo-Ben sodium bentonite, bulk density 64.4 lb/ft³, external surface area 17.66 ft²/lb), 55% calcium bentonite (BL-RVM, bulk density 46.22 lb/ft³, external surface area 14.02 ft²/lb). Information about the sodium bentonite of Blend #21 is provided in Table 1402 of FIG. 14. Information about the calcium bentonite of Blend #21 is provided in Table 2202 of FIG. 22. The average particle size of the sodium bentonite is 778 µm. The average particle size of the calcium bentonite is 1960 µm.

Information about Blend #21 is provided in Table 45 below:

TABLE 45

| Component | % w/w | PC/lb | PC Dist. | Ext. SA | Ext. SA Dist. |
|---|---|---|---|---|---|
| Sodium bentonite | 45.00 | 2,839,975 | 54 | 7.95 | 51 |
| Calcium bentonite | 55.00 | 2.390,336 | 46 | 7.71 | 49 |
| Totals | 100.00 | 5,230,312 | 100 | 15.66 | 100 |

Clump strength is tested for samples after using the Standard Drop Method Test described above. Tests are conducted 30 seconds, 1 hour, 12 hours and 24 hours after exposure of the test litter to water. No tests are conducted 36 hours after exposure of the test litter to water. The results of these tests are shown in Table 46 below.

TABLE 46

| | Clump Strength | | | |
|---|---|---|---|---|
| | 30 sec. | 1 hr. | 12 hrs. | 24 hrs. |
| Test 1 | 1 | 1 | 2 | 1 |
| Test 2 | 1 | 1 | 1 | 1 |
| Test 3 | 1 | 1 | 1 | 1 |
| Average | 1.0 | 1.0 | 1.3 | 1.0 |

Example 24

Blend #22: 50% sodium bentonite (Wyo-Ben sodium bentonite, bulk density 64.4 lb/ft$^3$, external surface area 17.66 ft$^2$/lb), 50% calcium bentonite (BL-RVM, bulk density 46.22 lb/ft$^3$, external surface area 14.02 ft$^2$/lb). Information about the sodium bentonite of Blend #22 is provided in Table 1402 of FIG. 14. Information about the calcium bentonite of Blend #22 is provided in Table 2202 of FIG. 22. The average particle size of the sodium bentonite is 778 μm. The average particle size of the calcium bentonite is 1960 μm.

Information about Blend #22 is provided in Table 47 below:

TABLE 47

| Component | % w/w | PC/lb | PC Dist. | Ext. SA | Ext. SA Dist. |
|---|---|---|---|---|---|
| Sodium bentonite | 50.00 | 3,155,528 | 59 | 8.83 | 56 |
| Calcium bentonite | 50.00 | 2,173,033 | 41 | 7.01 | 44 |
| Totals | 100.00 | 5,328,561 | 100 | 15.84 | 100 |

Clump strength is tested for samples after using the Standard Drop Method Test described above. Tests are conducted 30 seconds, 1 hour, 12 hours and 24 hours after exposure of the test litter to water. No tests are conducted 36 hours after exposure of the test litter to water. The results of these tests are shown in Table 48 below.

TABLE 48

| | Clump Strength | | | |
|---|---|---|---|---|
| | 30 sec. | 1 hr. | 12 hrs. | 24 hrs. |
| Test 1 | 1 | 1 | 1 | 1 |
| Test 2 | 1 | 1 | 1 | 1 |
| Test 3 | 1 | 1 | 1 | 1 |
| Average | 1.0 | 1.0 | 1.0 | 1.0 |

Example 25

Blend #23: 5% sodium bentonite (Wyo-Ben sodium bentonite, bulk density 64.86 lb/f$^3$, external surface area 16.33 ft$^2$/lb), 45% calcium bentonite (BL-RVM, bulk density 39.75 lb/f$^3$, external surface area 22.80 ft$^2$/lb). Information about the sodium bentonite of Blend #23 is provided in Table 2302 of FIG. 23. Information about the calcium bentonite of Blend #23 is provided in Table 2402 of FIG. 24. The average particle size of the sodium bentonite is 832 μm. The average particle size of the calcium bentonite is 1094 μm.

Information about Blend #23 is provided in Table 49 below:

TABLE 49

| Component | % w/w | PC/lb | PC Dist. | Ext. SA | Ext. SA Dist. |
|---|---|---|---|---|---|
| Sodium bentonite | 55.00 | 1,227,224 | 46 | 8.98 | 47 |
| Calcium bentonite | 45.00 | 1,424,663 | 54 | 10.26 | 53 |
| Totals | 100.00 | 2,651,887 | 100 | 19.24 | 100 |

Clump strength is tested for samples after using the Standard Drop Method Test described above. Tests are conducted 30 seconds, 1 hour, 12 hours and 24 hours after exposure of the test litter to water. No tests are conducted 36 hours after exposure of the test litter to water. The results of these tests are shown in Table 50 below.

TABLE 50

| | Clump Strength | | | |
|---|---|---|---|---|
| | 30 sec. | 1 hr. | 12 hrs. | 24 hrs. |
| Test 1 | 1 | 1 | 1 | 1 |
| Test 2 | 1 | 1 | 1 | 1 |
| Test 3 | 1 | 1 | 1 | 1 |
| Average | 1.0 | 1.0 | 1.0 | 1.0 |

Example 26

Blend #24: 50% sodium bentonite (Wyo-Ben sodium bentonite, bulk density 63.3 lb/ft$^3$, external surface area 17.01 ft$^2$/lb), 50% paper granules (paper granule Biodac, bulk density 46.5 lb/ft$^3$, external surface area 18.17 ft$^2$/lb). The final density of the blend is 55.90 lb/ft$^3$. Information about the sodium bentonite of Blend #24 is provided in Table 2502 of FIG. 25. Information about the paper granules of Blend #24 is provided in Table 2602 of FIG. 26. The average particle size of the sodium bentonite is 927 μm. The average particle size of the paper granules is 1224 μm.

Information about Blend #24 is provided in Table 51 below:

TABLE 51

| Component | % w/w | PC/lb | PC Dist. | Ext. SA | Ext. SA Dist. |
|---|---|---|---|---|---|
| Sodium bentonite | 50.00 | 4,375,015 | 94 | 8.51 | 48 |
| Paper granules | 50.00 | 274,075 | 6 | 9.09 | 52 |
| Totals | 100.00 | 4,649,090 | 100 | 17.59 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 52 below.

TABLE 52

| | Clump Strength | | | |
|---|---|---|---|---|
| | 30 sec. | 1 hr. | 24 hrs. | 72 hrs. |
| Test 1 | 1 | 1 | 1 | 1 |
| Test 2 | 2 | 2 | 1 | 1 |
| Test 3 | 2 | 2 | 2 | 3 |
| Average | 1.7 | 1.7 | 1.3 | 1.7 |

Example 27

Blend #25: 55% sodium bentonite (Wyo-Ben sodium bentonite, bulk density 63.3 lb/ft$^3$, external surface area 17.01 ft$^2$/lb), 45% paper granules (paper granule Biodac, bulk density 46.5 lb/ft$^3$, external surface area 18.17 ft$^2$/lb). The final density of the blend is 57.23 lb/ft$^3$. Information about the sodium bentonite of Blend #25 is provided in Table 2502 of FIG. 25. Information about the paper granules of Blend #25 is provided in Table 2602 of FIG. 26. The average particle size of the sodium bentonite is 927 μm. The average particle size of the paper granules is 1224 μm.

Information about Blend #25 is provided in Table 53 below:

TABLE 53

| Component | % w/w | PC/lb | PC Dist. | Ext. SA | Ext. SA Dist. |
|---|---|---|---|---|---|
| Sodium bentonite | 55.00 | 4,812,516 | 95 | 9.36 | 53 |
| Paper granules | 45.00 | 246,668 | 5 | 8.18 | 47 |
| Totals | 100.00 | 5,059,184 | 100 | 17.53 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 54 below.

TABLE 54

| | Clump Strength | | | |
|---|---|---|---|---|
| | 30 sec. | 1 hr. | 24 hrs. | 72 hrs. |
| Test 1 | 1 | 1 | 1 | 1 |
| Test 2 | 1 | 1 | 1 | 1 |
| Test 3 | 1 | 1 | 1 | 1 |
| Average | 1.0 | 1.0 | 1.0 | 1.0 |

Example 28

Blend #26: 65% sodium bentonite (Wyo-Ben sodium bentonite, bulk density 63.3 lb/ft$^3$, external surface area 17.01 ft$^2$/lb), 35% paper granules (paper granule Biodac, bulk density 46.5 lb/ft$^3$, external surface area 18.17 ft$^2$/lb). The final density of the blend is 57.25 lb/ft$^3$. Information about the sodium bentonite of Blend #26 is provided in Table 2502 of FIG. 25. Information about the paper granules of Blend #26 is provided in Table 2602 of FIG. 26. The average particle size of the sodium bentonite is 927 μm. The average particle size of the paper granules is 1224 μm.

Information about Blend #26 is provided in Table 55 below:

TABLE 55

| Component | % w/w | PC/lb | PC Dist. | Ext. SA | Ext. SA Dist. |
|---|---|---|---|---|---|
| Sodium bentonite | 65.00 | 5,687,519 | 97 | 11.06 | 63 |
| Paper granules | 35.00 | 191,853 | 3 | 6.36 | 37 |
| Totals | 100.00 | 5,879,372 | 100 | 17.42 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 56 below.

TABLE 56

| | Clump Strength | | | |
|---|---|---|---|---|
| | 30 sec. | 1 hr. | 24 hrs. | 72 hrs. |
| Test 1 | 1 | 1 | 1 | 1 |
| Test 2 | 1 | 1 | 1 | 1 |
| Test 3 | 1 | 1 | 1 | 1 |
| Average | 1.0 | 1.0 | 1.0 | 1.0 |

Example 29

Blend #27: 0% sodium bentonite (Wyo-Ben sodium bentonite, bulk density 63.3 lb/ft$^3$, external surface area 17.01 ft$^2$/lb), 30% paper granules (paper granule Biodac, bulk density 46.5 lb/ft$^3$, external surface area 18.17 ft$^2$/lb). The final density of the blend is 58.45 lb/ft$^3$. Information about the sodium bentonite of Blend #27 is provided in Table 2502 of FIG. 25. Information about the paper granules of Blend #27 is provided in Table 2602 of FIG. 26. The average particle size of the sodium bentonite is 927 μm. The average particle size of the paper granules is 1224 μm.

Information about Blend #27 is provided in Table 57 below:

TABLE 57

| Component | % w/w | PC/lb | PC Dist. | Ext. SA | Ext. SA Dist. |
|---|---|---|---|---|---|
| Sodium bentonite | 70.00 | 6,125,021 | 97 | 11.91 | 69 |
| Paper granules | 30.00 | 164,445 | 3 | 5.45 | 31 |
| Totals | 100.00 | 6,289,466 | 100 | 17.36 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 58 below.

TABLE 58

| | Clump Strength | | | |
|---|---|---|---|---|
| | 30 sec. | 1 hr. | 24 hrs. | 72 hrs. |
| Test 1 | 1 | 1 | 1 | 1 |
| Test 2 | 1 | 1 | 1 | 1 |

TABLE 58-continued

| | Clump Strength | | | |
|---|---|---|---|---|
| | 30 sec. | 1 hr. | 24 hrs. | 72 hrs. |
| Test 3 | 1 | 1 | 1 | 1 |
| Average | 1.0 | 1.0 | 1.0 | 1.0 |

Example 30

Blend #28:86% sodium bentonite (Wyo-Ben sodium bentonite, bulk density 63.3 lb/ft$^3$, external surface area 17.01 ft$^2$/lb), 14% wood fiber particles (bulk density 7.5 lb/ft$^3$, external surface area 102.56 ft$^2$/lb). The final density of the blend is 41.13 lb/ft$^3$. Information about the sodium bentonite of Blend #28 is provided in Table 2502 of FIG. 25. Information about the wood fiber of Blend #28 is provided in Table 2702 of FIG. 27. The average particle size of the sodium bentonite is 927 µm. The average particle size of the wood fiber particles is 1460 µm.

Information about Blend #28 is provided in Table 59 below:

TABLE 59

| Component | % w/w | PC/lb | PC Dist. | Ext. SA | Ext. SA Dist. |
|---|---|---|---|---|---|
| Sodium bentonite | 86.00 | 7,525,026 | 77 | 14.63 | 50 |
| Wood fiber | 14.00 | 2,264,048 | 23 | 14.36 | 50 |
| Totals | 100.00 | 9,789,074 | 100 | 28.99 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 60 below.

TABLE 60

| | Clump Strength | | | |
|---|---|---|---|---|
| | 30 sec. | 1 hr. | 24 hrs. | 72 hrs. |
| Test 1 | 1 | 1 | 2 | 1 |
| Test 2 | 1 | 1 | 1 | 1 |
| Test 3 | 2 | 1 | 3 | 1 |
| Average | 1.3 | 1.0 | 2.0 | 1.0 |

Example 31

Blend #29:40% sodium bentonite (Wyo-Ben sodium bentonite, bulk density 63.3 lb/ft$^3$, external surface area 17.01 ft$^2$/lb), 60% barley grains (bulk density 49.7 lb/ft$^3$, external surface area 17.95 ft$^2$/lb). The final density of the blend is 56.91 lb/ft$^3$. Information about the sodium bentonite of Blend #29 is provided in Table 2502 of FIG. 25. Information about the barley grains of Blend #29 is provided in Table 2802 of FIG. 28. The average particle size of the sodium bentonite is 927 µm. The average particle size of the barley grains is 1321

Information about Blend #29 is provided in Table 61 below:

TABLE 61

| Component | % w/w | PC/lb | PC Dist. | Ext. SA | Ext. SA Dist. |
|---|---|---|---|---|---|
| Sodium bentonite | 40.00 | 3,500,012 | 72 | 6.80 | 39 |
| Barley grains | 60.00 | 1,363,828 | 28 | 10.77 | 61 |
| Totals | 100.00 | 4,863,840 | 100 | 17.57 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 62 below.

TABLE 62

| | Clump Strength | | | |
|---|---|---|---|---|
| | 30 sec. | 1 hr. | 24 hrs. | 72 hrs. |
| Test 1 | 2 | 1 | 1 | 1 |
| Test 2 | 2 | 1 | 1 | 1 |
| Test 3 | 1 | 1 | 1 | 1 |
| Average | 1.7 | 1.0 | 1.0 | 1.0 |

Example 32

Blend #30:45% sodium bentonite (Wyo-Ben sodium bentonite, bulk density 63.3 lb/ft$^3$, external surface area 17.01 ft$^2$/lb), 55% barley grains (bulk density 49.7 lb/ft$^3$, external surface area 17.95 ft$^2$/lb). The final density of the blend is 58.13 lb/ft$^3$. Information about the sodium bentonite of Blend #30 is provided in Table 2502 of FIG. 25. Information about the barley grains of Blend #30 is provided in Table 2804 of FIG. 28. The average particle size of the sodium bentonite is 927 µm. The average particle size of the barley grains is 1321 µm.

Information about Blend #30 is provided in Table 63 below:

TABLE 63

| Component | % w/w | PC/lb | PC Dist. | Ext. SA | Ext. SA Dist. |
|---|---|---|---|---|---|
| Sodium bentonite | 45.00 | 3,937,513 | 76 | 7.65 | 44 |
| Barley grains | 55.00 | 1,250,175 | 24 | 9.87 | 56 |
| Totals | 100.00 | 5,187,689 | 100 | 17.53 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 64 below.

TABLE 64

| | Clump Strength | | | |
|---|---|---|---|---|
| | 30 sec. | 1 hr. | 24 hrs. | 72 hrs. |
| Test 1 | 1 | 1 | 1 | 1 |
| Test 2 | 1 | 1 | 1 | 1 |
| Test 3 | 1 | 1 | 1 | 1 |
| Average | 1.0 | 1.0 | 1.0 | 1.0 |

Example 33

Blend #31: 50% sodium bentonite (Wyo-Ben sodium bentonite, bulk density 63.3 lb/ft³, external surface area 17.01 ft²/lb), 50% barley grains (bulk density 49.7 lb/ft³, external surface area 17.95 ft²/lb). The final density of the blend is 58.66 lb/ft³. Information about the sodium bentonite of Blend #31 is provided in Table 2502 of FIG. 25. Information about the barley grains of Blend #31 is provided in Table 2802 of FIG. 28. The average particle size of the sodium bentonite is 927 μm. The average particle size of the barley grains is 1321 μm.

Information about Blend #31 is provided in Table 65 below:

TABLE 65

| Component | % w/w | PC/lb | PC Dist. | Ext. SA | Ext. SA Dist. |
|---|---|---|---|---|---|
| Sodium bentonite | 50.00 | 4,375,015 | 79 | 8.51 | 49 |
| Barley grains | 50.00 | 1,136,523 | 21 | 8.97 | 51 |
| Totals | 100.00 | 5,511,538 | 100 | 17.48 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 66 below.

TABLE 66

| | Clump Strength | | | |
|---|---|---|---|---|
| | 30 sec. | 1 hr. | 24 hrs. | 72 hrs. |
| Test 1 | 2 | 1 | 1 | 1 |
| Test 2 | 1 | 1 | 1 | 1 |
| Test 3 | 1 | 1 | 1 | 1 |
| Average | 1.3 | 1.0 | 1.0 | 1.0 |

Example 34

Blend #32 55% sodium bentonite (engineered light weight sodium bentonite, bulk density 49.66 lb/ft³, external surface area 21.00 ft²/lb), 45% calcium bentonite (BL-RVM, bulk density 41.1 lb/ft³, external surface area 22.06 ft²/lb). The final density of the blend is 45.40 lb/ft³. Information about the sodium bentonite of Blend #32 is provided in Table 2902 of FIG. 29. Information about the calcium bentonite of Blend #32 is provided in Table 1602 of FIG. 16. The average particle size of the sodium bentonite is 942 μm. The average particle size of the calcium bentonite is 1995 μm.

Information about Blend #32 is provided in Table 67 below:

TABLE 67

| Component | % w/w | PC/lb | PC Dist. | Ext. SA | Ext. SA Dist. |
|---|---|---|---|---|---|
| Sodium bentonite | 55.00 | 3,619,874 | 72 | 11.55 | 54 |
| Calcium bentonite | 45.00 | 1,410,439 | 28 | 9.93 | 46 |
| Totals | 100.00 | 5,030,313 | 100 | 21.48 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 68 below.

TABLE 68

| | Clump Strength | | | |
|---|---|---|---|---|
| | 30 sec. | 1 hr. | 24 hrs. | 72 hrs. |
| Test 1 | 2 | 1 | 1 | 1 |
| Test 2 | 2 | 1 | 1 | 1 |
| Test 3 | 2 | 1 | 1 | 1 |
| Average | 2.0 | 1.0 | 1.0 | 1.0 |

Example 35

A litter is prepared that is 100% sodium bentonite (bulk density 63.3 lb/ft³, total external surface area 17.01 ft²/lb). Information about the sodium bentonite litter is provided in Table 2502 of FIG. 25. The average particle size of the sodium bentonite is 927 μm.

Information about this litter is provided in Table 69 below:

TABLE 69

| Component | % w/w | PC/lb | PC Dist. | Ext. SA | Ext. SA Dist. |
|---|---|---|---|---|---|
| Sodium bentonite | 100.00 | 8,750,030 | 100 | 17.01 | 100 |
| Total | 100.00 | 8,750,030 | 100 | 17.01 | 100 |

Clump strength is tested for samples after using the Standard Drop Method Test described above. Tests are conducted 30 seconds, 1 hour, 24 hours and 72 hours after exposure of the test litter to water. The results of these tests are shown in Table 70 below.

TABLE 70

| | Clump Strength | | | |
|---|---|---|---|---|
| | 30 sec. | 1 hr. | 24 hrs. | 72 hrs. |
| Test 1 | 1 | 1 | 1 | 1 |
| Test 2 | 1 | 1 | 1 | 1 |
| Test 3 | 1 | 1 | 1 | 1 |
| Average | 1.0 | 1.0 | 1.0 | 1.0 |

Example 36

Blend #33: 5% sodium bentonite (Wyo-Ben sodium bentonite, bulk density 65.74 lb/ft³, external surface area 17.63 ft²/lb), 55% calcium bentonite (BL-RVM, bulk density 42.1 lb/ft³, external surface area 21.40 ft²/lb). The final density of the blend is 52.03 lb/ft³. Information about the sodium bentonite of Blend #33 is provided in Table 3002 of FIG. 30. Information about the calcium bentonite of Blend #33 is provided in Table 3102 of FIG. 31. The average particle size of the sodium bentonite is 775 μm. The average particle size of the calcium bentonite is 1096 μm.

Information about Blend #33 is provided in Table 71 below:

TABLE 71

| Component | % w/w | PC/lb | PC Dist. | Ext. SA | Ext. SA Dist. |
|---|---|---|---|---|---|
| Sodium bentonite | 45.00 | 860,164 | 47 | 7.93 | 40 |
| Calcium bentonite | 55.00 | 969,778 | 53 | 11.77 | 60 |
| Totals | 100.00 | 1,829,941 | 100 | 19.71 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 72 below.

TABLE 72

| | Clump Strength | | | |
|---|---|---|---|---|
| | 30 sec. | 1 hr. | 24 hrs. | 72 hrs. |
| Test 1 | 3 | 2 | 1 | 3 |
| Test 2 | 2 | 3 | 1 | 1 |
| Test 3 | 3 | 1 | 3 | 2 |
| Average | 2.7 | 2.0 | 1.7 | 2.0 |

Example 37

Blend #34: 50% sodium bentonite (Wyo-Ben sodium bentonite, bulk density 65.74 lb/ft$^3$, external surface area 17.63 ft$^2$/lb), 50% calcium bentonite (BL-RVM, bulk density 42.1 lb/ft$^3$, external surface area 21.40 ft$^2$/lb). The final density of the blend is 53.05 lb/ft$^3$. Information about the sodium bentonite of Blend #34 is provided in Table 3002 of FIG. 30. Information about the calcium bentonite of Blend #33 is provided in Table 3102 of FIG. 31. The average particle size of the sodium bentonite is 775 μm. The average particle size of the calcium bentonite is 1096 μm.

Information about Blend #34 is provided in Table 73 below:

TABLE 73

| Component | % w/w | PC/lb | PC Dist. | Ext. SA | Ext. SA Dist. |
|---|---|---|---|---|---|
| Sodium bentonite | 50.00 | 955,737 | 52 | 8.81 | 45 |
| Calcium bentonite | 50.00 | 881,616 | 48 | 10.70 | 55 |
| Totals | 100.00 | 1,837,353 | 100 | 19.52 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 74 below.

TABLE 74

| | Clump Strength | | | |
|---|---|---|---|---|
| | 30 sec. | 1 hr. | 24 hrs. | 72 hrs. |
| Test 1 | 1 | 2 | 1 | 2 |
| Test 2 | 1 | 2 | 1 | 1 |
| Test 3 | 2 | 1 | 2 | 3 |
| Average | 1.3 | 1.7 | 1.3 | 2.0 |

Example 38

Blend #35: 55% sodium bentonite (Wyo-Ben sodium bentonite, bulk density 65.74 lb/ft$^3$, external surface area 17.63 ft$^2$/lb), 45% calcium bentonite (BL-RVM, bulk density 42.1 lb/ft$^3$, external surface area 21.40 ft$^2$/lb). The final density of the blend is 54.13 lb/ft$^3$. Information about the sodium bentonite of Blend #35 is provided in Table 3002 of FIG. 30. Information about the calcium bentonite of Blend #35 is provided in Table 3102 of FIG. 31. The average particle size of the sodium bentonite is 775 μm. The average particle size of the calcium bentonite is 1096 μm.

Information about Blend #35 is provided in Table 75 below:

TABLE 75

| Component | % w/w | PC/lb | PC Dist. | Ext. SA | Ext. SA Dist. |
|---|---|---|---|---|---|
| Sodium bentonite | 55.00 | 1,051,311 | 57 | 9.70 | 50 |
| Calcium bentonite | 45.00 | 793,455 | 43 | 9.63 | 50 |
| Totals | 100.00 | 1,844,766 | 100 | 19.33 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 76 below.

TABLE 76

| | Clump Strength | | | |
|---|---|---|---|---|
| | 30 sec. | 1 hr. | 24 hrs. | 72 hrs. |
| Test 1 | 1 | 1 | 1 | 1 |
| Test 2 | 1 | 1 | 1 | 3 |
| Test 3 | 1 | 1 | 1 | 1 |
| Average | 1.0 | 1.0 | 1.0 | 1.7 |

Example 39

Blend #36: 60% sodium bentonite (Wyo-Ben sodium bentonite, bulk density 65.74 lb/ft$^3$, external surface area 17.63 ft$^2$/lb), 40% calcium bentonite (BL-RVM, bulk density 42.1 lb/ft$^3$, external surface area 21.40 ft$^2$/lb). The final density of the blend is 54.21 lb/ft$^3$. Information about the sodium bentonite of Blend #36 is provided in Table 3002 of FIG. 30. Information about the calcium bentonite of Blend #36 is provided in Table 3102 of FIG. 31. The average particle size of the sodium bentonite is 775 μm. The average particle size the calcium bentonite is 1096 μm.

Information about Blend #36 is provided in Table 77 below:

TABLE 77

| Component | % w/w | PC/lb | PC Dist. | Ext. SA | Ext. SA Dist. |
|---|---|---|---|---|---|
| Sodium bentonite | 60.00 | 1,146,885 | 62 | 10.58 | 55 |
| Calcium bentonite | 40.00 | 705,293 | 38 | 8.56 | 45 |
| Totals | 100.00 | 1,852,178 | 100 | 19.14 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 78 below.

TABLE 78

| | Clump Strength | | | |
|---|---|---|---|---|
| | 30 sec. | 1 hr. | 24 hrs. | 72 hrs. |
| Test 1 | 1 | 1 | 1 | 1 |
| Test 2 | 1 | 1 | 1 | 1 |
| Test 3 | 1 | 1 | 1 | 1 |
| Average | 1.0 | 1.0 | 1.0 | 1.0 |

Example 40

Blend #37: 45% sodium bentonite (Wyo-Ben sodium bentonite, bulk density 65.74 lb/ft$^3$, external surface area 17.63 ft$^2$/lb), 55% calcium bentonite (BL-RVM, bulk density 42.1 lb/ft$^3$, external surface area 21.40 ft$^2$/lb). The final density of the blend is 52.30 lb/ft$^3$. Information about the sodium bentonite of Blend #37 is provided in Table 3002 of FIG. 30. Information about the calcium bentonite of Blend #37 is provided in Table 3102 of FIG. 31. The average particle size of the sodium bentonite is 775 μm. The average particle size of the calcium bentonite is 1096 μm.

Information about Blend #37 is provided in Table 79 below:

TABLE 79

| Component | % w/w | PC/lb | PC Dist. | Ext. SA | Ext. SA Dist. |
|---|---|---|---|---|---|
| Sodium bentonite | 45.00 | 860,164 | 47 | 7.93 | 40 |
| Calcium bentonite | 55.00 | 969,778 | 53 | 11.77 | 60 |
| Totals | 100.00 | 1,829,941 | 100 | 19.71 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 80 below.

TABLE 80

| | Clump Strength | | | |
|---|---|---|---|---|
| | 30 sec. | 1 hr. | 24 hrs. | 72 hrs. |
| Test 1 | 3 | 2 | 1 | 3 |
| Test 2 | 1 | 2 | 1 | 1 |
| Test 3 | 2 | 2 | 1 | 1 |
| Average | 2.0 | 2.0 | 1.0 | 1.7 |

Example 41

Blend #38: 50% sodium bentonite (Wyo-Ben sodium bentonite, bulk density 65.74 lb/ft$^3$, external surface area 17.63 ft$^2$/lb), 50% PTFE-coated calcium bentonite (BL-RVM coated with 40 lbs of 1.2% PTFE solution per ton of clay, bulk density prior to coating 42.1 lb/ft$^3$, external surface area prior to coating 21.40 ft$^2$/lb). The final density of the blend is 53.13 lb/ft$^3$. Information about the sodium bentonite of Blend #38 is provided in Table 3002 of FIG. 30. Information about the calcium bentonite of Blend #38 is provided in Table 3102 of FIG. 31. The average particle size of the sodium bentonite is 775 μm. The average particle size of the calcium bentonite is 1096 μm.

Information about Blend #38 is provided in Table 81 below:

TABLE 81

| Component | % w/w | PC/lb | PC Dist. | Ext. SA | Ext. SA Dist. |
|---|---|---|---|---|---|
| Sodium bentonite | 50.00 | 955,737 | 52 | 8.81 | 45 |
| PTFE-coated calcium bentonite | 50.00 | 881,616 | 48 | 10.70 | 55 |
| Totals | 100.00 | 1,837,353 | 100 | 19.52 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 82 below.

TABLE 82

| | Clump Strength | | | |
|---|---|---|---|---|
| | 30 sec. | 1 hr. | 24 hrs. | 72 hrs. |
| Test 1 | 1 | 2 | 1 | 2 |
| Test 2 | 1 | 1 | 1 | 1 |
| Test 3 | 2 | 3 | 2 | 3 |
| Average | 1.3 | 2.0 | 1.3 | 2.0 |

Example 42

Blend #39: 55% sodium bentonite (Wyo-Ben sodium bentonite, bulk density 65.74 lb/ft', external surface area 17.63 ft$^2$/lb), 45% PTFE-coated calcium bentonite (BL-RVM coated with 40 lbs of 1.2% PTFE solution per ton of clay, bulk density prior to coating 42.1 lb/ft$^3$, external surface area prior to coating 21.40 ft$^2$/lb). The final density of the blend is 54.27 lb/ft$^3$. Information about the sodium bentonite of Blend #39 is provided in Table 3002 of FIG. 30. Information about the calcium bentonite of Blend #39 is provided in Table 3102 of FIG. 31. The average particle size of the sodium bentonite is 775 μm. The average particle size of the calcium bentonite is 1096 μm.

Information about Blend #39 is provided in Table 83 below:

TABLE 83

| Component | % w/w | PC/lb | PC Dist. | Ext. SA | Ext. SA Dist. |
|---|---|---|---|---|---|
| Sodium bentonite | 55.00 | 1,051,311 | 57 | 9.70 | 50 |
| PTFE-coated calcium bentonite | 45.00 | 793,455 | 43 | 9.63 | 50 |
| Totals | 100.00 | 1,844,766 | 100 | 19.33 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 84 below.

TABLE 84

| | Clump Strength | | | |
|---|---|---|---|---|
| | 30 sec. | 1 hr. | 24 hrs. | 72 hrs. |
| Test 1 | 1 | 1 | 1 | 1 |
| Test 2 | 1 | 2 | 1 | 2 |
| Test 3 | 1 | 3 | 1 | 1 |
| Average | 1.0 | 2.0 | 1.0 | 1.3 |

Example 43

Blend #40:60% sodium bentonite (Wyo-Ben sodium bentonite, bulk density 65.74 lb/ft$^3$, external surface area 17.63 ft$^2$/lb), 40% PTFE-coated calcium bentonite (BL-RVM coated with 40 lbs of 1.2% PTFE solution per ton of clay, bulk density prior to coating 42.1 lb/ft$^3$, external surface area prior to coating 21.40 ft$^2$/lb). The final density of the blend is 54.50 lb/ft$^3$. Information about the sodium bentonite of Blend #40 is provided in Table 3002 of FIG. 30. Information about the calcium bentonite of Blend #40 is provided in Table 3102 of FIG. 31. The average particle size of the sodium bentonite is 775 μm. The average particle size of the calcium bentonite is 1096 μm.

Information about Blend #40 is provided in Table 85 below:

TABLE 85

| Component | % w/w | PC/lb | PC Dist. | Ext. SA | Ext. SA Dist. |
|---|---|---|---|---|---|
| Sodium bentonite | 60.00 | 1,146,885 | 62 | 10.58 | 55 |
| PTFE-coated calcium bentonite | 40.00 | 705,293 | 38 | 8.56 | 45 |
| Totals | 100.00 | 1,852,178 | 100 | 19.14 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 86 below.

TABLE 86

| | Clump Strength | | | |
|---|---|---|---|---|
| | 30 sec. | 1 hr. | 24 hrs. | 72 hrs. |
| Test 1 | 1 | 2 | 1 | 1 |
| Test 2 | 1 | 1 | 1 | 1 |
| Test 3 | 1 | 1 | 1 | 1 |
| Average | 1.0 | 1.3 | 1.0 | 1.0 |

Example 44

Blend #41:65% sodium bentonite (Wyo-Ben sodium bentonite, bulk density 63.3 lb/ft$^3$, external surface area 17.01 ft$^2$/lb), 35% attapulgite (GA-RVM, bulk density 32.5 lb/ft$^3$, external surface area 27.95 ft$^2$/lb). Information about the sodium bentonite of Blend #41 is provided in Table 2502 of FIG. 25. Information about the attapulgite of Blend #41 is provided in Table 3202 of FIG. 32. The average particle size of the sodium bentonite is 927 μm. The average particle size of the attapulgite is 1099 μm.

Information about Blend #41 is provided in Table 87 below:

TABLE 87

| Component | % w/w | PC/lb | PC Dist. | Ext. SA | Ext. SA Dist. |
|---|---|---|---|---|---|
| Sodium bentonite | 65.00 | 5,687,519 | 90 | 11.06 | 53 |
| Attapulgite | 35.00 | 643,102 | 10 | 9.78 | 47 |
| Totals | 100.00 | 6,330,621 | 100 | 20.84 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 88 below.

TABLE 88

| | Clump Strength | | | |
|---|---|---|---|---|
| | 30 sec. | 1 hr. | 24 hrs. | 72 hrs. |
| Test 1 | 2 | 1 | 1 | 1 |
| Test 2 | 1 | 1 | 1 | 1 |
| Test 3 | 1 | 1 | 1 | 1 |
| Average | 1.3 | 1.0 | 1.0 | 1.0 |

Example 45

Blend #42:0% sodium bentonite (Wyo-Ben sodium bentonite, bulk density 63.3 lb/ft$^3$, external surface area 17.01 ft$^2$/lb), 40% attapulgite (GA-RVM, bulk density 32.5 lb/ft$^3$, external surface area 27.95 ft$^2$/lb). Information about the sodium bentonite of Blend #42 is provided in Table 2502 of FIG. 25. Information about the attapulgite of Blend #42 is provided in Table 3202 of FIG. 32. The average particle size of the sodium bentonite is 927 μm. The average particle size of the attapulgite is 1099 μm.

Information about Blend #42 is provided in Table 89 below:

TABLE 89

| Component | % w/w | PC/lb | PC Dist. | Ext. SA | Ext. SA Dist. |
|---|---|---|---|---|---|
| Sodium bentonite | 60.00 | 5,250,018 | 88 | 10.21 | 48 |
| Attapulgite | 40.00 | 734,973 | 12 | 11.18 | 52 |
| Totals | 100.00 | 5,984,991 | 100 | 21.39 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 90 below.

TABLE 90

| | Clump Strength | | | |
|---|---|---|---|---|
| | 30 sec. | 1 hr. | 24 hrs. | 72 hrs. |
| Test 1 | 2 | 1 | 1 | 1 |
| Test 2 | 1 | 1 | 1 | 1 |
| Test 3 | 1 | 1 | 1 | 1 |
| Average | 1.3 | 1.0 | 1.0 | 1.0 |

Example 46

Blend #43:5% sodium bentonite (Wyo-Ben sodium bentonite, bulk density 63.3 lb/ft³, external surface area 17.01 ft²/lb), 45% attapulgite (GA-RVM, bulk density 32.5 lb/ft³, external surface area 27.95 ft²/lb). Information about the sodium bentonite of Blend #43 is provided in Table 2502 of FIG. 25. Information about the attapulgite of Blend #43 is provided in Table 3202 of FIG. 32. The average particle size of the sodium bentonite is 927 µm. The average particle size of the attapulgite is 1099 µm.

Information about Blend #43 is provided in Table 91 below:

TABLE 91

| Component | % w/w | PC/lb | PC Dist. | Ext. SA | Ext. SA Dist. |
|---|---|---|---|---|---|
| Sodium bentonite | 55.00 | 4,812,516 | 85 | 9.36 | 43 |
| Attapulgite | 45.00 | 826,845 | 15 | 12.58 | 57 |
| Totals | 100.00 | 5,639,362 | 100 | 21.93 | 100 |

Clump strength is tested for samples after using the Standard Drop Method Test described above. Tests are conducted 30 seconds, 1 hour, 24 hours and 72 hours after exposure of the test litter to synthetic urine. The results of these tests are shown in Table 92 below.

TABLE 92

| | Clump Strength | | | |
|---|---|---|---|---|
| | 30 sec. | 1 hr. | 24 hrs. | 72 hrs. |
| Test 1 | 1 | 1 | 2 | 1 |
| Test 2 | 3 | 1 | 1 | 1 |
| Test 3 | 1 | 1 | 1 | 1 |
| Average | 1.7 | 1.0 | 1.3 | 1.0 |

Example 47

Blend #44:60% sodium bentonite (Wyo-Ben sodium bentonite, bulk density 63.3 lb/ft³, external surface area 17.01 ft²/lb), 40% Taft clay (TF-RVM, bulk density 40.0 lb/ft³, external surface area 24.22 ft²/lb). Information about the sodium bentonite of Blend #44 is provided in Table 2502 of FIG. 25. Information about the attapulgite of Blend #44 is provided in Table 3302 of FIG. 33. The average particle size of the sodium bentonite is 927 µm. The average particle size of the Taft clay is 1050 µm.

Information about Blend #44 is provided in Table 93 below:

TABLE 93

| Component | % w/w | PC/lb | PC Dist. | Ext. SA | Ext. SA Dist. |
|---|---|---|---|---|---|
| Sodium bentonite | 60.00 | 5,250,018 | 65 | 10.21 | 51 |
| Taft clay | 40.00 | 2,860,640 | 35 | 9.69 | 49 |
| Totals | 100.00 | 8,110,658 | 100 | 19.89 | 100 |

Clump strength is tested for samples after using the Standard Drop Method Test described above. Tests are conducted 30 seconds and 1 hour after exposure of the test litter to synthetic urine. The results of these tests are shown in Table 94 below.

TABLE 94

| | Clump Strength | |
|---|---|---|
| | 30 sec. | 1 hr. |
| Test 1 | 1 | 1 |
| Test 2 | 1 | 1 |
| Test 3 | 1 | 1 |
| Average | 1.0 | 1.0 |

Example 48

Blend #45:55% sodium bentonite (Wyo-Ben sodium bentonite, bulk density 63.3 lb/ft³, external surface area 17.01 ft²/lb), 45% Taft clay (TF-RVM, bulk density 40.0 lb/ft³, external surface area 24.22 ft²/lb). Information about the sodium bentonite of Blend #45 is provided in Table 2502 of FIG. 25. Information about the attapulgite of Blend #45 is provided in Table 3302 of FIG. 33. The average particle size of the sodium bentonite is 927 µm. The average particle size of the Taft clay is 1050 µm.

Information about Blend #45 is provided in Table 95 below:

TABLE 95

| Component | % w/w | PC/lb | PC Dist. | Ext. SA | Ext. SA Dist. |
|---|---|---|---|---|---|
| Sodium bentonite | 50.00 | 4,375,015 | 55 | 8.51 | 41 |
| Taft clay | 50.00 | 3,575,800 | 45 | 12.11 | 59 |
| Totals | 100.00 | 7,950,815 | 100 | 20.61 | 100 |

Clump strength is tested for samples after using the Standard Drop Method Test described above. Tests are conducted 30 seconds and 1 hour after exposure of the test litter to synthetic urine. The results of these tests are shown in Table 96 below.

TABLE 96

| | Clump Strength | |
|---|---|---|
| | 30 sec. | 1 hr. |
| Test 1 | 2 | 1 |
| Test 2 | 2 | 1 |
| Test 3 | 2 | 1 |
| Average | 2.0 | 1.0 |

Example 49

Blend #46:50% sodium bentonite (Wyo-Ben sodium bentonite, bulk density 63.3 lb/ft³, external surface area 17.01 ft²/lb), 50% Taft clay (TF-RVM, bulk density 40.0 lb/ft³, external surface area 24.22 ft²/lb). Information about the sodium bentonite of Blend #46 is provided in Table 2502 of FIG. 25. Information about the attapulgite of Blend #46 is provided in Table 3302 of FIG. 33. The average particle size of the sodium bentonite is 927 µm. The average particle size of the Taft clay is 1050 µm.

Information about Blend #46 is provided in Table 97 below:

TABLE 97

| Component | % w/w | PC/lb | PC Dist. | Ext. SA | Ext. SA Dist. |
|---|---|---|---|---|---|
| Sodium bentonite | 55.00 | 4,812,516 | 60 | 9.36 | 46 |
| Taft clay | 45.00 | 3,218,220 | 40 | 10.90 | 54 |
| Totals | 100.00 | 8,030,737 | 100 | 20.25 | 100 |

Clump strength is tested for samples after using the Standard Drop Method Test described above. Tests are conducted 30 seconds and 1 hour after exposure of the test litter to synthetic urine. The results of these tests are shown in Table 98 below.

TABLE 98

Clump Strength

| | 30 sec. | 1 hr. |
|---|---|---|
| Test 1 | 1 | 1 |
| Test 2 | 1 | 1 |
| Test 3 | 1 | 1 |
| Average | 1.0 | 1.0 |

Results and Conclusions from Examples 3-49

Based on the results of Examples 3-25, 34 and 36-43, sodium bentonite/calcium bentonite clay blends with 47% or more of the total external surface area coming from sodium bentonite particles tested 1.0 (clumps intact) for clump strength at 30 seconds except for Blend #1 of Example 3 which tested 1.3 based on an average of 3 clumps. All of the blends with 47% or more of the total external surface area coming from sodium bentonite tested 1.0 for 1-hour clumps. The sodium bentonite/calcium bentonite blends have clumpability similar to the clumpability of the sodium bentonite alone (see Example 35 above).

Therefore, Examples 3-25 and 34-43 show that it is possible to form sodium bentonite/calcium bentonite blends having clumpability similar to the sodium bentonite wherein 50% or less, or even as little as 47%, of the total external surface area of all the particles in the blend are from sodium bentonite particles.

All remaining blends with 33% to 46% of the total external surface area coming from sodium bentonite tested between 1.7 and 3.0 (slight to moderate breakage) for 30-second clumps. and 1.0 to 2.3 (clump intact to slight breakage) for 1-hour clumps.

A direct relationship is found between clumping and percentage total external surface area of swelling clay in a swelling/non-swelling clay blend. A minimum of 47% of the total external surface area of all particles in a swelling/non-swelling clay blend needs to originate from the swelling clay in order for the product to form strong clumps at 30 seconds upon wetting. As the percentage total external surface area of swelling clay in a swelling/non-swelling clay blend increases, the clump strength also increases. The longer the clumps are allowed to sit prior to testing, the stronger they get.

Examples 36-43 show that sodium bentonite/calcium bentonite blends in which the calcium bentonite are coated with PTFE (Examples 41-43) have similar clumpability properties to sodium bentonite/calcium bentonite blends in which the calcium bentonite is uncoated (Examples 36-40).

Examples 26-33 show that sodium bentonite/paper granule blends (Examples 26-29), a sodium bentonite/wood fiber particle blend (Example 30) and sodium bentonite/barley grain blends (Examples 31-33) with 47% or more of the total external surface area coming from sodium bentonite particles have clumpability similar to the clumpability of the sodium bentonite alone (see Example 35 above).

Examples 44-46 show that sodium bentonite/attapulgite blends with 47% or more of the total external surface area coming from sodium bentonite particles have clumpability similar to the clumpability of the sodium bentonite alone (see Example 35 above).

Examples 47-49 show that sodium bentonite/Taft clay blends with 47% or more of the total external surface area coming from sodium bentonite particles have clumpability similar to the clumpability of the sodium bentonite alone (see Example 35 above).

Example 50

Ten litter mixtures are prepared having the following compositions:
Litter 1: 100% sodium bentonite/calcium bentonite blend.
Litter 2: 99.75% sodium bentonite/calcium bentonite blend, 0.25% xanthan gum (fine mesh). For this litter, fine mesh refers to a minimum of 70% of the particles passing through 200-mesh sieve. The clumping additive xanthan gum is added to the final blend.
Litter 3: 99.75% sodium bentonite/calcium bentonite blend, 0.25% sodium carboxymethyl cellulose (fine mesh). For this litter, "fine mesh" refers to a maximum of the 20% of the particles remaining on 200-mesh sieve. The clumping additive sodium carboxymethyl cellulose is added to the final blend.
Litter 4: 99.75% sodium bentonite/calcium bentonite blend, 0.25% guar gum (fine mesh). For this litter, "fine mesh" refers to a minimum of 90% of the particles passing through 270-mesh sieve. The clumping additive guar gum is added to the final blend.
Litter 5: 99.5% sodium bentonite/calcium bentonite blend, 0.5% guar gum (fine mesh). For this litter, "fine mesh" refers to a minimum of 90% of the particles passing through 270-mesh sieve. The clumping additive guar gum is added to the final blend.
Litter 6: 99.5% sodium bentonite/calcium bentonite blend, 0.5% guar gum (coarse mesh). For this litter, "coarse mesh" refers to a maximum of 20% of the particles passing through 200-mesh sieve. The clumping additive guar gum is added to the final blend.
Litter 7: 99.5% sodium bentonite/calcium bentonite blend, 0.5% sodium carboxymethyl cellulose (medium mesh). For this litter, "medium mesh" refers to 40% to 75% of the particles being retained on a 200-mesh sieve. The clumping additive sodium carboxymethyl cellulose is added to the final blend.
Litter 8: 99.5% sodium bentonite/calcium bentonite blend, 0.5% sodium carboxymethyl cellulose (coarse mesh). For this litter, "coarse mesh" refers to a minimum of 85% of the particles being retained on 200-mesh sieve. The clumping additive sodium carboxymethyl cellulose is added to the final blend.
Litter 9: 99.5% sodium bentonite/calcium bentonite blend, 0.5% psyllium 95%. Psyllium 95% is a psyllium husk powder that is 95% pure (medium mesh). For this litter, "medium mesh" refers to an average particle size of 40-mesh. The clumping additive psyllium is added to the final blend.
Litter 10: 99.5% sodium bentonite/calcium bentonite blend, 0.5% psyllium 95% (fine mesh). For this litter, "fine mesh" refers to an average particle size of 100-mesh. The clumping additive psyllium is added to the final blend.

In all of the above litters, the ratio of sodium bentonite to calcium bentonite in the sodium bentonite/calcium bentonite blend is 65% sodium bentonite to 35% calcium bentonite. In all of the above litters, the sodium bentonite is coated with a fragrance slurry coating having the composition shown in Table 2 of Example 1. In all of the above litters, the calcium bentonite is coated with a PTFE slurry coating having the composition shown in Table 3 of Example 1. The granulation size (fine, medium and coarse) for the clumping additives is defined by the suppliers of the clumping additive. Because the suppliers for the different clumping additives are different, the particle size specifications vary.

Table 99 below shows the results of a clump strength test with synthetic urine using the Standard Drop Method Test described above using the average of 3 drops for each clump strength value. Tests are conducted 30 seconds, 1 hour, 24 hours and 72 hours after exposure of the test litter to synthetic urine.

TABLE 99

Clump Strength using Standard Drop Method Test

| Litter | 30 sec. | 1 hr. | 24 hrs. | 72 hrs. | Average |
|---|---|---|---|---|---|
| 1 | 1.0 | 1.0 | 1.0 | 1.0 | 1.0 |
| 2 | 1.0 | 1.0 | 1.0 | 1.0 | 1.0 |
| 3 | 1.0 | 1.0 | 1.0 | 1.0 | 1.0 |
| 4 | 1.0 | 1.0 | 1.0 | 1.0 | 1.0 |
| 5 | 1.0 | 1.0 | 1.0 | 1.0 | 1.0 |
| 6 | 1.0 | 1.0 | 1.0 | 1.0 | 1.0 |
| 7 | 1.0 | 1.0 | 1.0 | 1.0 | 1.0 |
| 8 | 1.0 | 1.0 | 1.0 | 1.0 | 1.0 |
| 9 | 1.0 | 1.0 | 1.0 | 1.0 | 1.0 |
| 10 | 1.0 | 1.0 | 1.0 | 1.0 | 1.0 |

Table 100 below shows the results a clump strength test with synthetic urine using the Extreme Drop Method described above using the average of 3 drops for each clump strength value. Tests are conducted 30 seconds, 1 hour, 24 hours and 72 hours after exposure of the test litter to synthetic urine.

TABLE 100

Clump Strength using Extreme Drop Method Test

| Litter | 30 sec. | 1 hr. | 24 hrs. | 72 hrs. | Average |
|---|---|---|---|---|---|
| 1 | 3.0 | 1.7 | 1.7 | 1.7 | 2.0 |
| 2 | 1.0 | 1.0 | 1.0 | 1.0 | 1.0 |
| 3 | 1.0 | 1.0 | 1.0 | 1.0 | 1.0 |
| 4 | 1.0 | 1.0 | 1.0 | 1.0 | 1.0 |
| 5 | 1.0 | 1.0 | 1.0 | 1.0 | 1.0 |
| 6 | 3.0 | 2.0 | 1.0 | 1.0 | 1.8 |
| 7 | 1.3 | 1.3 | 1.0 | 1.0 | 1.2 |
| 8 | 1.7 | 1.0 | 1.0 | 1.3 | 1.3 |
| 9 | 3.0 | 2.3 | 1.7 | 1.0 | 2.0 |
| 10 | 2.3 | 2.3 | 1.3 | 1.0 | 1.7 |

Example 51

Figure 34:
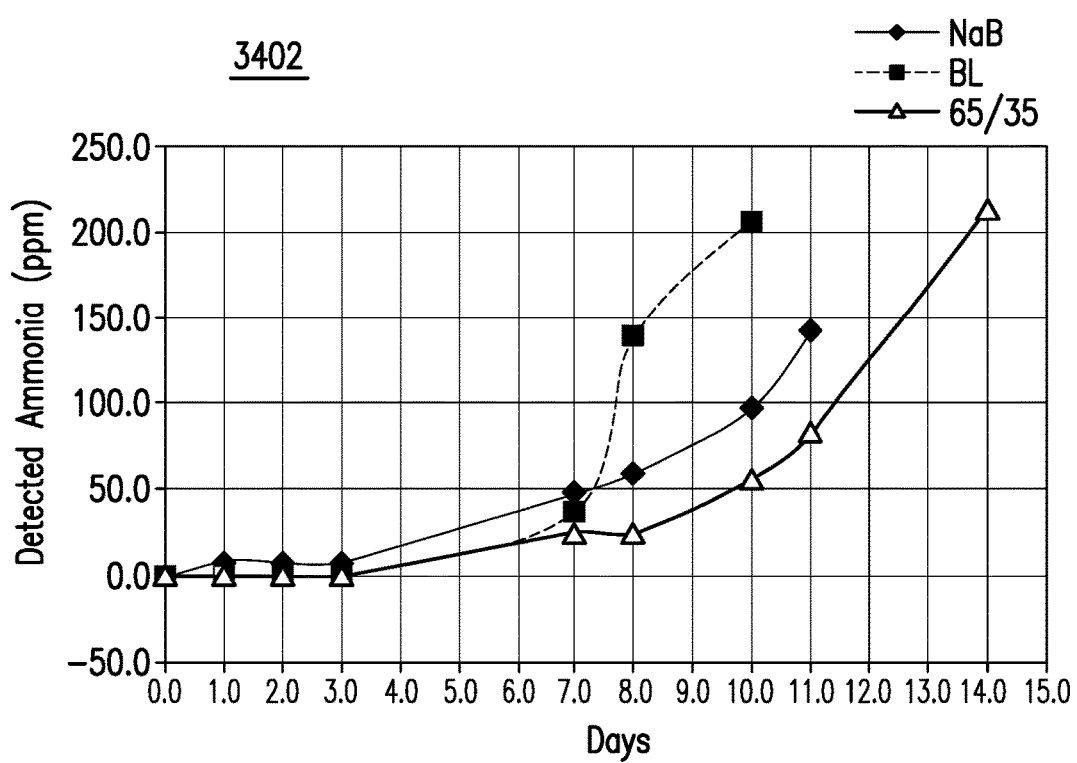
FIG. 34 is a plot of detected ammonia versus days for three different litter compositions.

Three litters are tested for odor control properties using the Magic Cat Box method described above. Litter A is an untreated sodium bentonite litter. Litter B is an untreated calcium bentonite litter. Litter C is an untreated 65/35 mixture of sodium bentonite and calcium bentonite (65% sodium bentonite, 35% calcium bentonite). The results of these tests are shown in Tables 101, 102 and 103 below and in plot 3402 of FIG. 34.

TABLE 101

Odor Control Litter A

| Day | Sample 1 | Sample 2 | Sample 3 | Average |
|---|---|---|---|---|
| 0 | 0 | 0 | 0 | 0 |
| 1 | 10 | 10 | 5 | 8 |
| 2 | 10 | 10 | 5 | 8 |
| 3 | 10 | 10 | 5 | 8 |
| 7 | 50 | 30 | 65 | 48 |
| 8 | 60 | 40 | 80 | 60 |
| 10 | 90 | 70 | 130 | 97 |
| 11 | 130 | 140 | 160 | 143 |

TABLE 102

Odor Control Litter B

| Day | Sample 1 | Sample 2 | Sample 3 | Average |
|---|---|---|---|---|
| 0 | 0 | 0 | 0 | 0 |
| 1 | 0 | 0 | 0 | 0 |
| 2 | 0 | 0 | 0 | 0 |
| 3 | 0 | 0 | 0 | 0 |
| 7 | 35 | 50 | 25 | 37 |
| 8 | 180 | 160 | 80 | 140 |
| 10 | 270 | 220 | 130 | 207 |

TABLE 103

Odor Control Litter C

| Day | Sample 1 | Sample 2 | Sample 3 | Average |
|---|---|---|---|---|
| 0 | 0 | 0 | 0 | 0 |
| 1 | 0 | 0 | 0 | 0 |
| 2 | 0 | 0 | 0 | 0 |
| 3 | 0 | 0 | 0 | 0 |
| 7 | 25 | 25 | 25 | 25 |
| 8 | 25 | 25 | 25 | 25 |
| 10 | 60 | 60 | 50 | 57 |
| 11 | 90 | 90 | 70 | 83 |
| 14 | 220 | 210 | 210 | 213 |

In plot 3402, the squares are for Litter A (sodium bentonite, NaB), the circles are for Litter B (10/24 BL RVM clay, BL) and the triangles are for Litter C (65/35 blend, 65/35).

Example 52

Three litters are prepared and poured into boxes using the apparatus of FIG. 3. Each litter is 65% sodium bentonite and 35% calcium bentonite. Ten samples are taken from each litter and the density of each sample is determined using the Loose-Fill (O'Haus) Method described above.

Samples are taken from the top (sample 1) to the bottom (sample 2) of each box. Results of these density measurements are provided in Table 104 below.

TABLE 104

Density Measurements

| Sample # | Density, lbs/ft$^3$ | | |
| --- | --- | --- | --- |
| | Box #1 | Box #2 | Box #3 |
| 1 (top) | 55.6 | 56.5 | 56.4 |
| 2 | 56.2 | 56.3 | 55.9 |
| 3 | 56.3 | 57.3 | 57.3 |
| 4 | 56.9 | 57.5 | 56.4 |
| 5 | 56.9 | 57.2 | 56.7 |
| 6 | 57.1 | 58.3 | 58.2 |
| 7 | 57.2 | 58.3 | 57.8 |
| 8 | 57.1 | 58.5 | 57.8 |
| 9 | 55.9 | 57.7 | 57.0 |
| 10 (bottom) | 55.0 | 55.5 | 55.0 |
| Standard deviation | 0.74 | 0.97 | 0.96 |
| Average | 56.41 | 57.31 | 56.84 |

Example 53

A litter composition comprising a sodium bentonite/calcium bentonite blend is formed using the apparatus of FIG. 1. The fragrance slurry of Example 1 is coated on the sodium bentonite and a PTFE slurry is coated on the calcium bentonite.

The PTFE slurry consists of 98.0% water and 2.0% of a 60% PTFE suspension in water. The PTFE slurry is applied to the calcium bentonite at rate of 40.0 lbs/ton of PTFE slurry/calcium bentonite to attain 14.0 lbs/ton of PTFE slurry/calcium bentonite in finished product.

While the present invention has been disclosed with references to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A lightweight clumping cat litter comprising sodium bentonite and a non-swelling sorbent material, wherein the non-swelling sorbent material includes a cellulose-containing material, and wherein the sodium bentonite comprises 47% or more of an external surface area of the litter.

2. The lightweight clumping cat litter of claim 1, wherein the litter comprises 45-80% by weight of sodium bentonite and 20-55% by weight of the non-swelling sorbent material.

3. The lightweight clumping cat litter of claim 1, wherein upon contact with a sufficient amount of liquid, a portion of the litter so-contacted forms an intact, removable clump within thirty seconds of the contact, which clump remains intact for at least one hour after the contact.

4. The lightweight clumping cat litter of claim 1, wherein the litter does not include a clumping additive other than sodium bentonite.

5. The lightweight clumping cat litter of claim 1, wherein a total particle count of the sodium bentonite is between 43-84% of a total particle count of the litter.

6. The lightweight clumping cat litter of claim 1, wherein a particle size range of the non-swelling sorbent material is 5-50 Mesh.

7. The lightweight clumping cat litter of claim 1, wherein a particle size range of the sodium bentonite is 12-60 Mesh.

8. The lightweight clumping cat litter of claim 1, wherein the non-swelling sorbent material has a bulk density of less than or equal to 46.2 lbs/ft3.

9. A lightweight clumping cat litter comprising sodium bentonite and a non-swelling sorbent material, wherein the sodium bentonite comprises 47% or more of an external surface area of the litter.

10. The lightweight clumping cat litter of claim 9, wherein one hour after contact with a sufficient amount of liquid, a readily removable, intact clump remains.

11. The lightweight clumping cat litter of claim 9, wherein a total particle count of the sodium bentonite is between 43-84% of a total particle count of the litter.

12. The lightweight clumping cat litter of claim 9, wherein the litter includes at least one of a starch, guar, and carboxymethyl cellulose, wherein the non-swelling sorbent material has a bulk density of less than or equal to 46.2 lbs/ft3.

13. A lightweight clumping cat litter comprising 45%-70% by weight of sodium bentonite and a non-swelling sorbent material, wherein the sodium bentonite comprises 47% or more of an external surface area of the litter, and wherein upon contact with a sufficient amount of liquid, a portion of the litter so-contacted forms an intact, removable clump, and wherein a strength of the clump of the litter is substantially the same as a strength of a clump from a other litter consisting only of sodium bentonite.

14. The lightweight clumping cat litter of claim 13, wherein the non-swelling sorbent material comprises 30%-55% by weight of the litter.

15. The lightweight clumping cat litter of claim 13, wherein the non-swelling sorbent material has a bulk density of less than or equal to 46.2 lbs/ft3.

16. The lightweight clumping cat litter of claim 13, wherein the intact, removable clump is formed within thirty seconds of the contact, which clump remains intact for at least one hour after the contact.

17. The lightweight clumping cat litter of claim 13, wherein a total particle count of the sodium bentonite is between 43-84% of a total particle count of the litter.

18. The lightweight clumping cat litter of claim 13, wherein a particle size range of the non-swelling sorbent material is 5-50 Mesh.

19. The lightweight clumping cat litter of claim 13, wherein a particle size range of the sodium bentonite is 12-60 Mesh.

* * * * *